United States Patent
Chun et al.

(10) Patent No.: US 10,785,772 B2
(45) Date of Patent: Sep. 22, 2020

(54) METHOD FOR UPLINK TRANSMISSION IN WIRELESS COMMUNICATION SYSTEM AND APPARATUS THEREFOR

(71) Applicant: LG ELECTRONICS INC., Seoul (KR)

(72) Inventors: Jinyoung Chun, Seoul (KR); Kiseon Ryu, Seoul (KR); Wookbong Lee, Seoul (KR); Jinsoo Choi, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 15/505,521

(22) PCT Filed: Aug. 21, 2015

(86) PCT No.: PCT/KR2015/008780
§ 371 (c)(1),
(2) Date: Feb. 21, 2017

(87) PCT Pub. No.: WO2016/028125
PCT Pub. Date: Feb. 25, 2016

(65) Prior Publication Data
US 2017/0303280 A1     Oct. 19, 2017

Related U.S. Application Data

(60) Provisional application No. 62/040,387, filed on Aug. 21, 2014, provisional application No. 62/046,184, filed on Sep. 5, 2014.

(51) Int. Cl.
*H04W 72/04*     (2009.01)
*H04L 27/26*     (2006.01)
(Continued)

(52) U.S. Cl.
CPC ....... *H04W 72/0453* (2013.01); *H04L 1/1614* (2013.01); *H04L 1/1671* (2013.01);
(Continued)

(58) Field of Classification Search
CPC . H04L 27/2602; H04L 1/0003; H04L 1/0028; H04L 1/0043; H04L 1/0073;
(Continued)

(56) References Cited

U.S. PATENT DOCUMENTS

2012/0327915 A1* 12/2012 Kang ............... H04L 5/0007
370/336
2013/0301569 A1    11/2013 Wang et al.
(Continued)

FOREIGN PATENT DOCUMENTS

CN     102859895 A     1/2013
CN     103548409 A     1/2014
(Continued)

*Primary Examiner* — Yemane Mesfin
*Assistant Examiner* — Mon Cheri S Davenport
(74) *Attorney, Agent, or Firm* — Fish & Richardson P.C.

(57) ABSTRACT

Disclosed are an uplink transmission method in a wireless communication system and an apparatus therefor. In detail, the method for a uplink (UL) multi-user (MU) transmission by a station (STA) in a wireless communication system includes receiving a trigger frame including frequency resource allocation information in a subband unit for orthogonal frequency division multiple access (OFDMA) transmission from an access point (AP), and transmitting a UL MU PPDU based on the frequency resource allocation information, wherein the UL MU PPDU includes a high efficiency-short training field (HE-STF), a high-efficiency-long training field (HE-LTF), and a data field, and the HE-STF, the HE-LTF, and the data field are transmitted in a subband indicated by the frequency resource allocation information.

17 Claims, 45 Drawing Sheets

(51) Int. Cl.
  *H04L 5/00*    (2006.01)
  *H04L 1/16*    (2006.01)
  *H04L 1/00*    (2006.01)
  *H04W 84/12*   (2009.01)

(52) U.S. Cl.
  CPC .......... *H04L 5/0048* (2013.01); *H04L 5/0053* (2013.01); *H04L 5/0094* (2013.01); *H04L 27/26* (2013.01); *H04L 27/2601* (2013.01); *H04L 27/2602* (2013.01); *H04L 27/2613* (2013.01); *H04L 2001/0093* (2013.01); *H04W 84/12* (2013.01)

(58) Field of Classification Search
  CPC . H04L 27/26; H04L 27/2601; H04L 27/2613; H04L 5/0048; H04L 5/0053; H04L 5/0057; H04L 5/0092; H04W 52/0229; H04W 72/0453
  See application file for complete search history.

(56) References Cited

U.S. PATENT DOCUMENTS

| | | |
|---|---|---|
| 2014/0211775 A1 | 7/2014 | Sampath et al. |
| 2015/0382342 A1 | 12/2015 | Seok |
| 2016/0112899 A1* | 4/2016 | Kenney ............... H04W 52/241 |
| | | 370/338 |

FOREIGN PATENT DOCUMENTS

| | | |
|---|---|---|
| JP | 2014-513486 A | 5/2014 |
| WO | WO 2004/028113 A1 | 4/2004 |
| WO | WO 2012/040495 A1 | 3/2012 |
| WO | WO 2013/129861 A1 | 9/2013 |
| WO | WO 2013/165582 A1 | 11/2013 |
| WO | WO 2014/123358 A1 | 8/2014 |
| WO | WO 2014/172201 A1 | 10/2014 |

* cited by examiner

[FIG. 1]
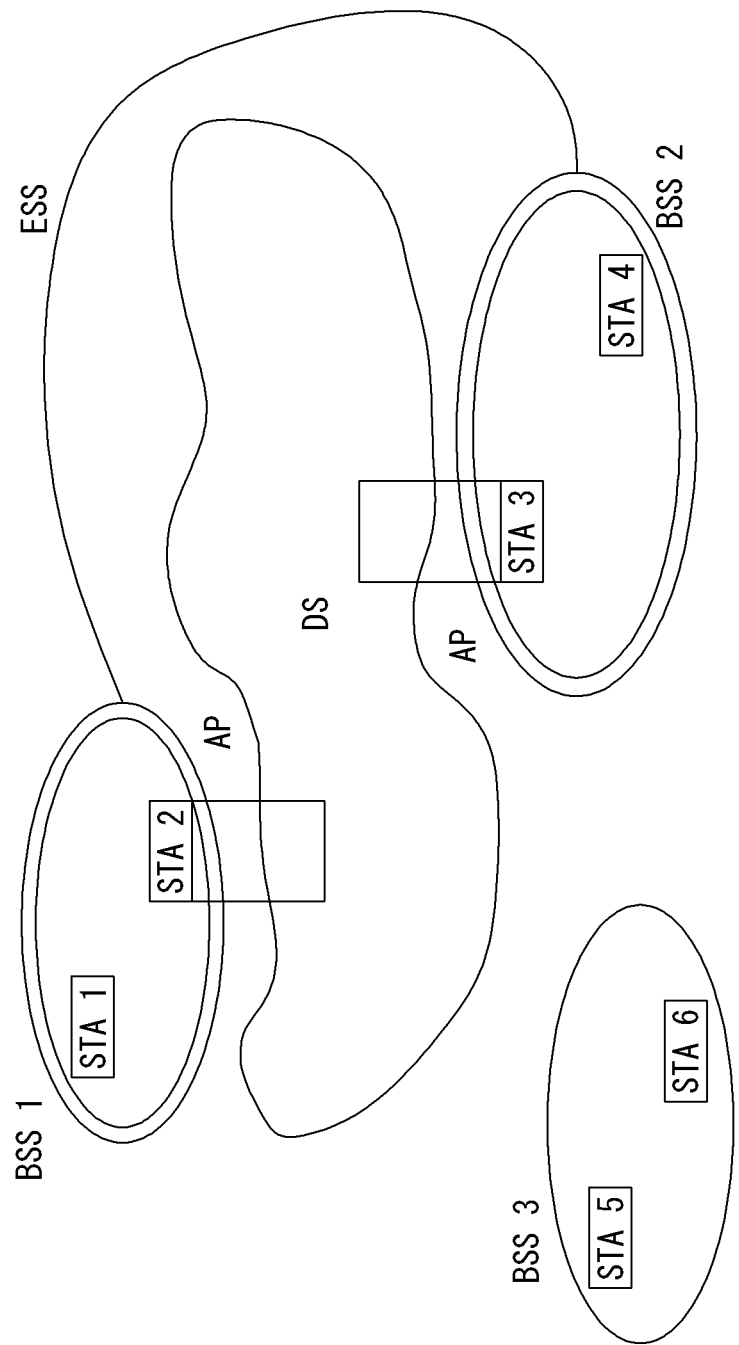

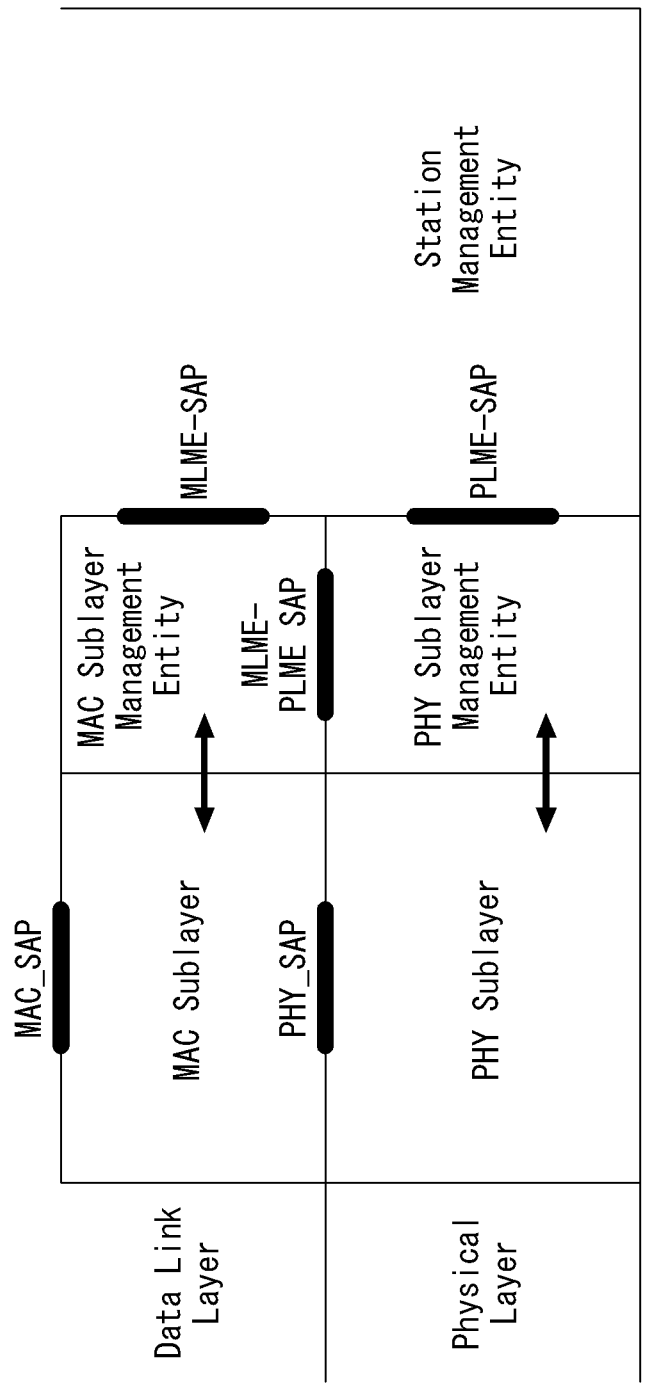
[FIG. 2]

[FIG. 3]
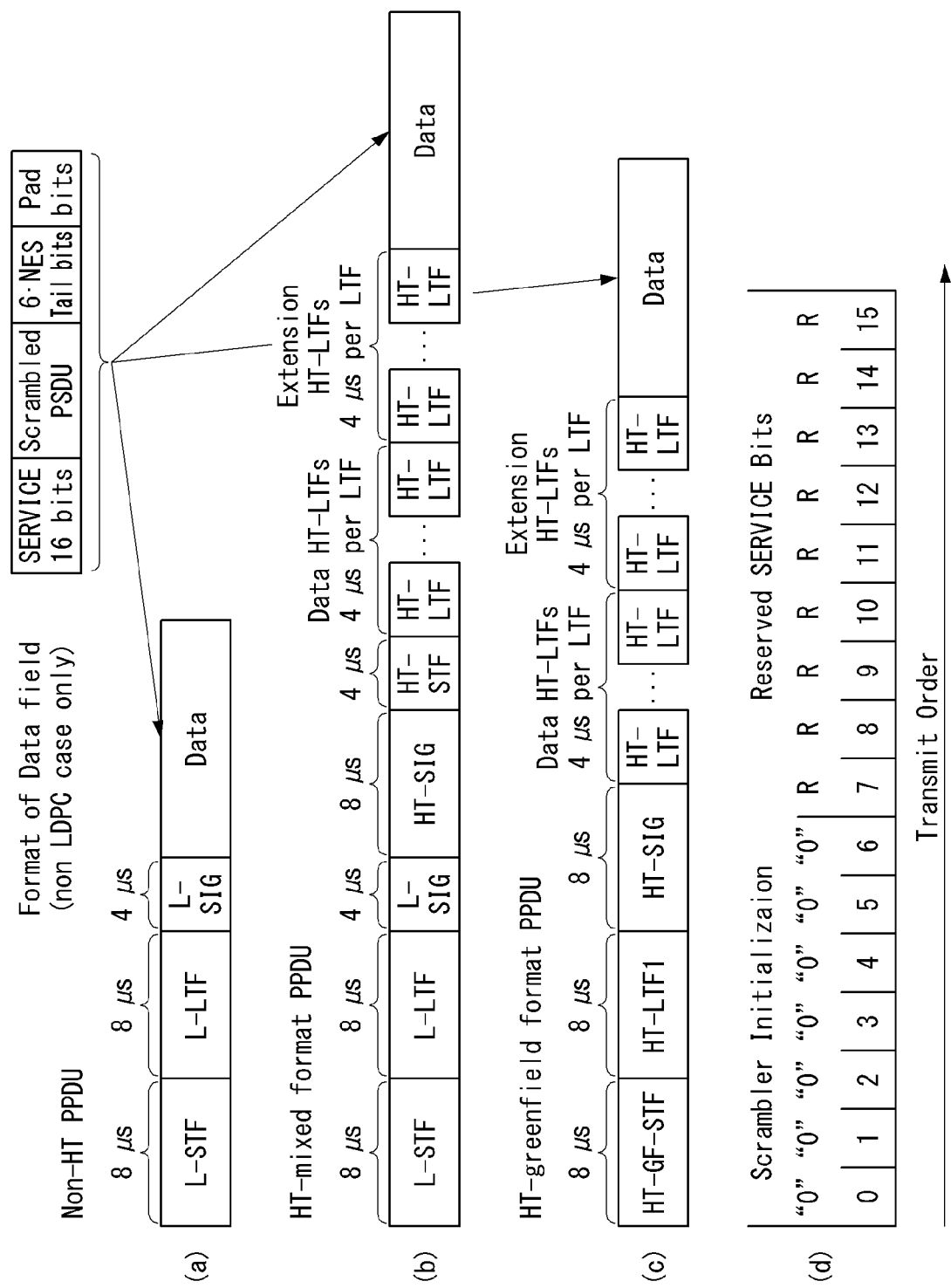

[FIG. 4]
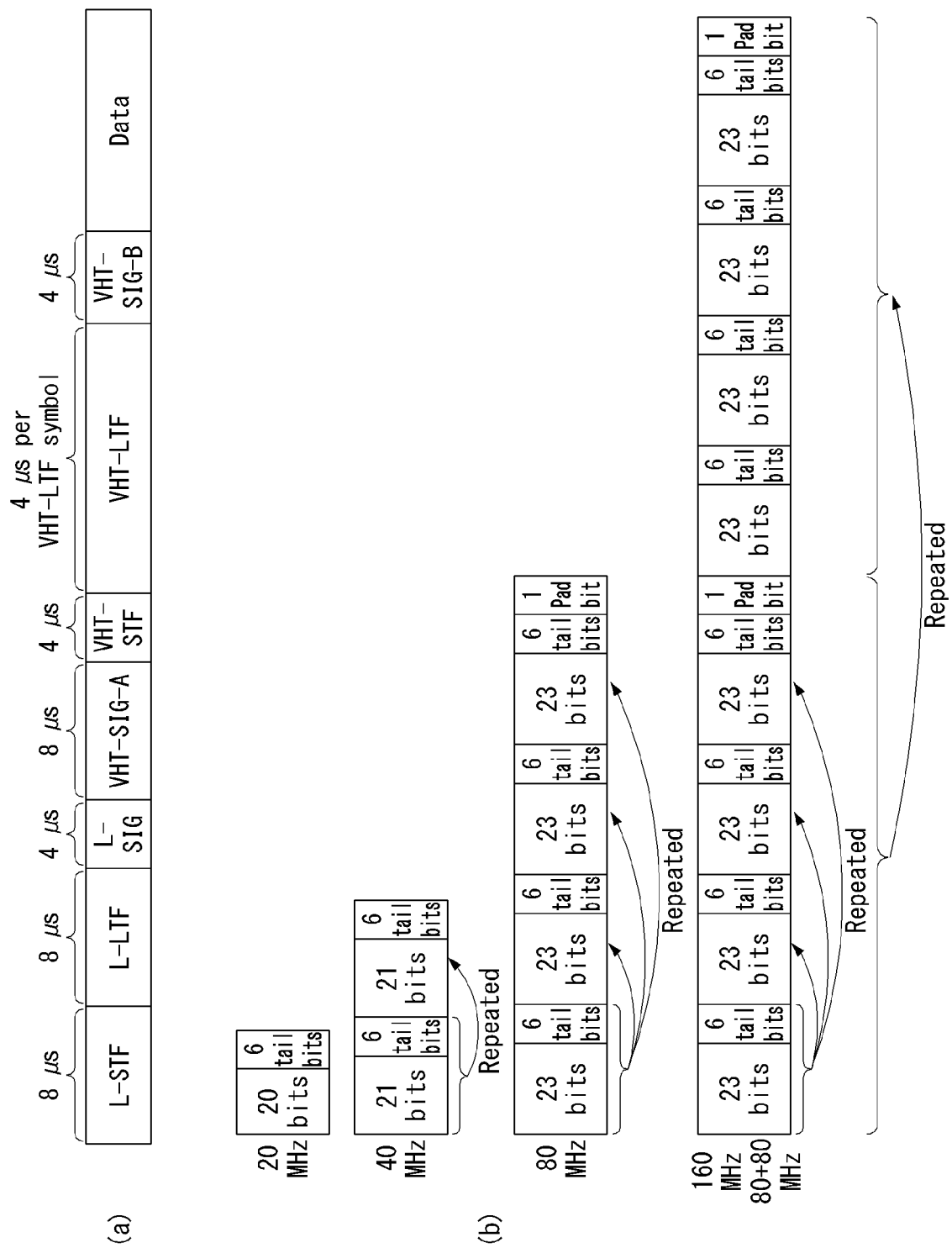

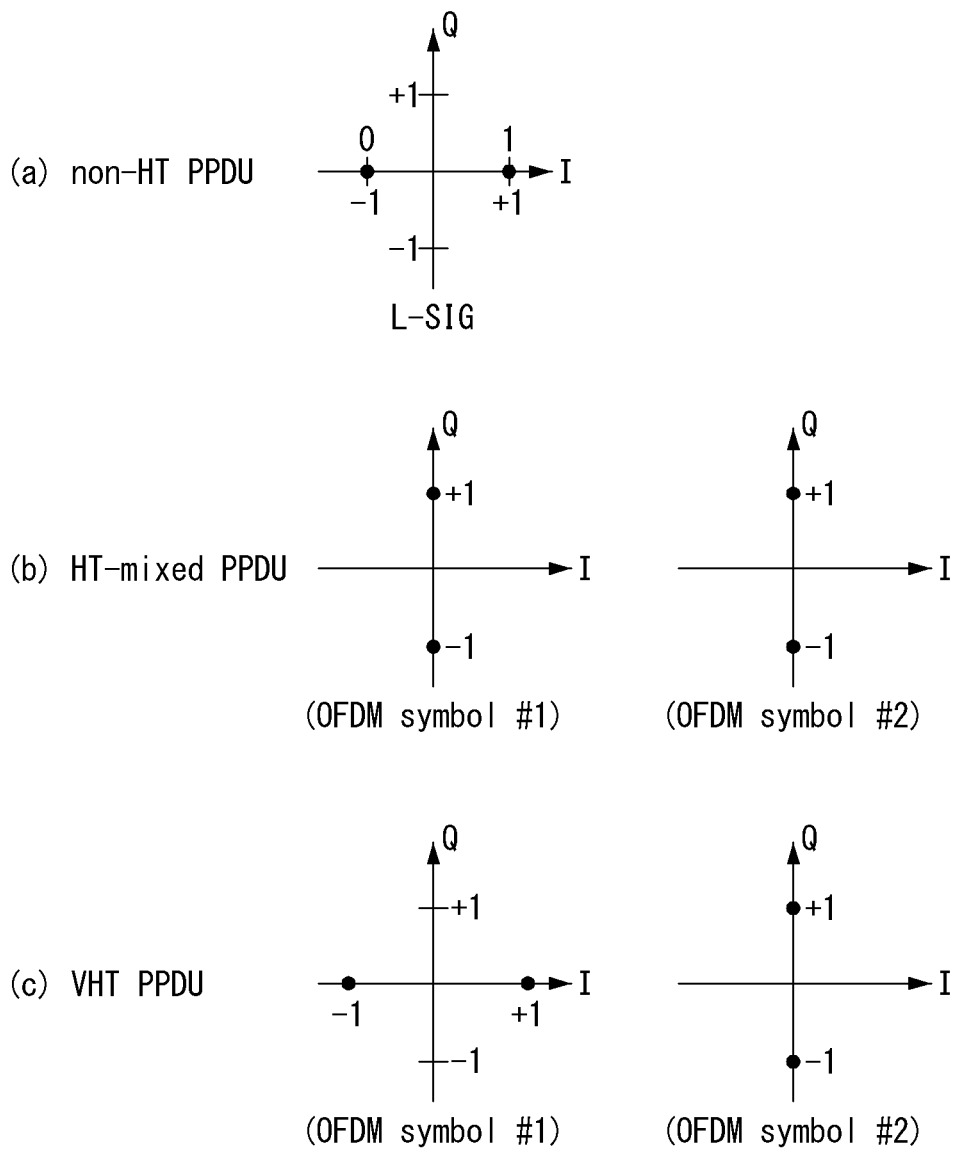

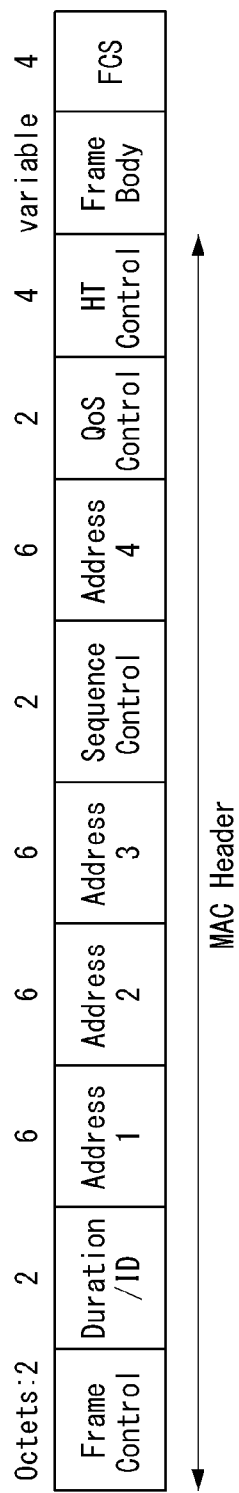
[FIG. 6]

[FIG. 7]

| Protocol Version | Type | Subtype | To DS | From DS | More Frag- ments | Retry | Power Management | More Data | Protected Frame | Order |
|---|---|---|---|---|---|---|---|---|---|---|
| B0 B1 | B2 B3 | B4 B7 | B8 | B9 | B10 | B11 | B12 | B13 | B14 | B15 |
| 2 | 2 | 4 | 1 | 1 | 1 | 1 | 1 | 1 | 1 | 1 |

Bits:

[FIG. 8]
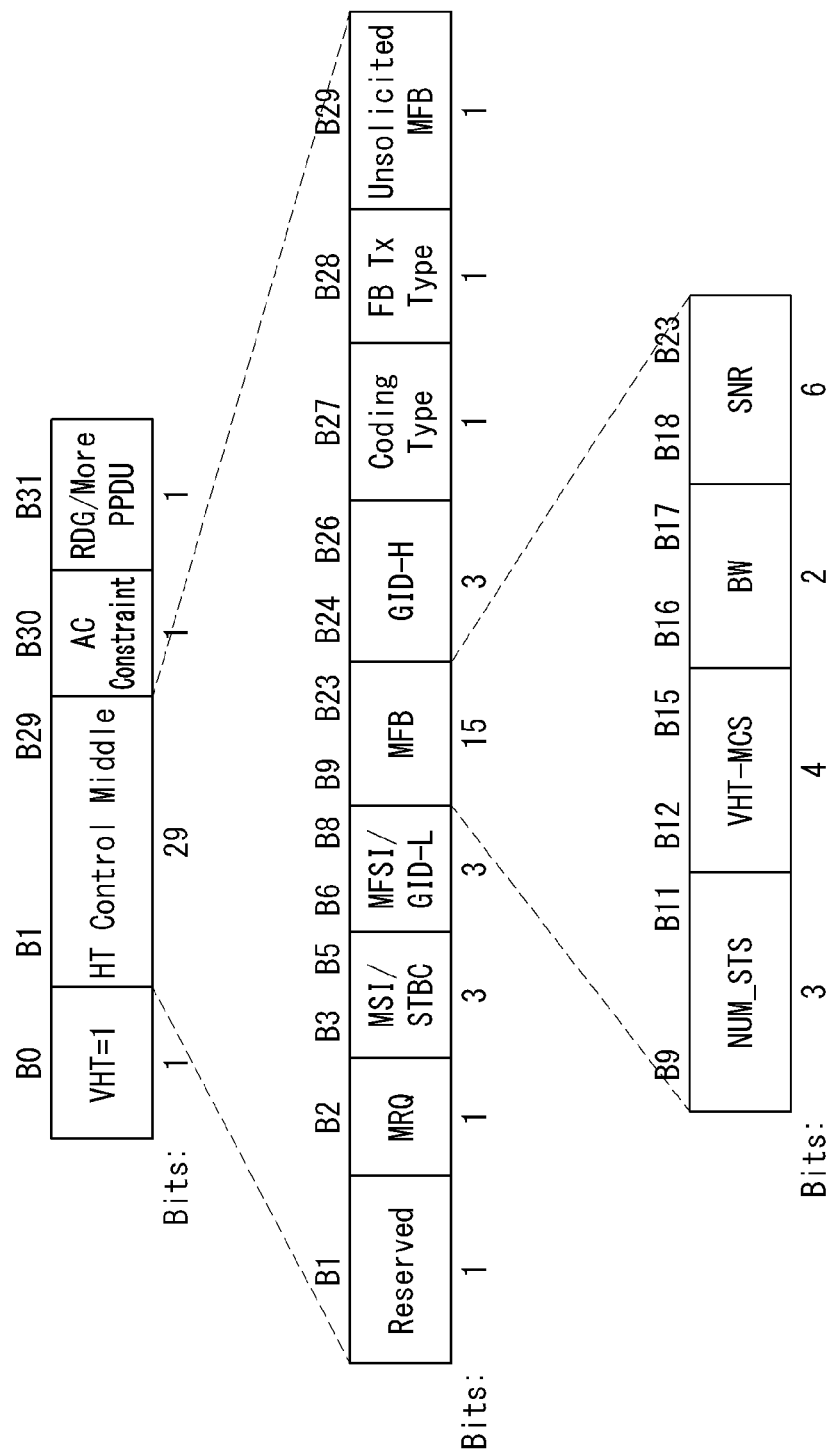

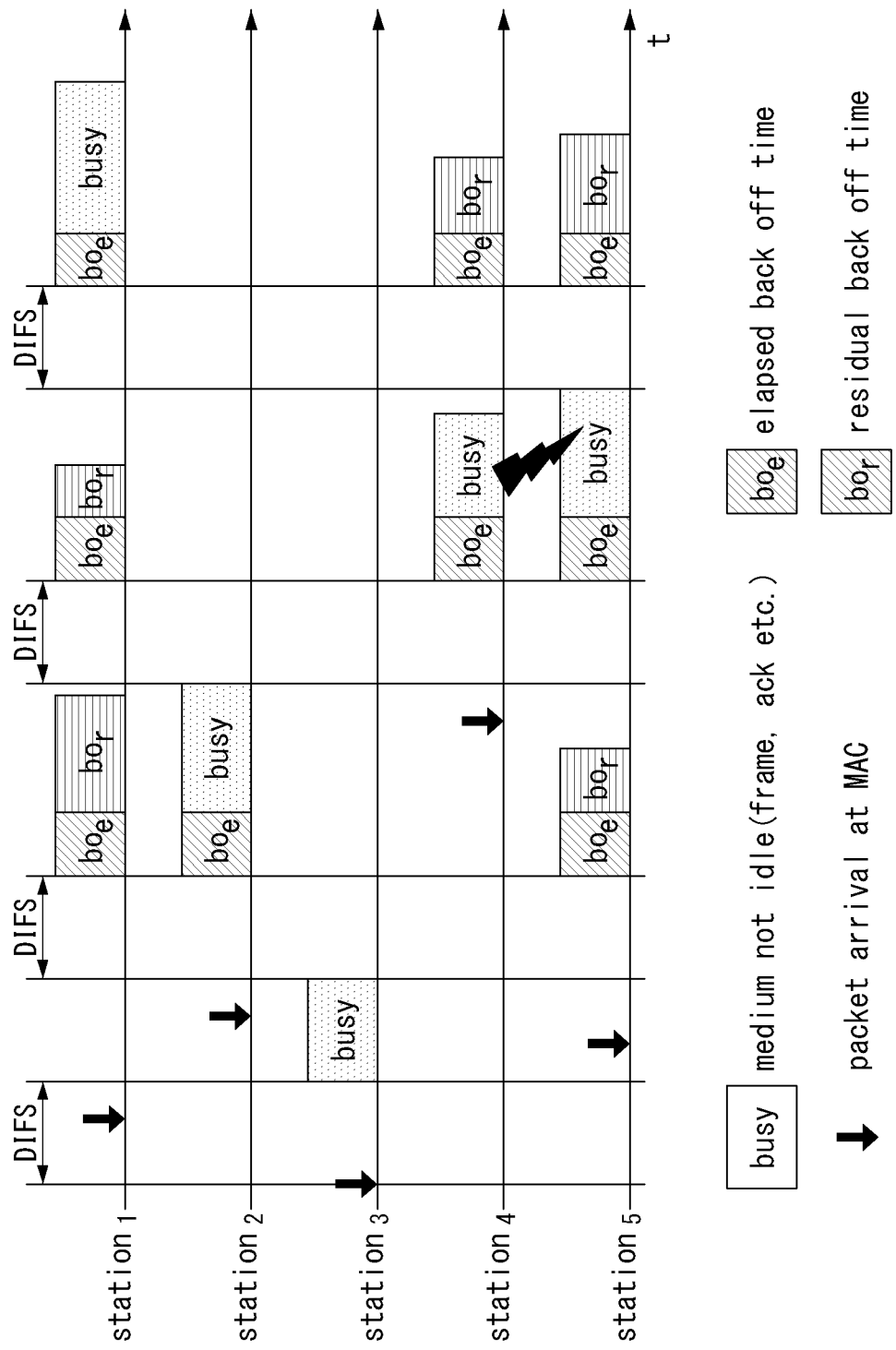
[FIG. 9]

[FIG. 10]
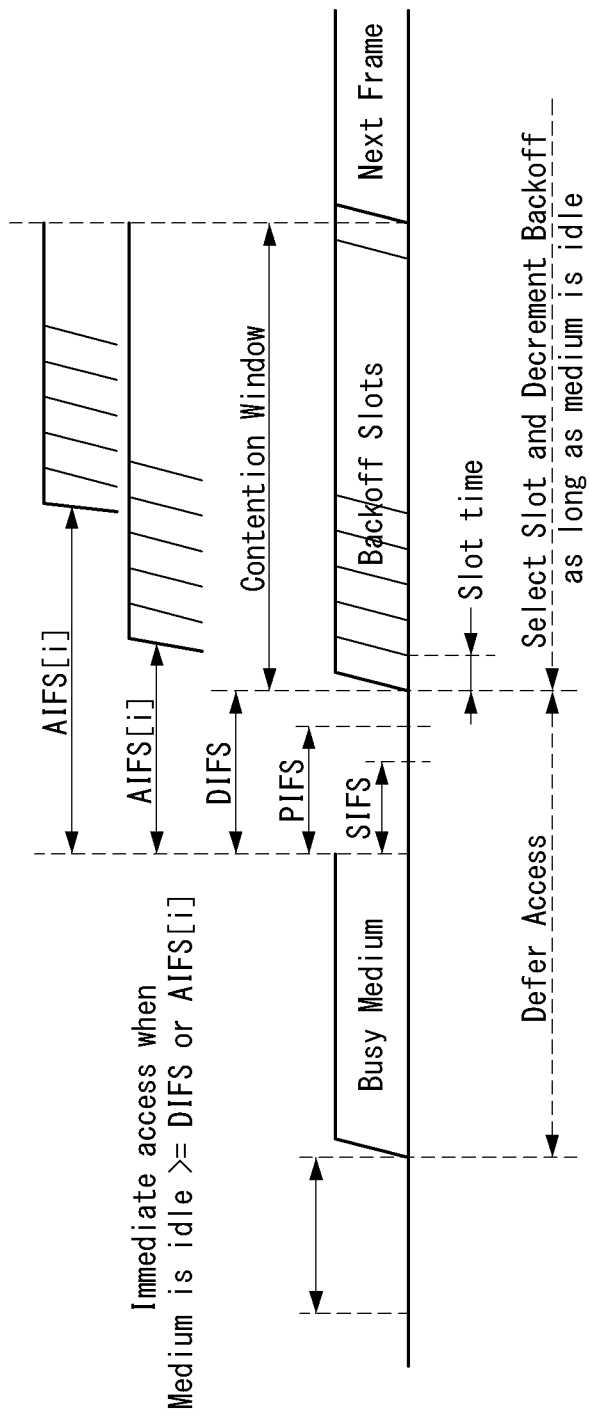

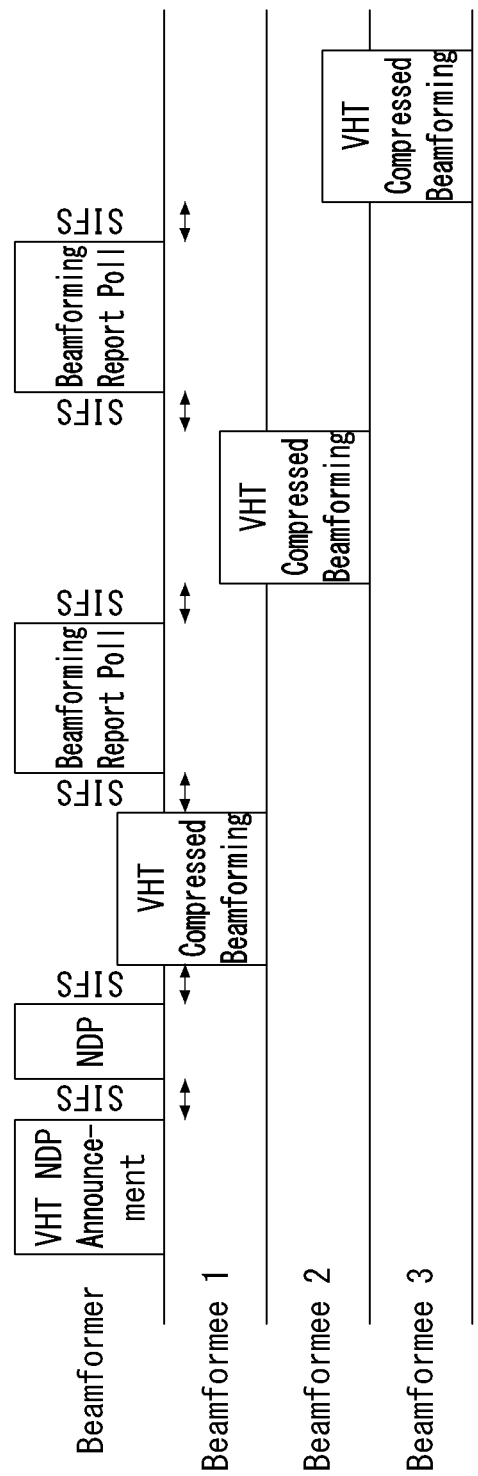
[FIG. 11]

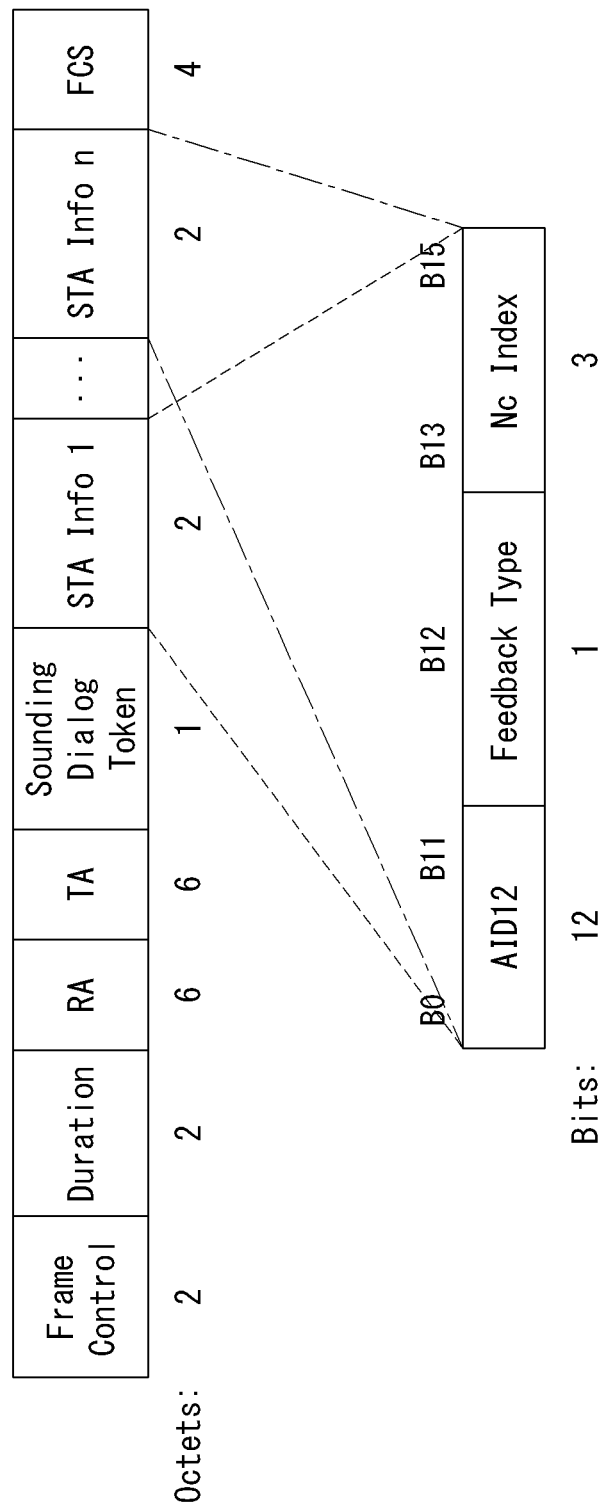
[FIG. 12]

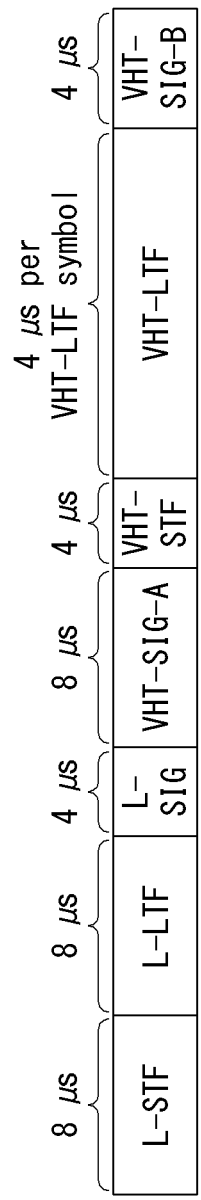
[FIG. 13]

[FIG. 14]
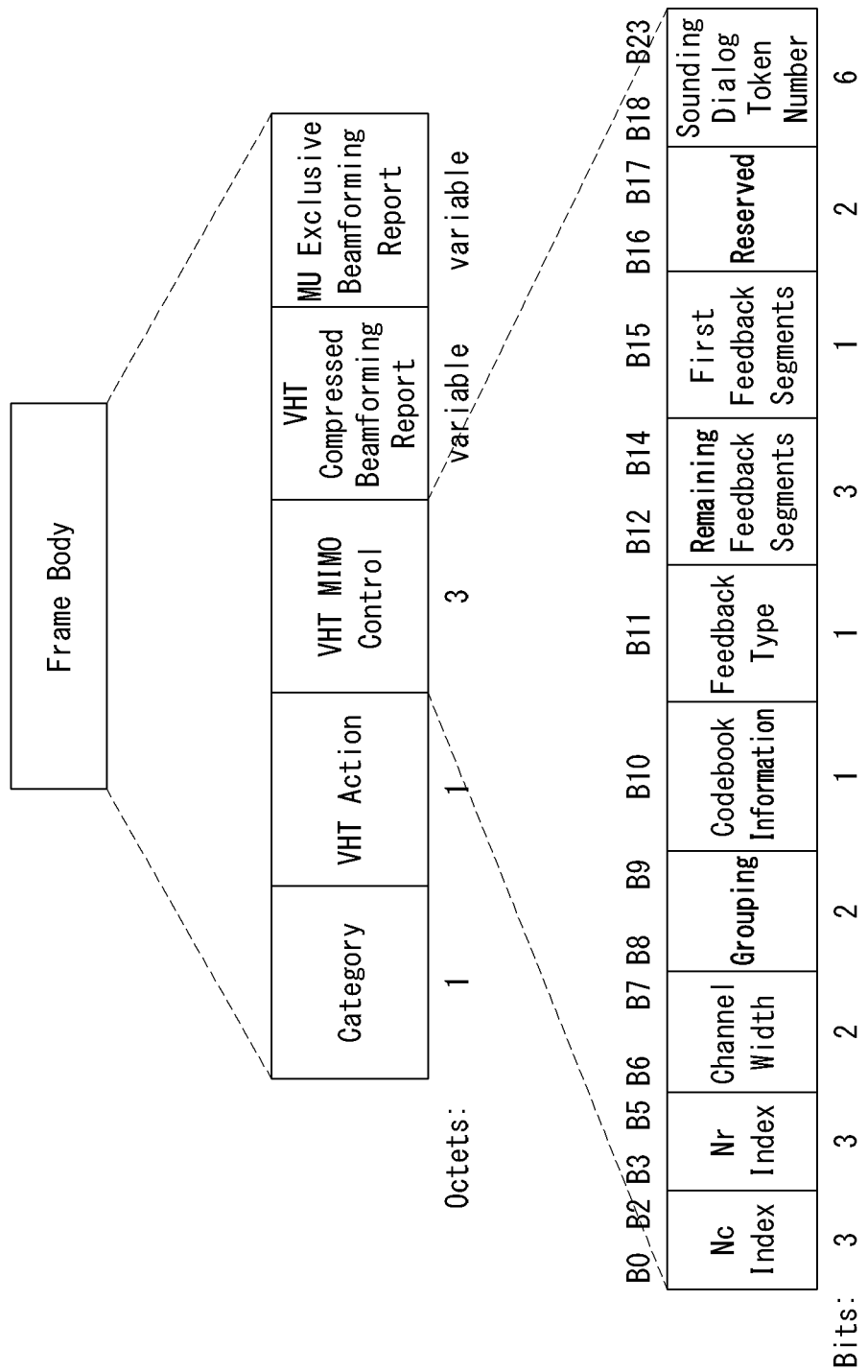

[FIG. 15]

| Frame Control | Duration | RA | TA | Feedback Segment Retransmission Bitmap | FCS |
|---|---|---|---|---|---|
| 2 | 2 | 6 | 6 | 1 | 4 |

Octets:

[FIG. 16]
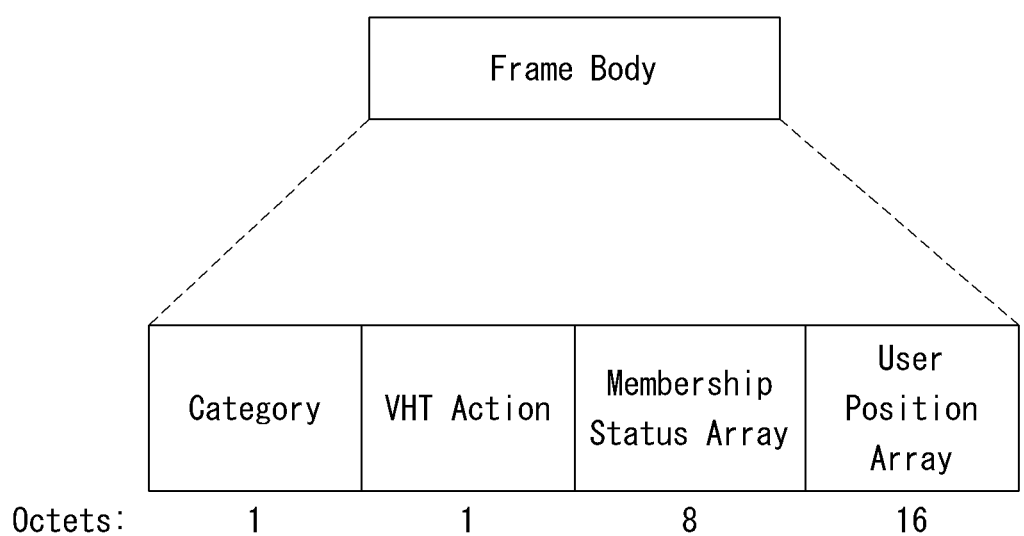

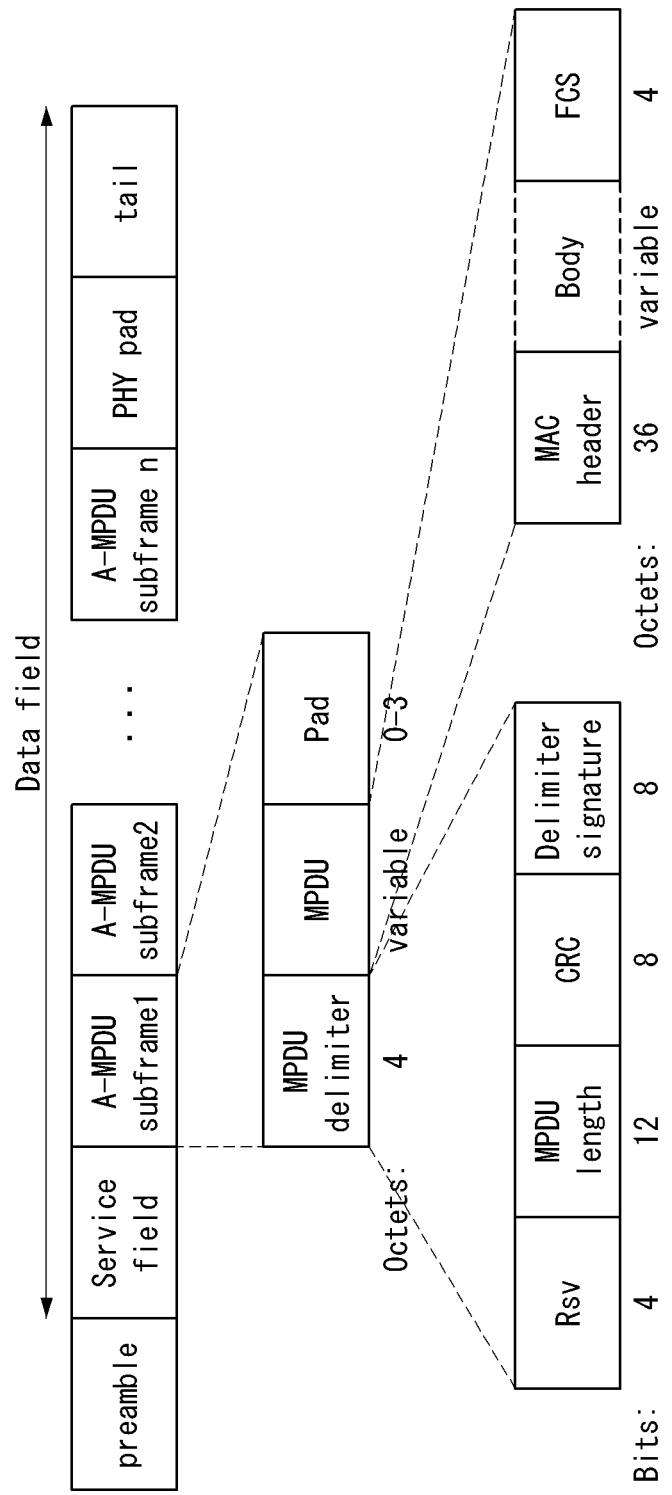
[FIG. 17]

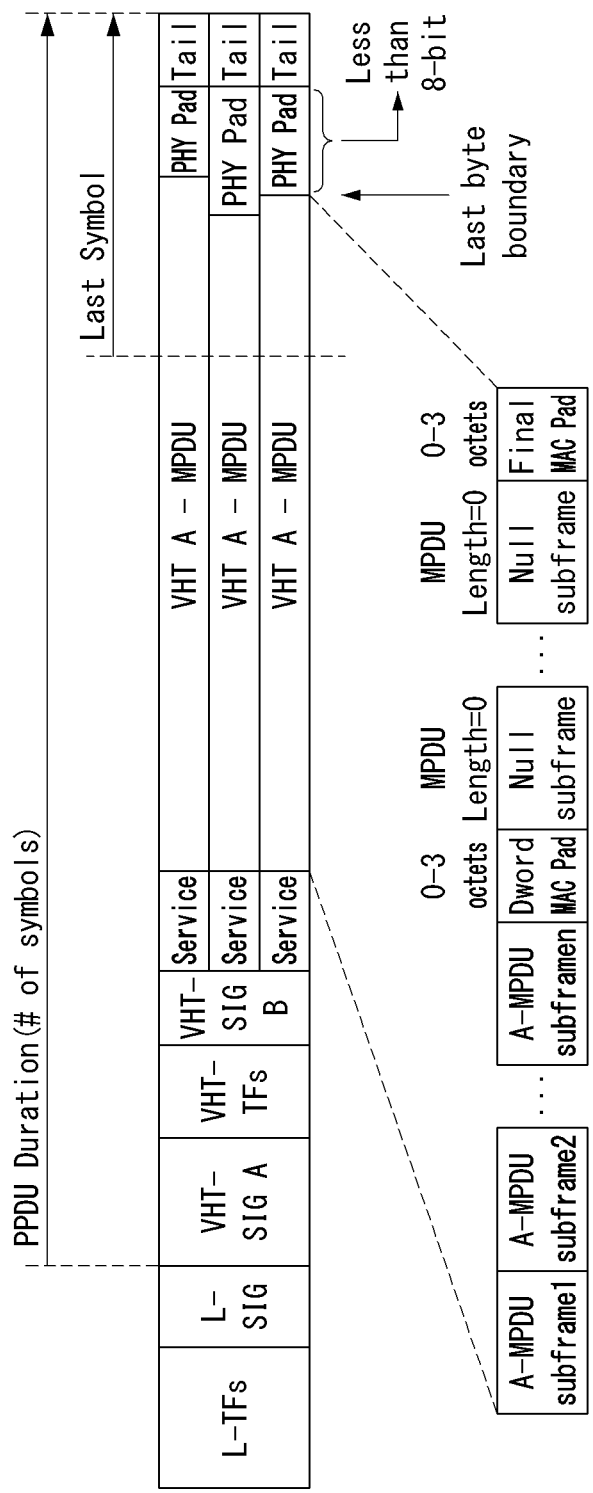
[FIG. 18]

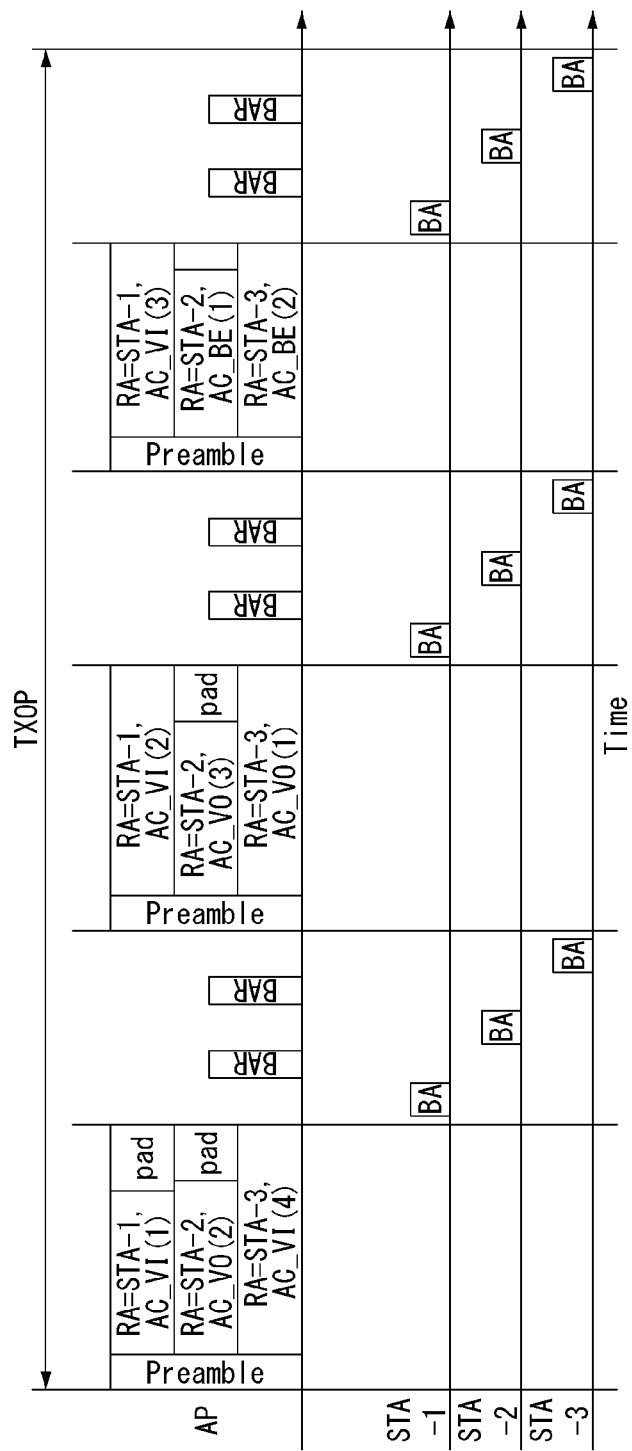
[FIG. 19]

[FIG. 20]
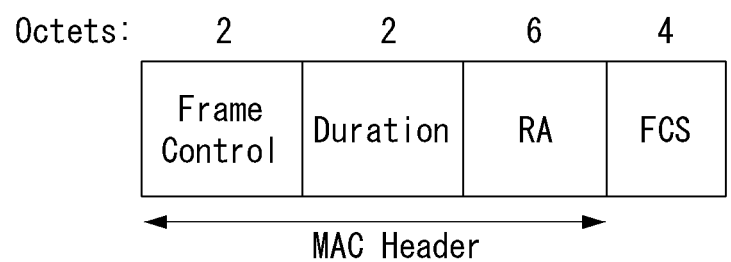

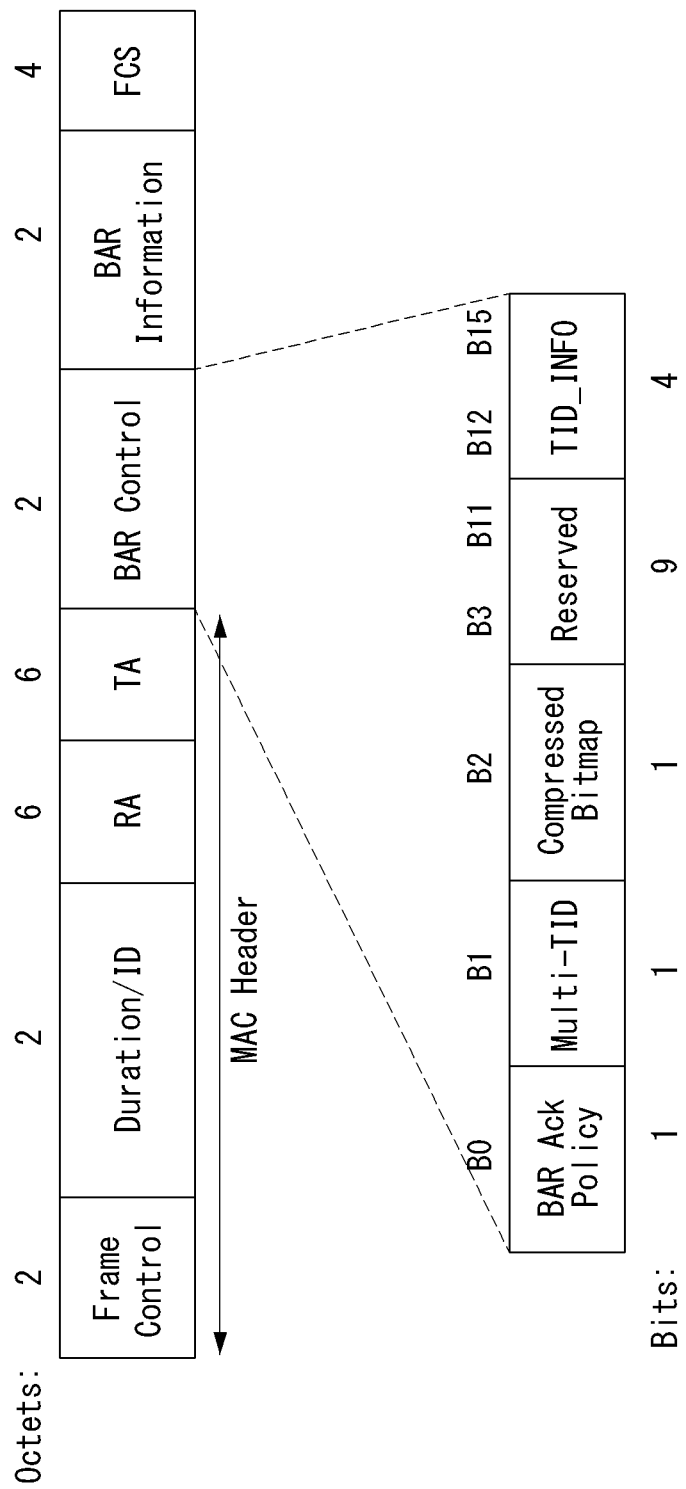
[FIG. 21]

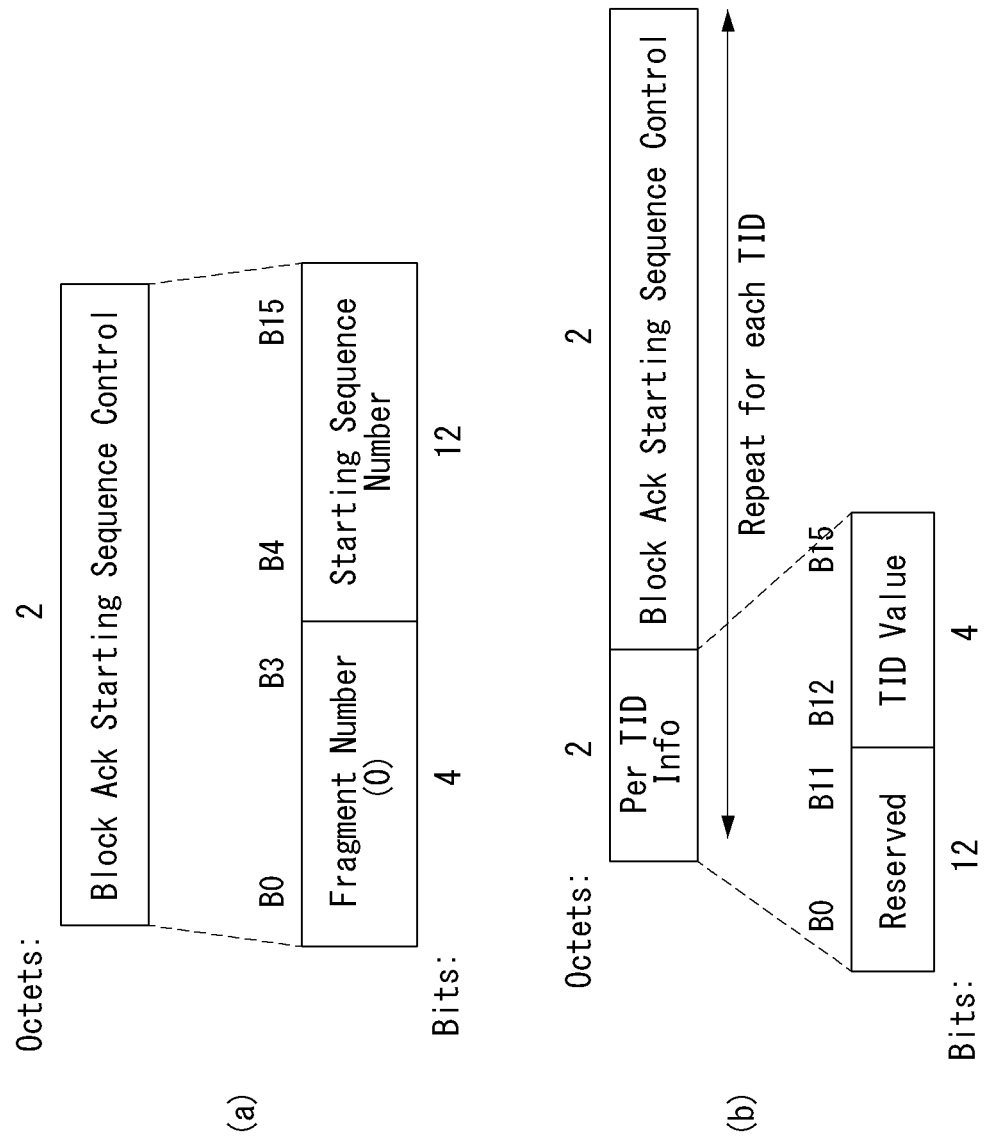
[FIG. 22]

[FIG. 23]
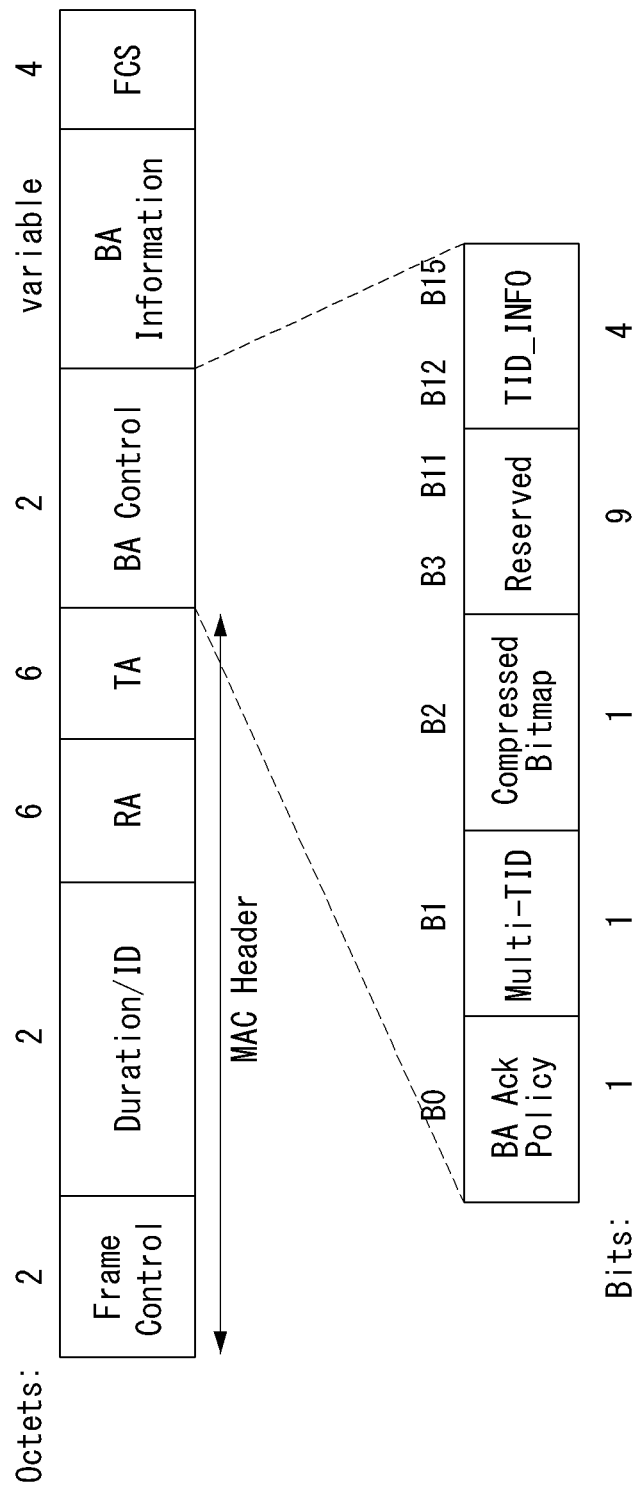

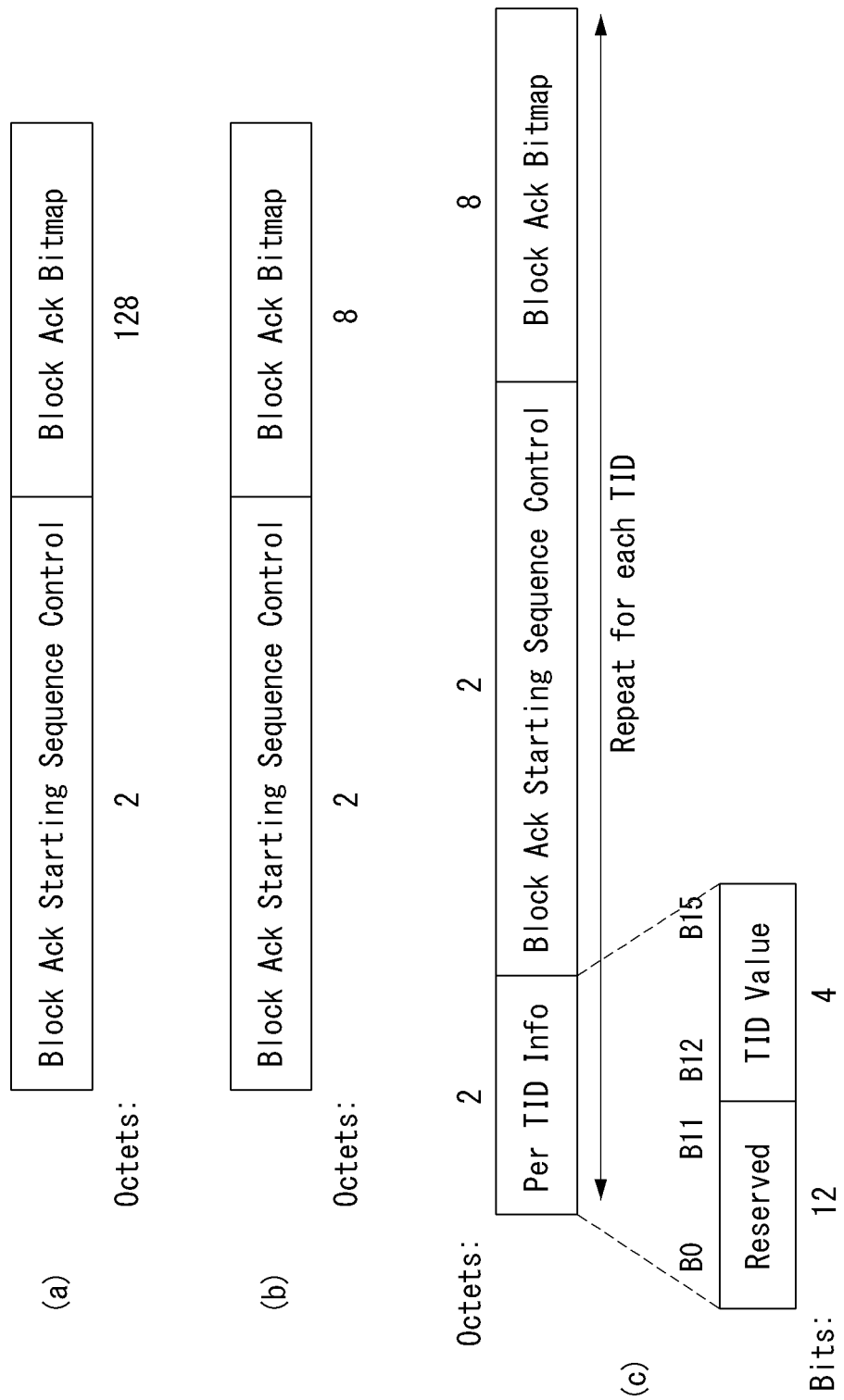
[FIG. 24]

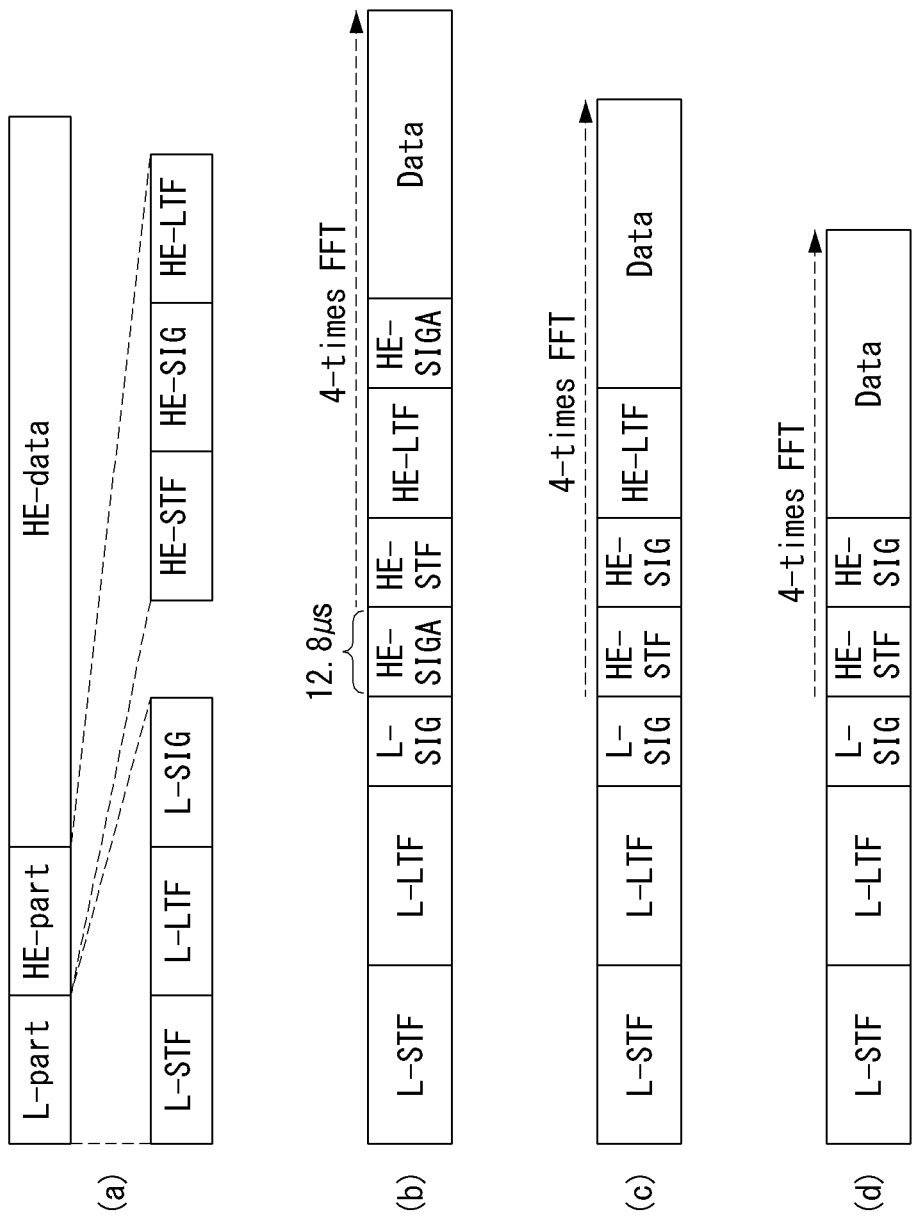
[FIG. 25]

| L-STF | L-LTF | L-SIG | HE-SIG A | HE-SIG B | HE-STF | HE-LTF | Data for STA1 |
| L-STF | L-LTF | L-SIG | HE-SIG A | | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

[FIG. 28]

| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

[FIG. 29]
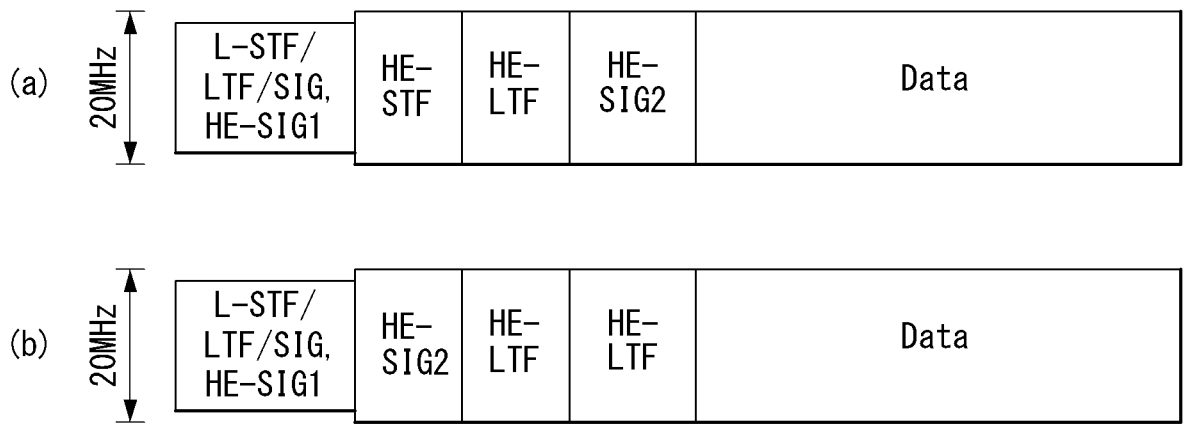
[FIG. 30]
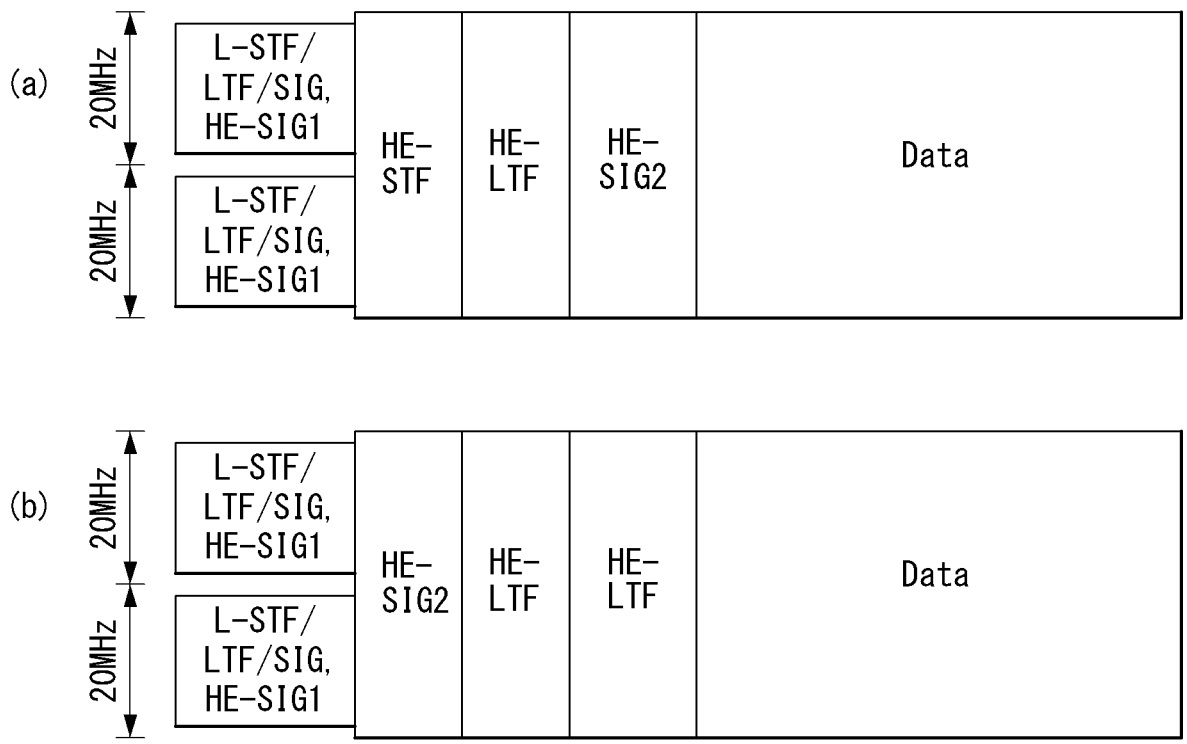

[FIG. 31]
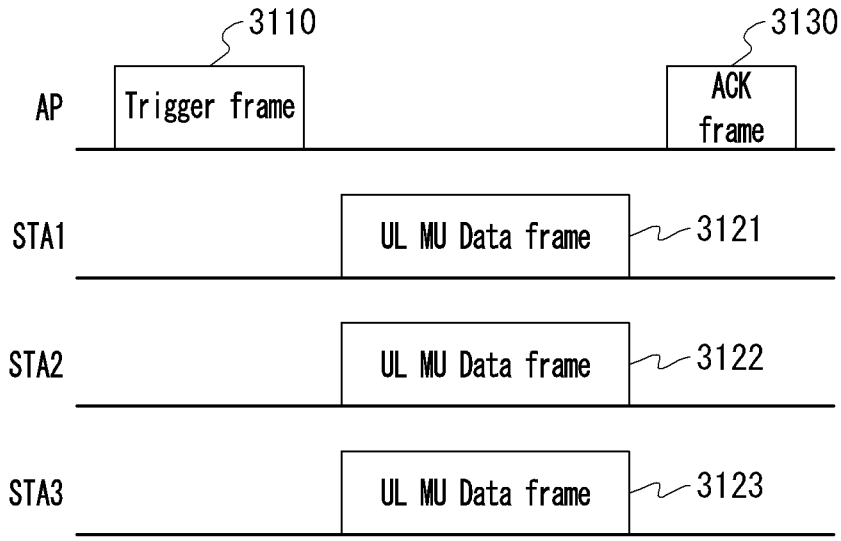
[FIG. 32]
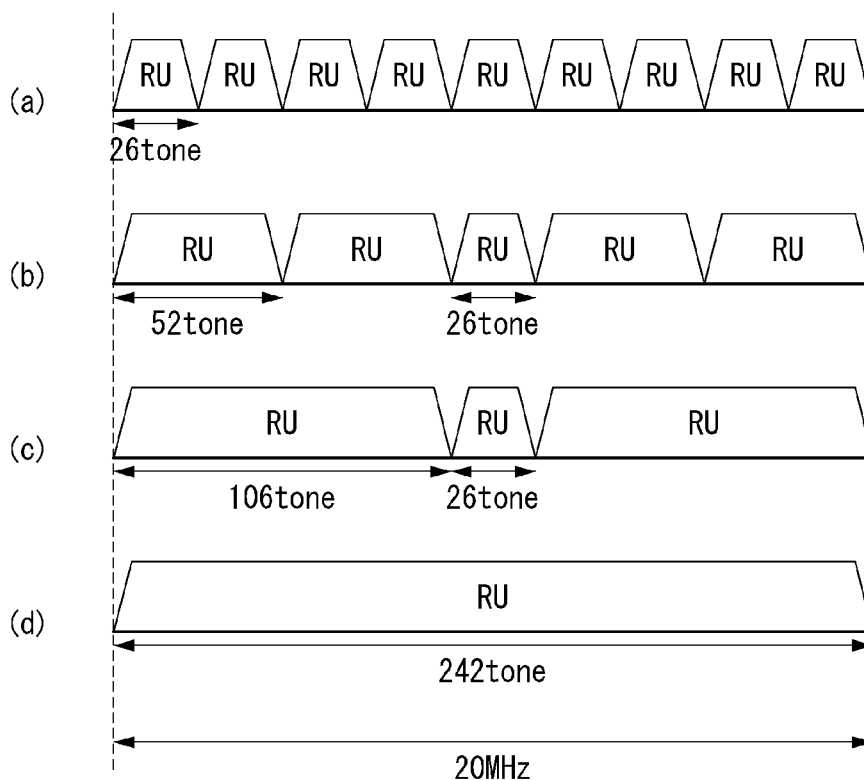

[FIG. 33]
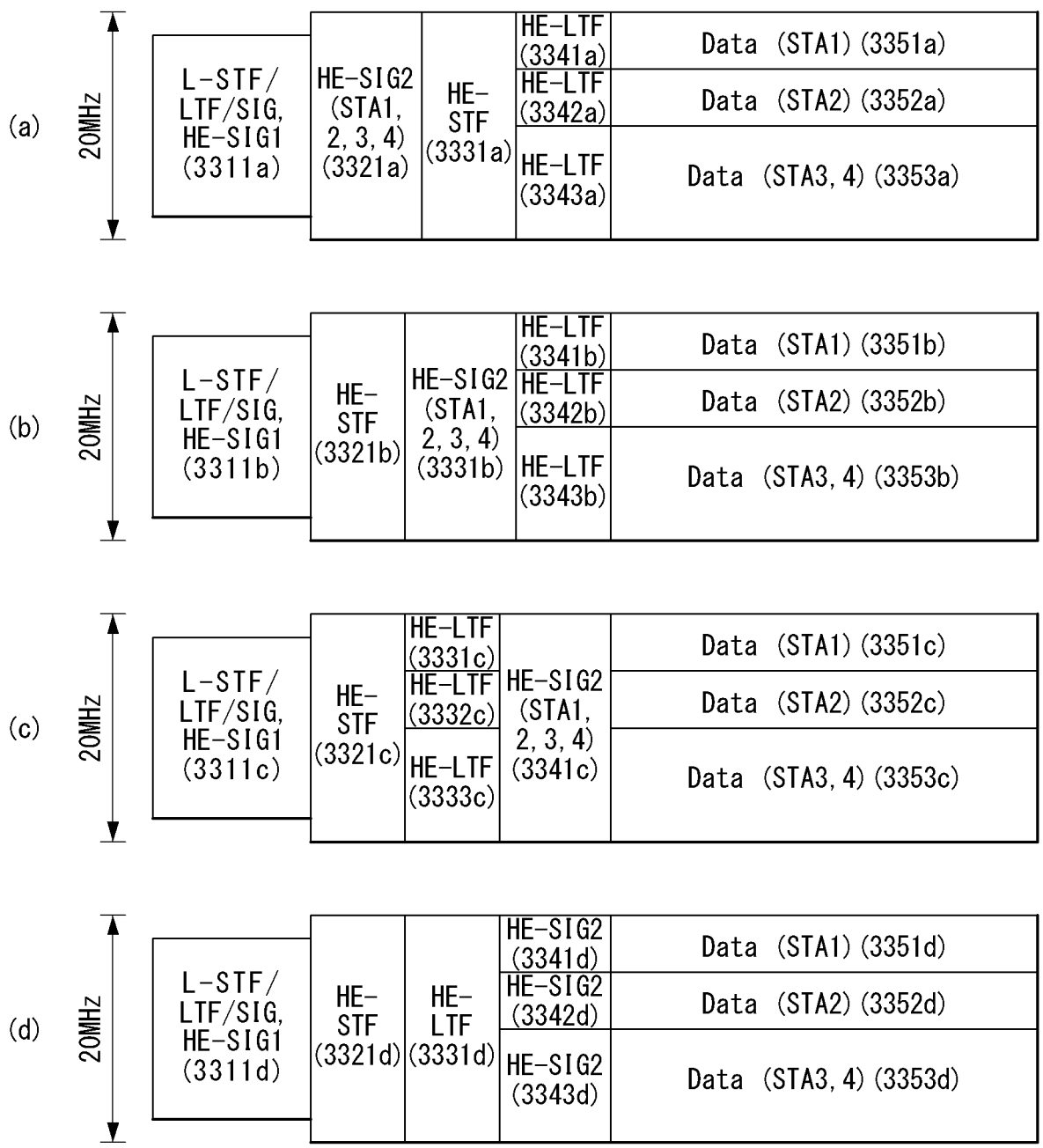

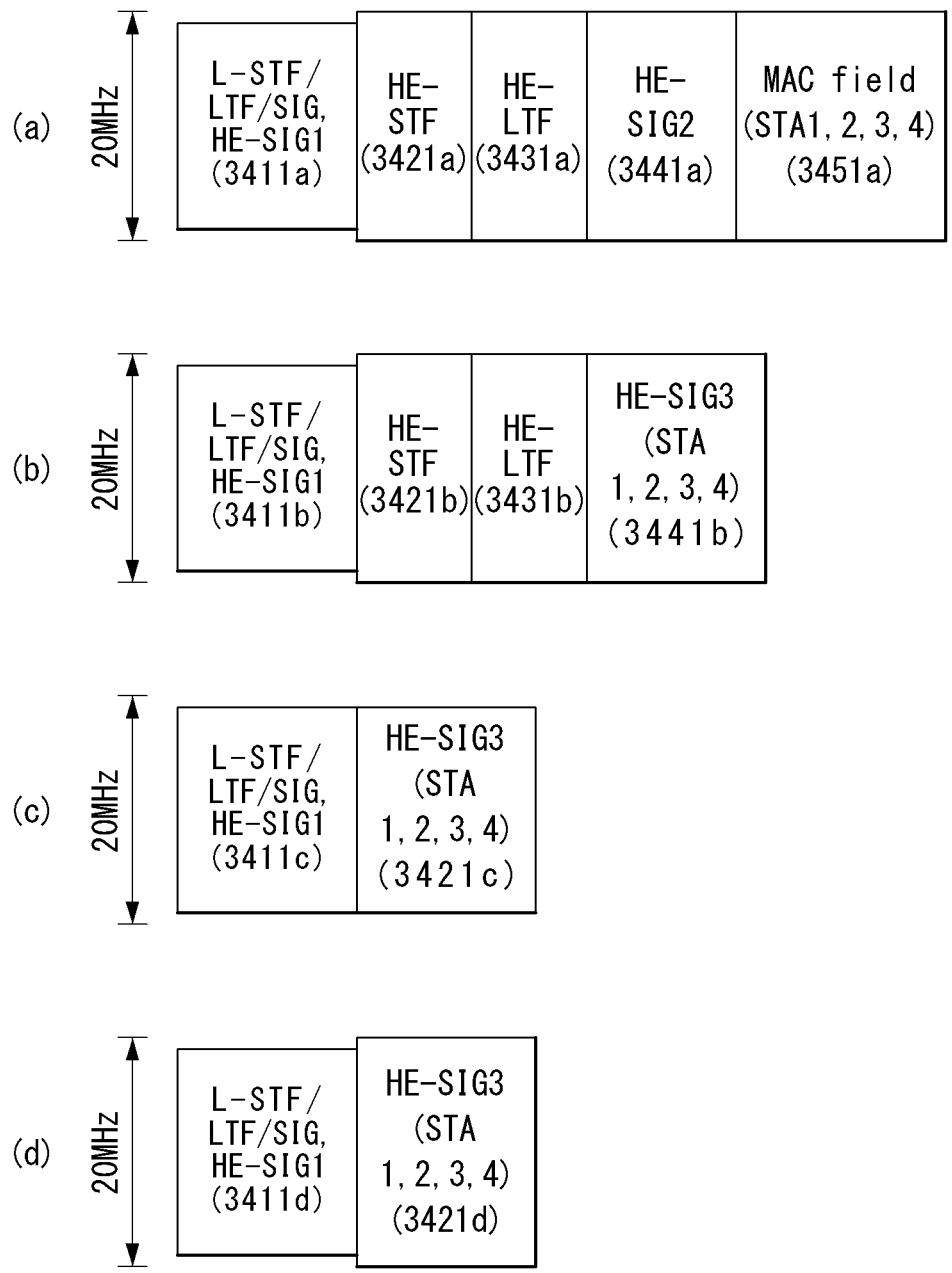
[FIG. 34]

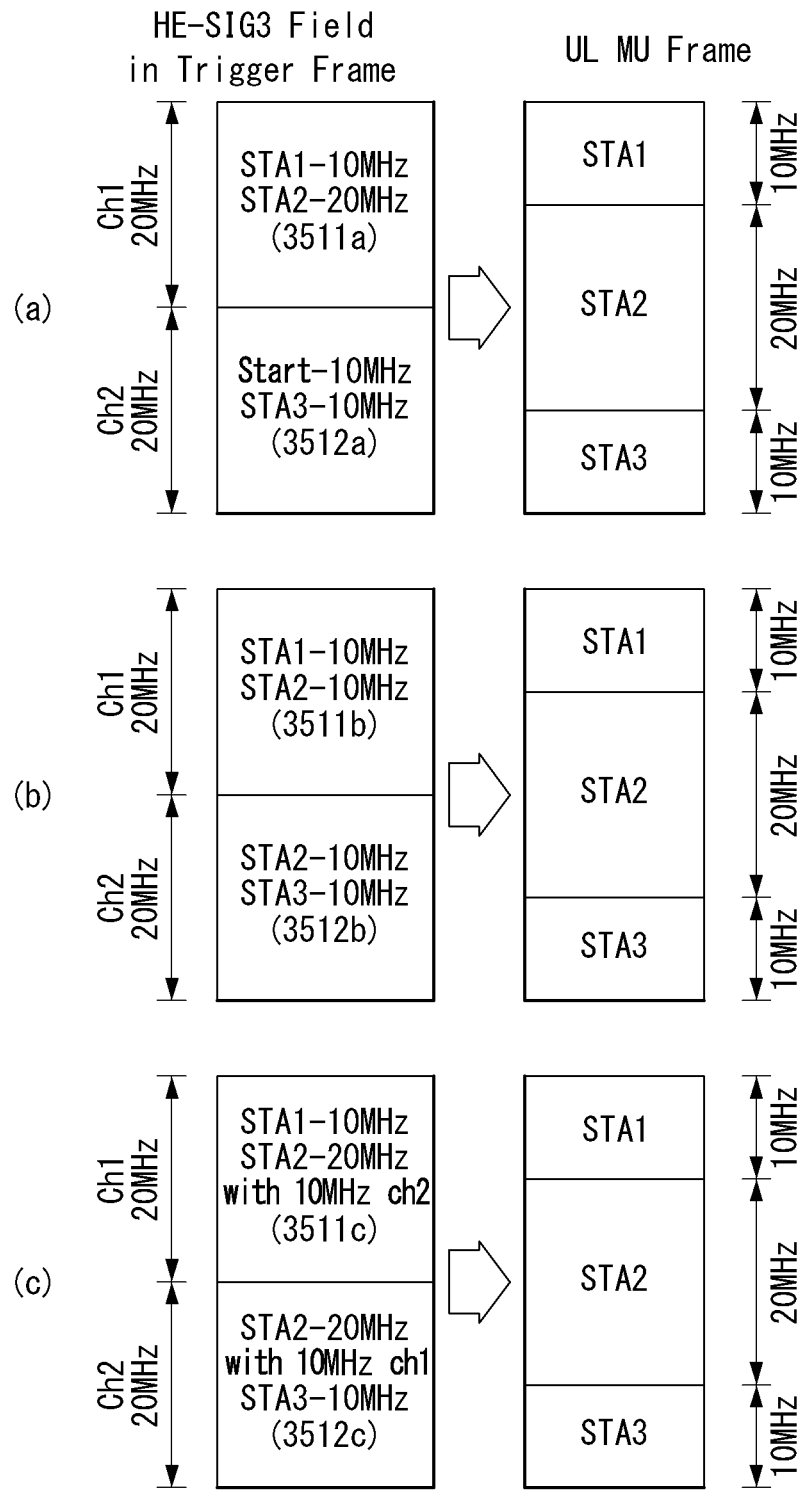
[FIG. 35]

[FIG. 36]
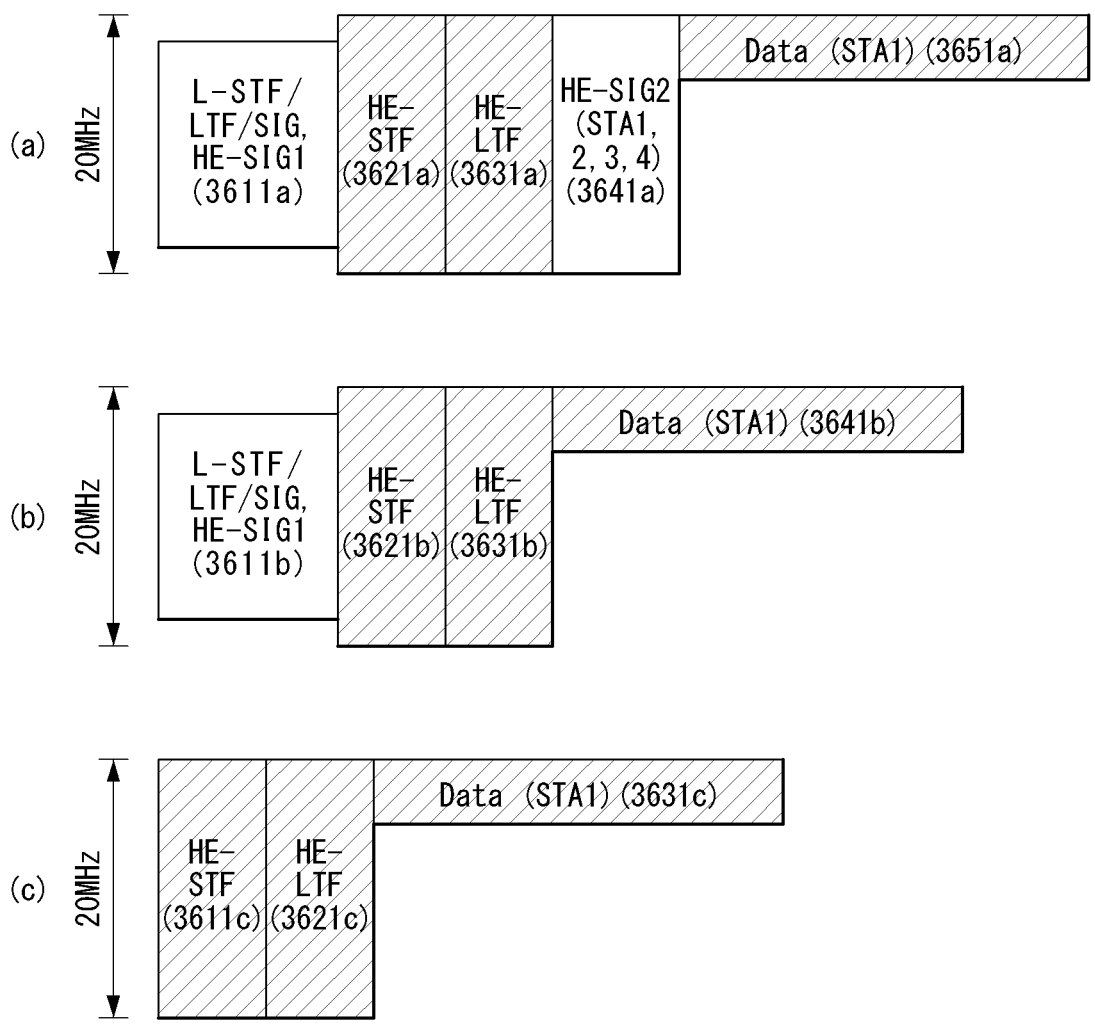

[FIG. 37]
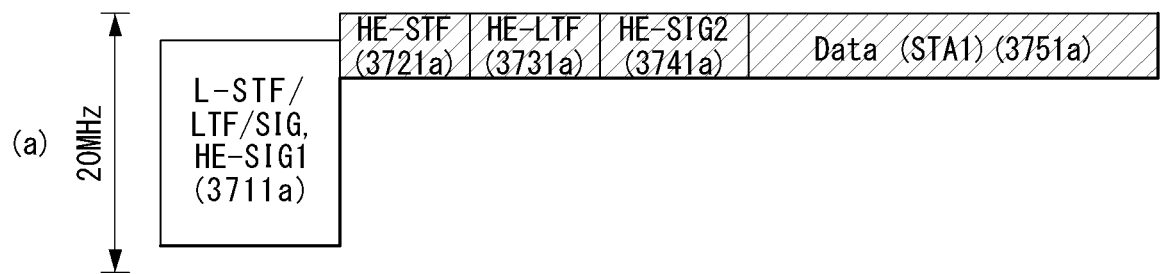
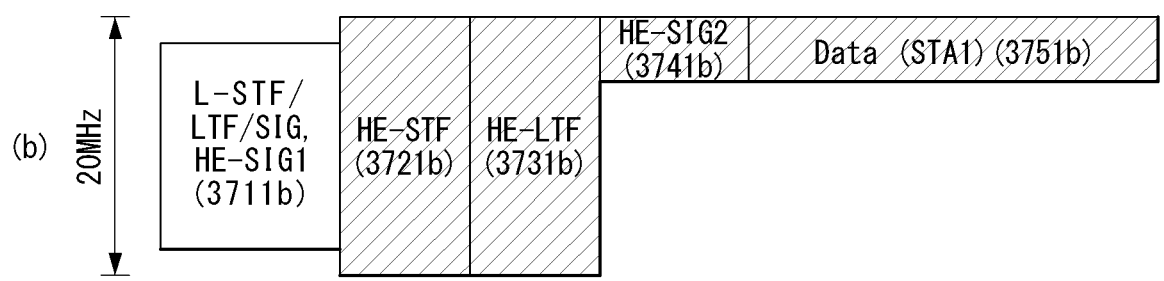

[FIG. 38]
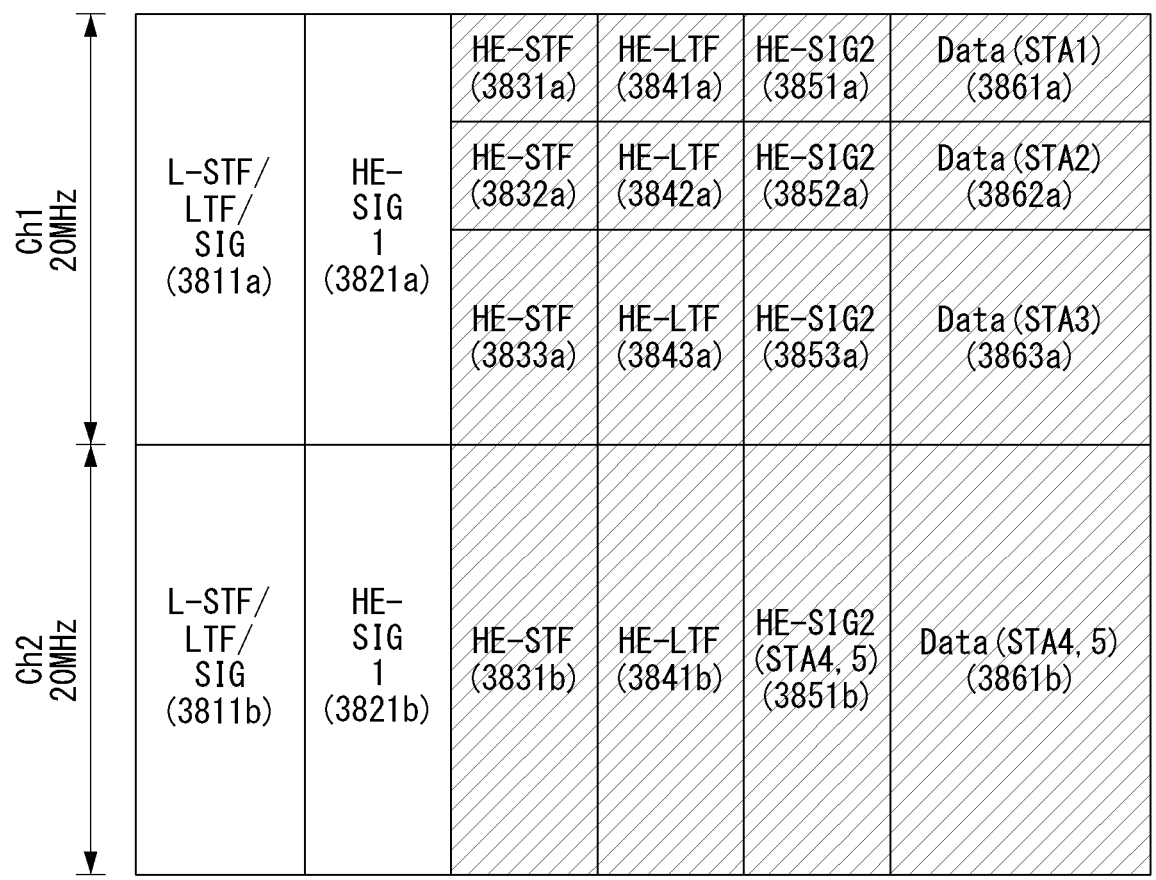

[FIG. 39]
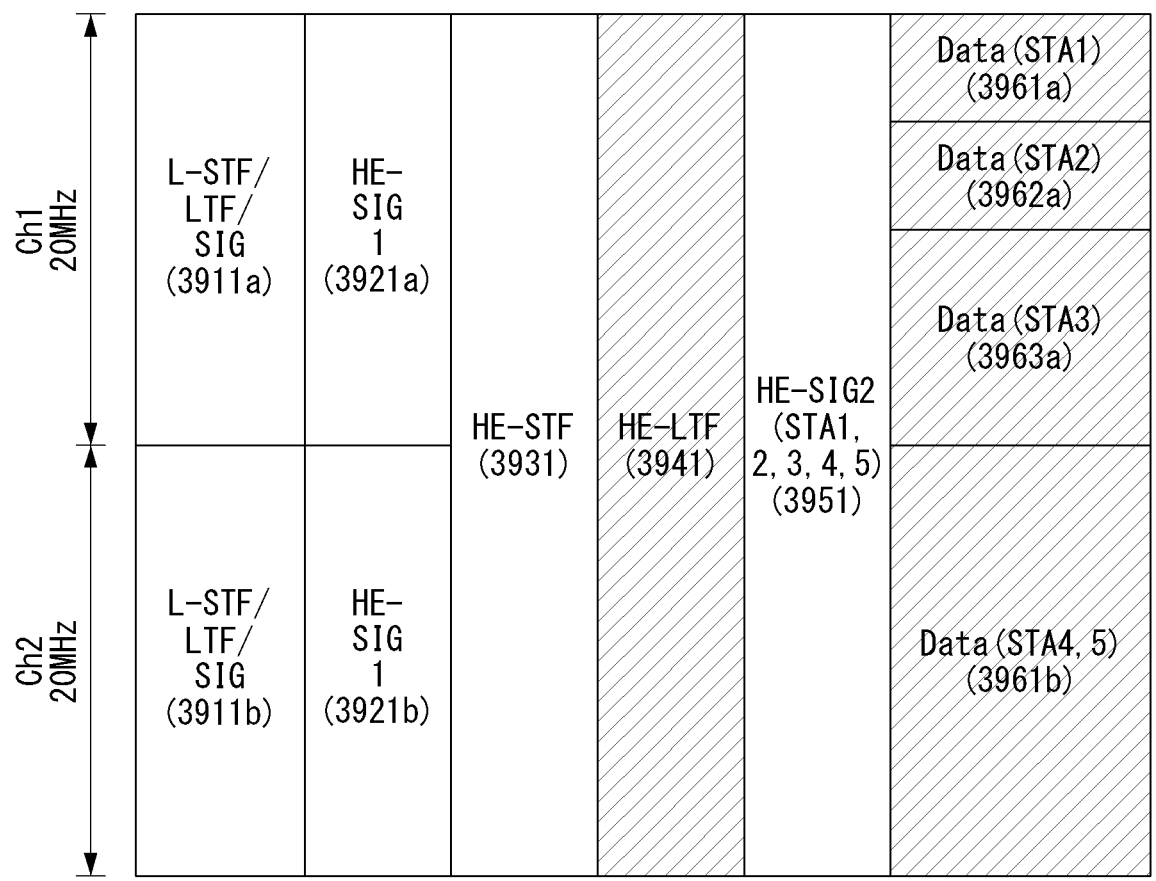

[FIG. 40]
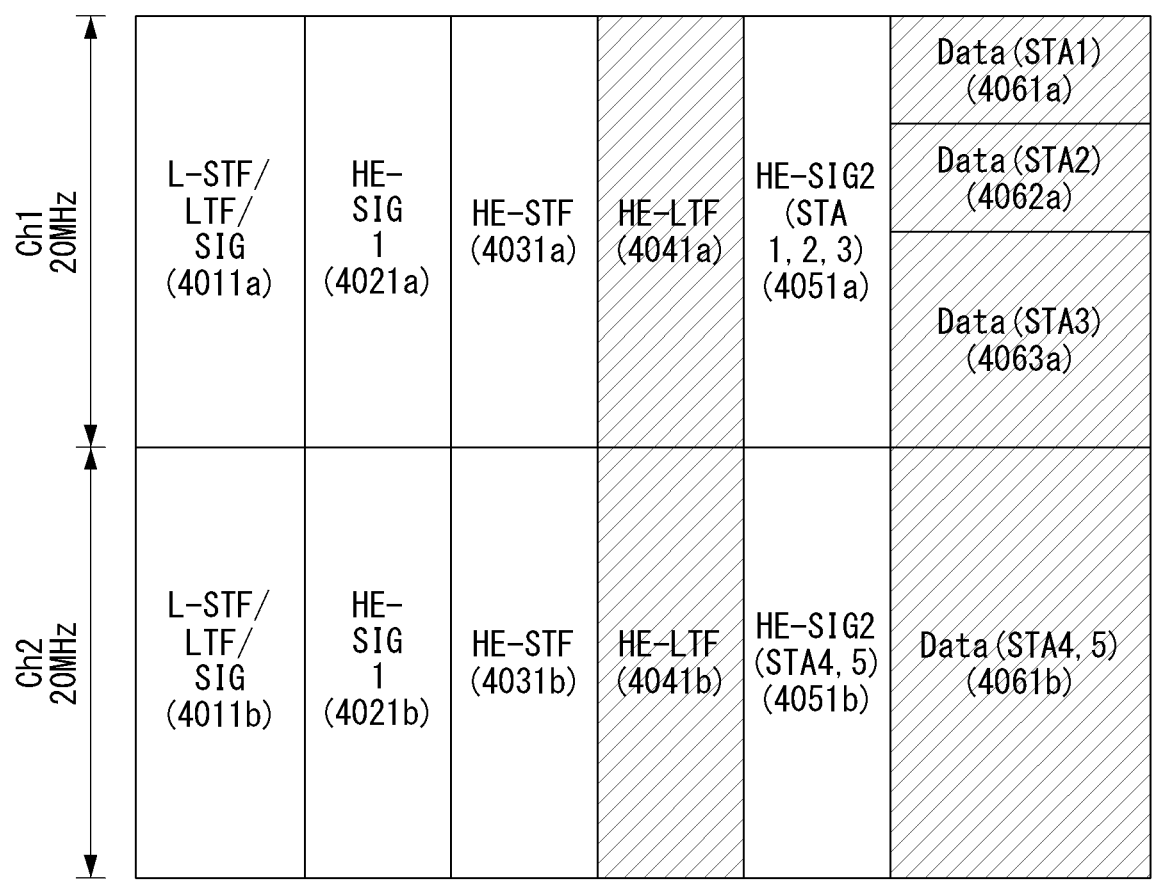

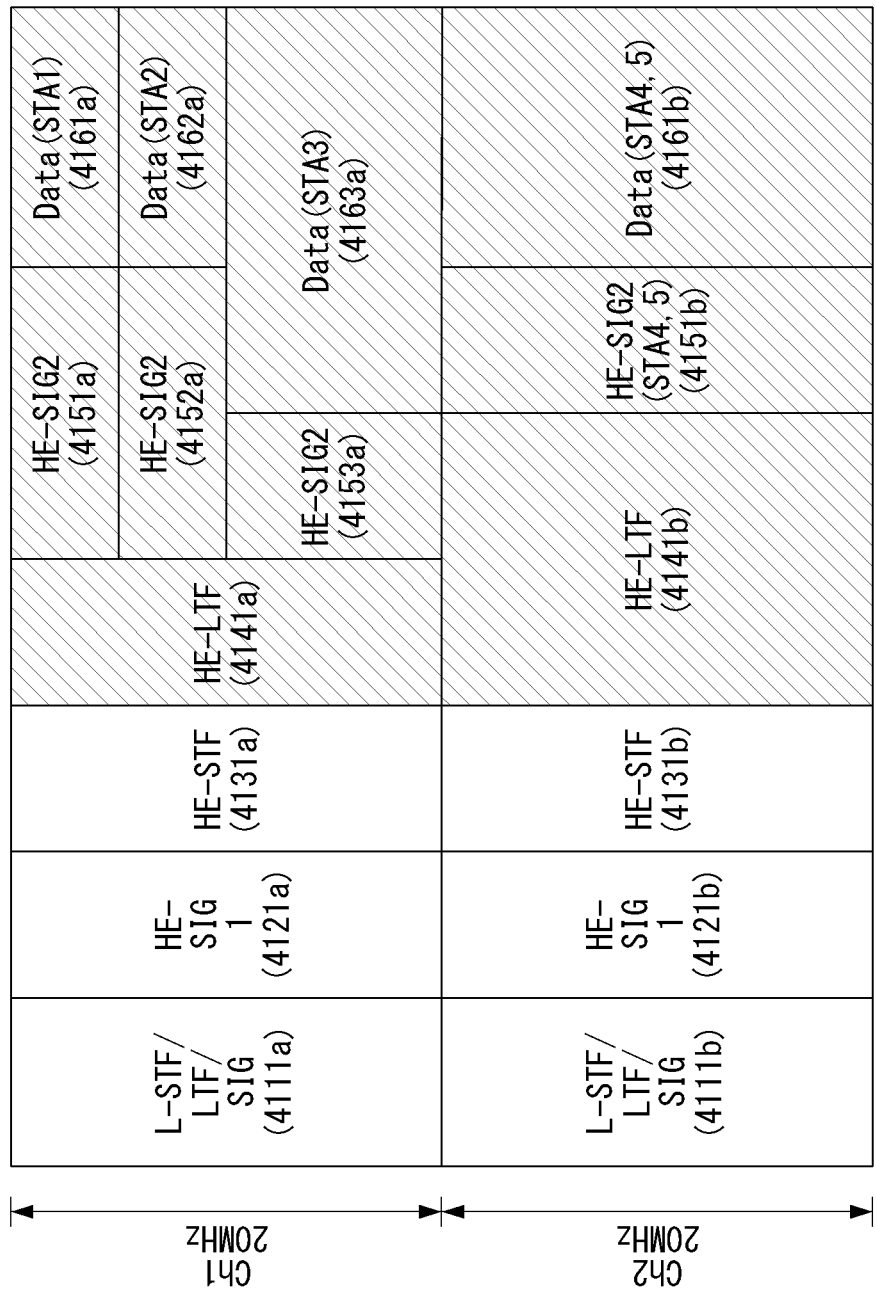
[FIG. 41]

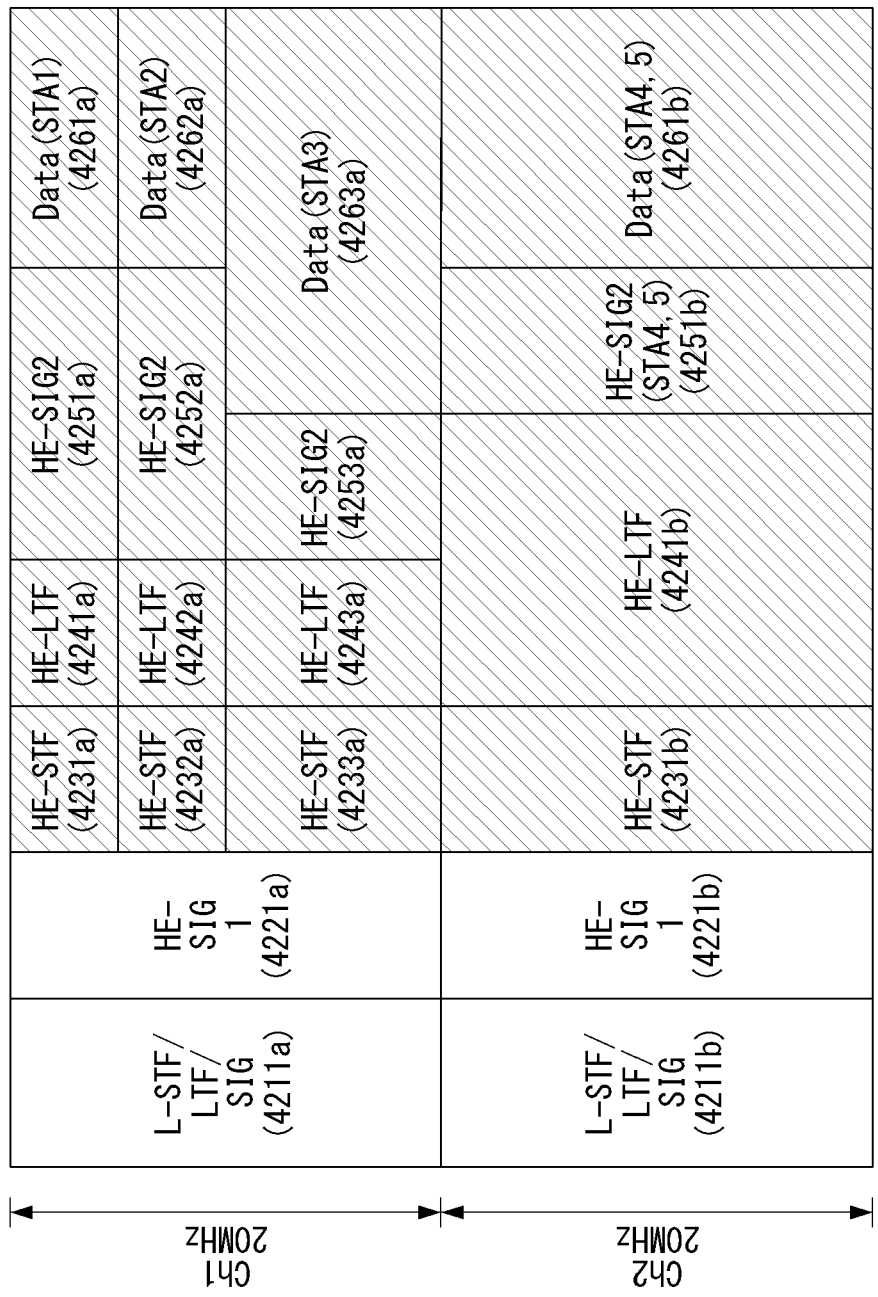
[FIG. 42]

[FIG. 43]
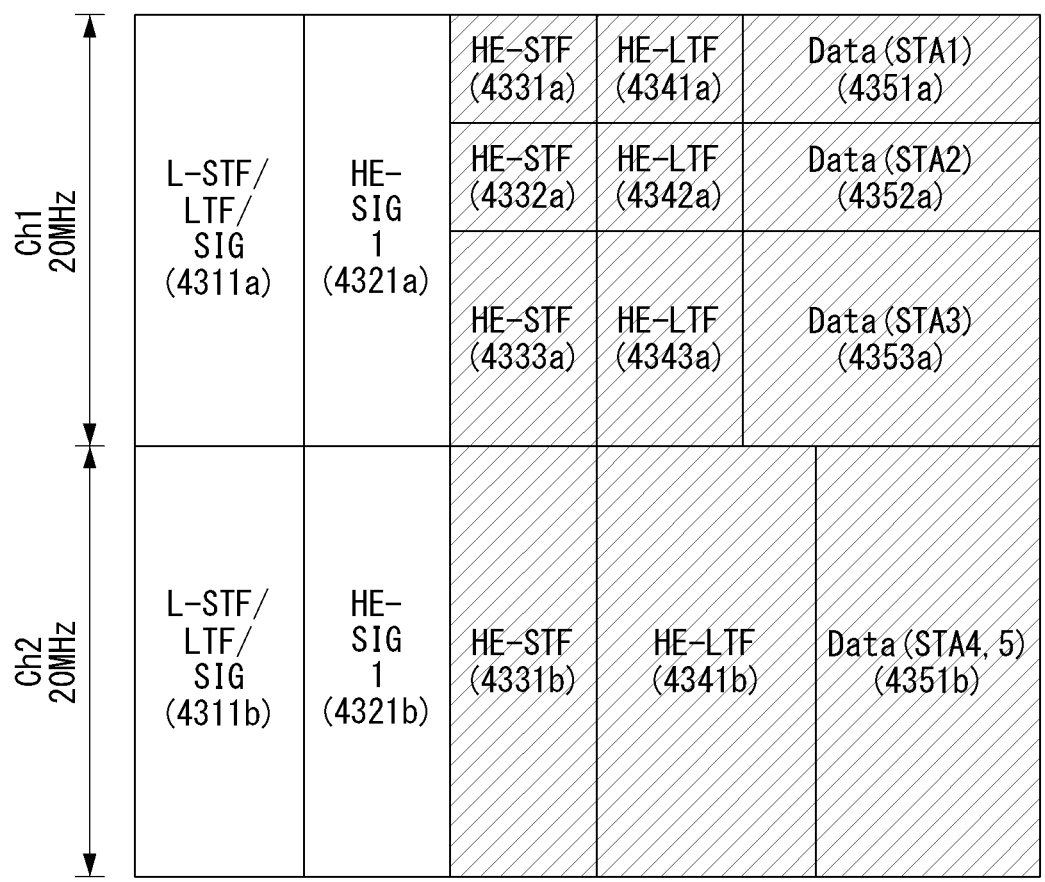

[FIG. 44]
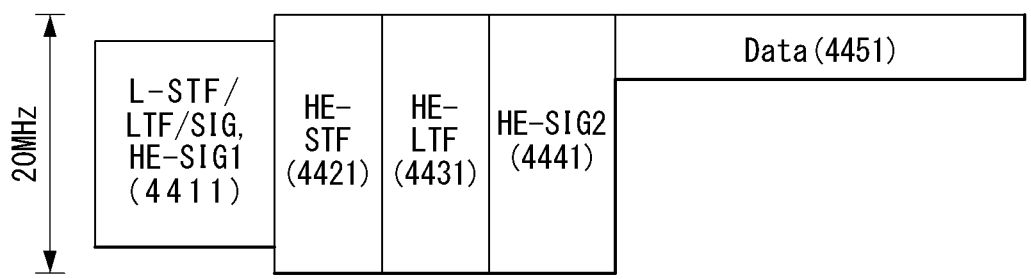

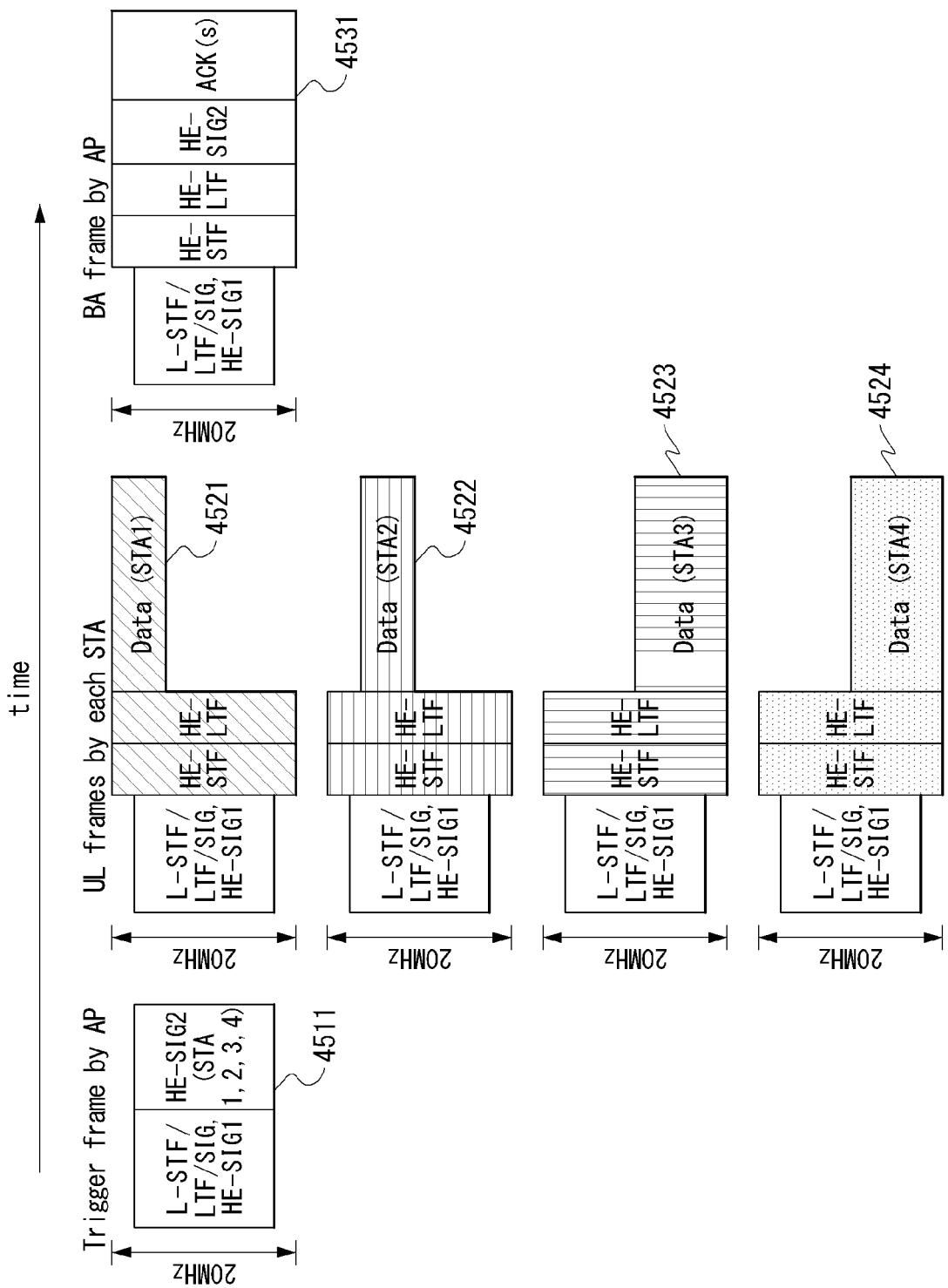
[FIG. 45]

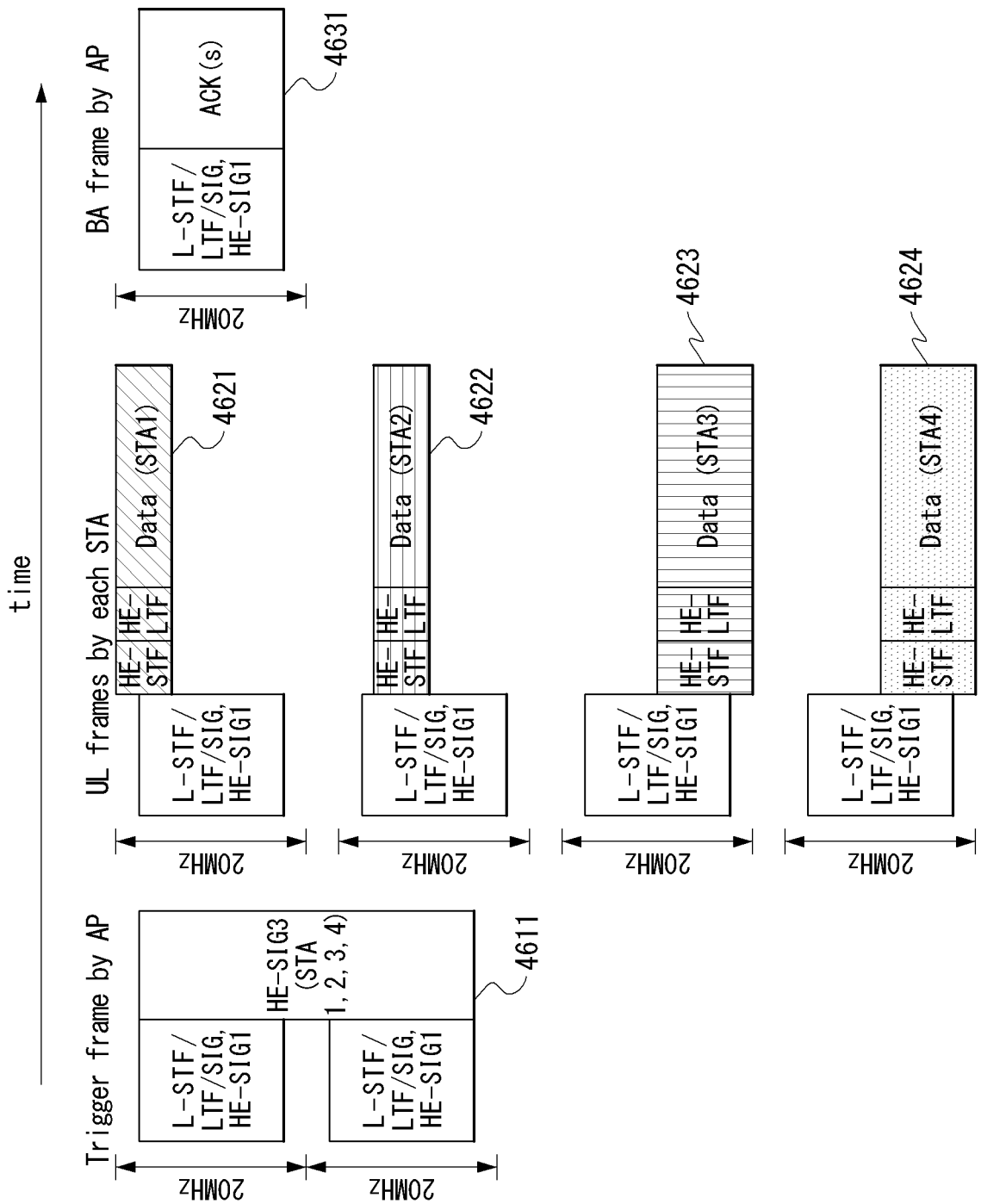
[FIG. 46]

[FIG. 47]
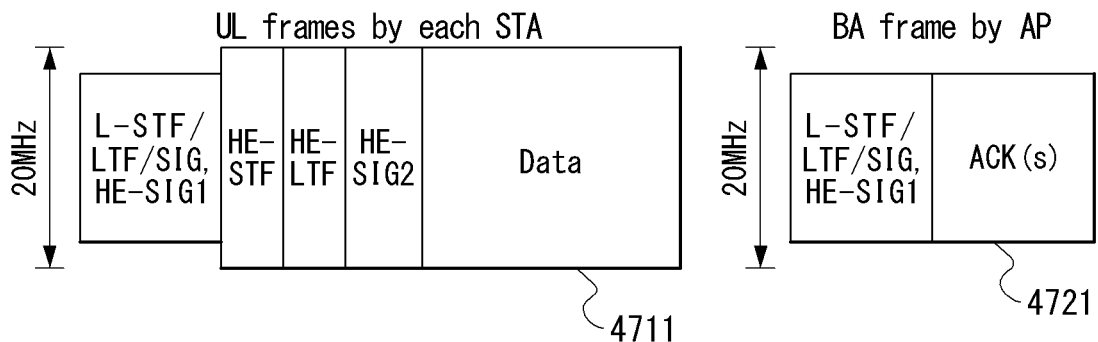
[FIG. 48]
4810
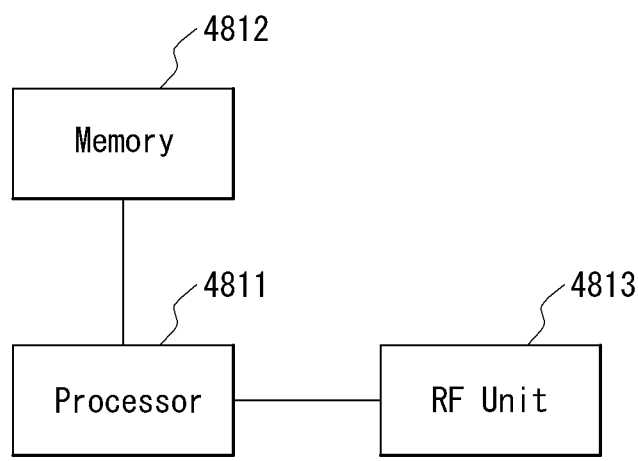

METHOD FOR UPLINK TRANSMISSION IN WIRELESS COMMUNICATION SYSTEM AND APPARATUS THEREFOR

CROSS REFERENCE TO RELATED APPLICATIONS

This application is the National Phase of PCT International Application No. PCT/KR2015/008780, filed on Aug. 21, 2015, which claims priority under 35 U.S.C. 119(e) to U.S. Provisional Application No. 62/040,387, filed on Aug. 21, 2014, and to U.S. Provisional Application No. 62/046,184, filed on Sep. 5, 2014, all of which are hereby expressly incorporated by reference into the present application.

TECHNICAL FIELD

The present invention relates to a wireless communication system and, more particularly, to a method for performing or supporting uplink single user/multi-user transmission and an apparatus for supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.1 lax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.1 lax and mobile communication will be further activated.

DISCLOSURE

Technical Problem

An aspect of the present invention provides an uplink single user or multi-user transmission method in a wireless communication system.

Another aspect of the present invention provides an uplink frame structure for supporting a single user or multi-user transmission in a wireless communication system.

The objects of the present invention are not limited to the technical objects described above, and other technical objects not mentioned herein may be understood to those skilled in the art from the description below.

Technical Solution

In an aspect of the present invention, a method for a uplink (UL) multi-user (MU) transmission by a station (STA) in a wireless communication system includes: receiving a trigger frame including frequency resource allocation information in a subband unit for orthogonal frequency division multiple access (OFDMA) transmission from an access point (AP); and transmitting a UL MU PPDU based on the frequency resource allocation information, wherein the UL MU PPDU includes a high efficiency-short training field (HE-STF), a high-efficiency-long training field (HE-LTF), and a data field, and the HE-STF, the HE-LTF, and the data field are transmitted in a subband indicated by the frequency resource allocation information.

In another aspect of the present invention, a station (STA) device performing uplink (UL) multi-user (MU) transmission in a wireless communication system includes: a radio frequency (RF) unit transmitting and receiving a wireless signal; and a processor, wherein the processor is configured to receive a trigger frame including frequency resource allocation information in a subband unit for orthogonal frequency division multiple access (OFDMA) transmission from an access point (AP) and transmit a UL MU PPDU based on the frequency resource allocation information, wherein the UL MU PPDU includes a high efficiency-short training field (HE-STF), a high-efficiency-long training field (HE-LTF), and a data field, and the HE-STF, the HE-LTF, and the data field are transmitted in a subband indicated by the frequency resource allocation information.

Preferably, the PPDU may further include an HE-SIGNAL-B (HE-SIG-B) field, and the HE-SIG-B field may include modulation and coding scheme (MCS) level information of the data field.

Preferably, the HE-SIG-B field may have a predetermined length.

Preferably, the UL MU PPDU may further include an HE-SIGNAL-A (HE-SIG-A) field, and a length of the HE-SIG-B field may be indicated by the HE-SIG-A field.

Preferably, the UL MU PPDU may be configured such that the HE-LTF follows the HE-STF and the HE-SIG-B field follows the HE-LTF, and the HE-SIG-B field may have the same discrete Fourier transform (DFT) period as that of the data field.

Preferably, length information of the UL MU PPDU may be indicated by the trigger frame, and the MCS level may be determined based on a length of the UL MU PPDU.

Preferably, the UL MU PPDU may further include a legacy preamble, and the legacy preamble may be transmitted in a 20 MHz bandwidth unit within a bandwidth of the UL MU PPDU.

Preferably, the UL MU PPDU may further include a legacy preamble, and the legacy preamble may be transmitted only in a 20 MHz band to which a subband indicated by the frequency resource allocation information belongs.

In another aspect of the present invention, a method for a uplink (UL) single user (SU) transmission by a station (STA) in a wireless communication system includes: transmitting, by the STA, a UL SU PPDU in a subband unit for orthogonal frequency division multiple access (OFDMA) transmission, wherein the UL SU PPDU includes a high efficiency-short training field (HE-STF), a high-efficiency-long training field (HE-LTF), and a data field, and the HE-STF, the HE-LTF, and the data field are transmitted in a predetermined subband.

In another aspect of the present invention, a station (STA) device performing uplink (UL) single user (SU) transmission in a wireless communication system includes: a radio frequency (RF) unit transmitting and receiving a wireless signal; and a processor, wherein the processor is configured such that the STA transmits a UL SU PPDU in a subband unit for orthogonal frequency division multiple access (OFDMA) transmission, the UL MU PPDU includes a high efficiency-short training field (HE-STF), a high-efficiency-long training field (HE-LTF), and a data field, and the HE-STF, the HE-LTF, and the data field are transmitted in a predetermined subband.

Preferably, the PPDU may further include an HE-SIGNAL-B (HE-SIG-B) field, and the HE-SIG-B field may include modulation and coding scheme (MCS) level information of the data field.

Preferably, the HE-SIG-B field may have a predetermined length.

Preferably, the UL MU PPDU may further include an HE-SIGANL-A (HE-SIG-A) field, and a length of the HE-SIG-B field may be indicated by the HE-SIG-A field.

Preferably, it may be configured such that the HE-LTF follows the HE-STF and the HE-SIG-B field follows the HE-LTF, and the HE-SIG-B field may have the same discrete Fourier transform (DFT) period as that of the data field.

Advantageous Effects

According to an embodiment of the present invention, a plurality of users may smoothly perform multi-user transmission through mutually independent resources in a wireless communication system.

Also, according to an embedment of the present invention, an uplink single user transmission may be supported in units of subbands in a wireless communication system.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is a diagram illustrating an example of IEEE 802.11 system to which the present invention may be applied.

FIG. 2 is a diagram exemplifying a structure of layer architecture in IEEE 802.11 system to which the present invention may be applied.

FIG. 3 exemplifies a non-HT format PPDU and an HT format PPDU of a wireless communication system to which the present invention may be applied.

FIG. 4 exemplifies a VHT format PPDU of a wireless communication system to which the present invention may be applied.

FIG. 5 is a diagram exemplifying a constellation for distinguishing a format of PPDU in a wireless communication system to which the present invention may be applied.

FIG. 6 exemplifies a MAC frame format in IEEE 802.11 system to which the present invention may be applied.

FIG. 7 is a diagram illustrating a frame control field in an MAC frame in the wireless communication system to which the present invention may be applied.

FIG. 8 is a view illustrating a VHT format of an HT control field in a wireless communication system to which the present invention is applicable.

FIG. 9 is a diagram illustrating a random backoff period and a frame transmission procedure in a wireless communication system to which an embodiment of the present invention may be applied.

FIG. 10 is a diagram illustrating an IFS relation in a wireless communication system to which an embodiment of the present invention may be applied.

FIG. 11 is a diagram for conceptually describing a channel sounding method in the wireless communication system to which the present invention can be applied.

FIG. 12 is a diagram illustrating a VHT NDPA frame in the wireless communication system to which the present invention may be applied.

FIG. 13 is a diagram illustrating an NDP PPDU in the wireless communication system to which the present invention may be applied.

FIG. 14 is a diagram illustrating a VHT compressed beamforming frame format in the wireless communication system to which the present invention may be applied.

FIG. 15 is a diagram illustrating a beamforming report poll frame format in the wireless communication system to which the present invention may be applied.

FIG. 16 is a diagram illustrating a Group ID management frame in the wireless communication system to which the present invention may be applied.

FIG. 17 is a view illustrating a downlink (DL) multi-user PPDU format in a wireless communication system to which the present invention is applicable.

FIG. 18 is a view illustrating a DL multi-user PPDU format in a wireless communication system to which the present invention is applicable.

FIG. 19 is a diagram illustrating a downlink MU-MIMO transmission process in the wireless communication system to which the present invention may be applied.

FIG. 20 is a view illustrating an ACK frame in a wireless communication system to which the present invention is applicable.

FIG. 21 is a view illustrating an ACK block request frame in a wireless communication system to which the present invention is applicable.

FIG. 22 is a view illustrating a BAR information field of a block ACK request frame in a wireless communication system to which the present invention is applicable.

FIG. 23 is a view illustrating a block ACK frame in a wireless communication system to which the present invention is applicable.

FIG. 24 is a view illustrating a BA information field of the block ACK frame in a wireless communication system to which the present invention is applicable.

FIG. 25 is diagrams illustrating a high efficiency (HE) format PPDU according to an embodiment of the present invention.

FIGS. 26 to 28 are a diagram illustrating an HE format PPDU according to an embodiment of the present invention.

FIG. 29 is a view illustrating an HE format PPDU of an 20 MHz band according to an embodiment of the present invention.

FIG. 30 is a view illustrating an HE format PPDU of 40 MHz band according to an embodiment of the present invention.

FIG. 31 is a diagram illustrating an uplink multi-user transmission procedure according to an embodiment of the present invention.

FIG. 32 is a view illustrating a resource allocation unit in an OFDMA MU transmission scheme according to an embodiment of the present invention.

FIG. 33 is a view illustrating a DL MU frame according to an embodiment of the present invention.

FIG. 34 is a view illustrating a structure of a trigger frame according to an embodiment of the present invention.

FIG. 35 is a view illustrating a resource allocation method in a trigger frame according to an embodiment of the present invention.

FIG. 36 is a view illustrating a structure of a UL MU frame according to an embodiment of the present invention.

FIG. 37 is a view illustrating a structure of a UL frame according to an embodiment of the present invention.

FIGS. 38 to 43 are views illustrating structures of a UL MU frame according to an embodiment of the present disclosure.

FIG. 44 is a view illustrating a configuration of a UL SU frame according to an embodiment of the present invention.

FIGS. 45 and 46 are views illustrating a UL MU transmission method and a frame structure supporting the same according to an embodiment of the present invention.

FIG. 47 is a view illustrating a UL MU transmission method and a frame structure supporting the same according to an embodiment of the present invention.

FIG. 48 is a block diagram exemplifying a wireless apparatus according to an embodiment of the present invention.

BEST MODES

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Specific terminologies used in the description below may be provided to help the understanding of the present invention. And, the specific terminology may be modified into other forms within the scope of the technical concept of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram exemplifying a structure of layer architecture in IEEE 802.11 system to which the present invention may be applied.

Referring to FIG. 2, the layer architecture in the IEEE 802.11 system may include Medium Access Control (MAC) sublayer/layer and PHY sublayer/layer.

The PHY sublayer may be divided into a Physical Layer Convergence Procedure (PLCP) entity and a Physical Medium Dependent (PMD) entity. In this case, the PLCP entity performs a role of connecting the MAC sublayer and a data frame, and the PMD entity performs a role of wirelessly transmitting and receiving data with two or more STAs.

Both of the MAC sublayer and the PHY sublayer may include management entities, and each of them may be referred to MAC Sublayer Management Entity (MLME) and Physical Sublayer Management Entity (PLME), respectively. These management entities provide a layer management service interface through an operation of layer management function. The MLME may be connected to the PLME, and perform a management operation of MAC sublayer, and similarly, the PLME may be connected to the MLME, and perform a management operation of PHY sublayer.

In order to provide an accurate MAC operation, a Station Management Entity (SME) may be existed in each STA. The SME is a management entity independent from each layer, and collects layer based state information from the MLME and the PLME or configures a specific parameter value of each layer. The SME may perform such a function by substituting general system management entities, and may implement a standard management protocol.

The MLME, the PLME and the SME may interact in various methods based on a primitive. Particularly, XX-GET.request primitive is used for requesting a Management Information Base (MIB) attribute value. XX-GET.confirm primitive returns the corresponding MIB attribute value when the state of it is in 'SUCCESS', otherwise, returns a state field with an error mark. XX-SET.request primitive is used for requesting to configure a designated MIB attribute to a given value. When the MIB attribute signifies a specific operation, the request requests an execution of the specific operation. And, when a state of XX-SET.request primitive is in 'SUCCESS', this means that the designated MIB attribute is configured as the requested value. When the MIB attribute signifies a specific operation, the primitive is able to verify that the corresponding operation is performed.

The operation in each sublayer will be briefly described as follows.

MAC sublayer generates one or more MAC Protocol Data Unit (MPDU) by attaching a MAC header and Frame Check Sequence (FCS) to a MAC Service Data Unit (MSDU) delivered from a higher layer (e.g., LLC layer) or a fragment of the MSDU. The generated MPDU is delivered to PHY sublayer.

When an aggregated MSDU (A-MSDU) scheme is used, a plurality of MSDUs may be merged into one A-MSDU. The MSDU merging operation may be performed in a MAC higher layer. The A-MSDU is delivered to PHY sublayer as a single MPDU (i.e., not being fragmented).

PHY sublayer generates a Physical Protocol Data Unit (PPDU) by attaching an additional field that includes required information to a Physical Service Data Unit (PSDU) received from MAC sublayer by a physical layer transceiver. The PPDU is transmitted through a wireless medium.

Since the PSDU is a unit that PHY sublayer receives from MAC sublayer and MPDU is a unit that MAC sublayer transmits to PHY sublayer, the PSDU is the same as the MPDU, substantially.

When an aggregated MPDU (A-MPDU) scheme is used, a plurality of MPDUs (in this case, each MPDU may carry the A-MPDU) may be merged into a single A-MPDU. The MPDU merging operation may be performed in a MAC lower layer. Various types of MPDU (e.g., QoS data, Acknowledge (ACK), block ACK, etc.) may be merged into the A-MPDU. PHY sublayer receives the A-MPDU from MAC sublayer as a single PSDU. That is, the PSDU includes a plurality of MPDUs. Accordingly, the A-MPDU is transmitted through a wireless medium within a single PPDU.

Physical Protocol Data Unit (PPDU) Format

A Physical Protocol Data Unit (PPDU) signifies a data block which is generated in physical layer. Hereinafter, the PPDU format will be described based on IEEE 802.11 WLAN system to which the present invention may be applied.

FIG. 3 exemplifies a non-HT format PPDU and an HT format PPDU of a wireless communication system to which the present invention may be applied.

FIG. 3(a) exemplifies the non-HT format for supporting IEEE 802.11a/g system. The non-HT PPDU may also be called a legacy PPDU.

Referring to FIG. 3(a), the non-HT format PPDU includes a legacy format preamble that includes a Legacy (or Non-HT) Short Training field (L-STF), a Legacy (or Non-HT) Long Training field (L-LTF) and a Legacy (or Non-HT) SIGNAL (L-SIG) field, and a data field.

The L-STF may include a short training orthogonal frequency division multiplexing (OFDM). The L-STF may be used for frame timing acquisition, Automatic Gain Control (AGC), diversity detection and coarse frequency/time synchronization.

The L-LTF may include a long training orthogonal frequency division multiplexing (OFDM) symbol. The L-LTF may be used for fine frequency/time synchronization and channel estimation.

The L-SIG field may be used for transmitting control information for demodulating and decoding a data field.

The L-SIG field includes a 4-bit Rate field, a 1-bit Reserved bit, a 12-bit Length field, a 1-bit parity bit, and a 6-bit Signal Tail field.

The rate field includes rate information, and the length field indicates the number of octets of the PSDU.

FIG. 3(b) exemplifies an HT-mixed format PPDU for supporting both IEEE 802.11n system and IEEE 802.11a/g system.

Referring to FIG. 3(b), the HT-mixed format PPDU includes an HT format preamble that includes a legacy format preamble including the L-STF, the L-LTF and the L-SIG field, an HT-Signal (HT-SIG) field, an HT Short Training field (HT-STF) and an HT Long Training field (HT-LTF), and a data field.

Since the L-STF, the L-LTF and the L-SIG field signify legacy fields for backward compatibility, the fields from the L-STF to the L-SIG field are identical to those of the non-HT format. The L-STA may interpret a data field through the L-STF, the L-LTF and the L-SIG field even though the L-STA receives a HT-mixed PPDU. However, the L-LTF may further include information for channel estimation such that an HT-STA receives the HT-mixed PPDU and demodulates the L-SIG field and the HT-SIG field.

The HT-STA may notice that the field behind the legacy field is the HT-mixed format PPDU using the HT-SIG field, and based on this, the HT-STA may decode the data field.

The HT-LTF field may be used for channel estimation for demodulating the data field. Since IEEE 802.11n standard supports Single-User Multi-Input and Multi-Output (SU-MIMO), a plurality of the HT-LTF fields may be included for the channel estimation with respect to each data field transmitted via a plurality of spatial streams.

The HT-LTF field may include a data HT-LTF used for channel estimation with respect to spatial stream and an extension HT-LTF additionally used for full channel sounding. Accordingly, the number of a plurality of HT-LTF may be equal to or more than the number of transmitted spatial stream.

In the HT-mixed format PPDU, the L-STF, the L-LTF and the L-SIG field are firstly transmitted such that an L-STA also receives and acquires data. Later, the HT-SIG field is transmitted for demodulating and decoding the data transmitted for the HT-STA.

Up to the HT-SIG field, fields are transmitted without performing beamforming such that the L-STA and the HT-STA receive the corresponding PPDU and acquire data, and wireless signal transmission is performed through precoding for the HT-STF, the HT-LTF and the data field, which are transmitted later. Herein, the plurality of HT-LTF and the data field are transmitted after transmitting the HT-STF such that the STA that receives data through precoding may consider the part in which power is varied by precoding.

Table 1 below illustrates an HT-SIG field.

FIG. 3(c) exemplifies an HT-greenfield (HT-GF) format PPDU for supporting IEEE 802.11n system only.

Referring to FIG. 3(c), the HT-GF format PPDU includes an HT-GF-STF, an HT-LTF1, an HT-SIG field, a plurality of HT-LTF2 and a data field.

The HT-GF-STF is used for frame time acquisition and AGC.

The HT-LTF1 is used for channel estimation.

The HT-SIG field is used for demodulating and decoding the data field.

The HT-LTF2 is used for channel estimation for demodulating the data field. Similarly, since the HT-STA requires channel estimation for each data field transmitted via a plurality of spatial streams due to the use of SU-MIMO, a plurality of HT-LTF2 may be included.

The plurality of HT-LTF2 may include a plurality of DATA HT-LTF and a plurality of extension HT-LTF, similar to the HT-LTF field of the HT-mixed PPDU.

In FIGS. 3(a) to 3(c), the data field is a payload, and the data field may include a SERVICE field, a scrambled PSDU field, Tail bits, and padding bits. All bits of the data field are scrambled.

FIG. 3(d) illustrates a service filed included in a data field. The service field has 16 bits. The bits are numbered by #0 to #15 and sequentially transmitted, starting from bit #0. #0 to #6 bits are set to 0 and used for synchronizing a descrambler of a receiver.

In order to effectively utilize radio channels, IEEE 802.11ac WLAN system supports a transmission of downlink Multi User Multiple Input Multiple Output (MU-MIMO) scheme in which a plurality of STAs access channel simultaneously. According to the MU-MIMO transmission scheme, an AP may transmit packets to one or more STAs that are paired by MIMO simultaneously.

TABLE 1

| Field | Bit | Description |
| --- | --- | --- |
| Modulation and Coding Scheme) | 7 | It indicates a modulation and coding scheme |
| CBW 20/40 | 1 | It is 0 when higher than 20 MHz or lower than 40 MHz, and 1 in the case of 40 MHz |
| HT (Length) | 16 | It indicates the number of octets of data of PDSU |
| Smoothing | 1 | It is 1 when channel estimation smoothing is recommended, and 0 when channel estimation is recommended by carriers independently (unsmoothing) |
| Not Sounding | 1 | It is 0 when PPDU is sounding PPDU and 1 when PPDU is not sounding PPDU |
| Reserved | 1 | It is set to 1 |
| Aggregation | 1 | It is 1 when PPDU includes A-MPDU and 0 in otherwise case |
| STBC | 2 | It indicates difference between the number of spact-time streams (NSTS) and the number of spatial streams (NSS) indicated by MCS It is 00 when STBC is not in use |
| FEC coding | 1 | It is 1 when low-density parity check (LDPC) is in use and 0 when binary convolutional code (BCC) is in use |
| Short GI | 1 | It is 1 when short GI is in use after HT training and 0 in otherwise case |
| Number of extension spatial streams | 2 | It indicates the number of extension spatial stream (NESS). It is 0 when there is no NESS, 1 in the case of one NESS, 2 in the case of two NESSs, and 3 in the case of three NESSs |
| CRC | 8 | It includes CRC for detecting error of PPDU in recipient |
| Tail Bits | 6 | It is used for trellis termination of convolutional decoder. it is set to 0 |

A downlink multi-user (DL MU) transmission means a technique that an AP transmits a PPDU to a plurality of non-AP STAs through the same time resource through one or more antennas.

Hereinafter, the MU PPDU means a PPDU that transmits one or more PSDUs for one or more STAs using the MU-MIMO technique or the OFDMA technique. And the SU PPDU means a PPDU which is available to deliver only one PSDU or a PPDU that has a format in which the PSDU is not existed.

For the MU-MIMO transmission, the size of the control information transmitted to an STA may be relatively greater than that of the control information based on 802.11n. Examples of the control information additionally required for supporting the MU-MIMO may include information indicating the number of spatial stream received by each STA, the information related to modulating and coding the data transmitted to each STA, and the like.

Accordingly, when the MU-MIMO transmission is performed for providing data service to a plurality of STAs simultaneously, the size of transmitted control information may increase as the number of STAs that receive the control information.

As such, in order to effectively transmit the increasing size of the control information, a plurality of control information required for the MU-MIMO transmission may be transmitted by being classified into common control information commonly required for all STAs and dedicated control information individually required for a specific STA.

FIG. 4 exemplifies a VHT format PPDU of a wireless communication system to which the present invention may be applied.

FIG. 4(a) illustrates a VHT format PPDU (VHT format PPDU) for supporting the IEEE 802.11 ac system.

Referring to FIG. 4(a), the VHT format PPDU includes a legacy format preamble that includes the L-STF, the L-LTF and the L-SIG field and a VHT format preamble that includes a VHT-Signal-A (VHT-SIG-A) field, a VHT Short Training field (VHT-STF), a VHT Long Training field (VHT-LTF) and a VHT-Signal-B (VHT-SIG-B) field and a data field.

Since the L-STF, the L-LTF and the L-SIG field signify legacy fields for backward compatibility, the fields from the L-STF to the L-SIG field are identical to those of the non-HT format. However, the L-LTF may further include information for channel estimation to be performed to demodulate the L-SIG field and the VHT-SIG-A field.

The L-STF, the L-LTF, the L-SIG field and the VHT-SIG-A field may be repeatedly transmitted in a unit of 20 MHz channel. For example, when a PPDU is transmitted through four 20 MHz channels (i.e., 80 MHz bandwidth), the L-STF, the L-LTF, the L-SIG field and the VHT-SIG-A field may be repeatedly transmitted in every 20 MHz channel.

The VHT-STA may be aware whether the PPDU is the VHT format PPDU using the VHT-SIG-A field which follows the legacy field, and based on this, the VHT-STA may decode the data field.

In the VHT format PPDU, the L-STF, the L-LTF and the L-SIG field are firstly transmitted such that an L-STA also receives and acquires data. Later, the VHT-SIG-A field is transmitted for demodulating and decoding the data transmitted for the VHT-STA.

The VHT-SIG-A field is a field for transmitting common control information between VHT STAs paired with an AP in MIMO scheme, and includes the control information for interpreting the received VHT format PPDU.

The VHT-SIG-A field may include a VHT-SIG-A1 field and a VHT-SIG-A2 field.

The VHT-SIG-A1 field may include channel bandwidth (BW) information to use, information on whether to apply Space Time Block Coding (STBC), Group Identifier (Group ID) information for indicating a group of STAs that are grouped in MU-MIMO scheme, information of the Number of space-time stream (NSTS) to use/Partial association Identifier (AID) and Transmit power save forbidden information. Herein, the Group ID may signify an identifier allocated to an STA group which is to be transmitted for supporting MU-MIMO transmission, and may represent whether the currently used MIMO transmission scheme is MU-MIMO or SU-MIMO.

Table 2 below exemplifies the VHT-SIG-A1 field.

TABLE 2

| Field | Bit | Description |
|---|---|---|
| BW | 2 | In the case of 20 MHz, set to '0', In the case of 40 MHz, set to '1', In the case of 80 MHz, set to '2', In the case of 160 MHz or 80 + 80 MHz, set to '3'. |
| Reserved | 1 | |
| STBC | 1 | In the case of VHT SU PPDU: In the case that STBC is used, set to '1', Otherwise, set to '0' In the case of VHT MU PPDU: Set to '0' |
| Group ID | 6 | Indicate Group ID '0' or '63' indicates VHT SU PPDU, otherwise indicates VHT MU PPDU |
| NSTS/Partial AID | 12 | In the case of VHT MU PPDU, divided by 4 user position 'p' each having 3 bits In the case that space time stream is 0, set to '0', In the case that space time stream is 1, set to '1', In the case that space time stream is 2, set to '2', In the case that space time stream is 3, set to '3', In the case that space time stream is 4, set to '4'. In the case of VHT SU PPDU, Top 3 bits are set as follows. In the case that space time stream is 1, set to '0', In the case that space time stream is 2, set to '1', In the case that space time stream is 3, set to '2', In the case that space time stream is 4, set to '3', |

TABLE 2-continued

| Field | Bit | Description |
|---|---|---|
| | | In the case that space time stream is 5, set to '4', |
| | | In the case that space time stream is 6, set to '5', |
| | | In the case that space time stream is 7, set to '6', |
| | | In the case that space time stream is 8, set to '7', |
| | | Bottom 9 bits indicate Partial AID. |
| TXOP_PS_NOT_ ALLOWED | 1 | When a VHT AP allows non-AP VHT STA shifted to a power save mode for transmission opportunity (TXOP), set to '0'. Otherwise, set to '1'. In the case of a VHT PPDU transmitted by non-AP VHT STA, set to '1'. |
| Reserved | 1 | |

The VHT-SIG-A2 field may include information on whether to use a short Guard Interval (GI), Forward Error Correction (FEC) information, information on Modulation and Coding Scheme (MCS) for a single user, information on types of channel coding for a plurality of users, beamforming related information, redundancy bits for Cyclic Redundancy Checking (CRC), a tail bit of convolutional decoder, and the like.

Table 3 below exemplifies the VHT-SIG-A2 field.

TABLE 3

| Field | Bit | Description |
|---|---|---|
| Short GI | 1 | In the case that short GI is not used in a data field, set to '0', In the case that short GI is used in a data field, set to '1'. |
| Short GI disambiguation | 1 | In the case that short GI is used and an additional symbol is required for a payload of PPDU, set to '1', In the case that an additional symbol is not required, set to '0'. |
| SU/MU Coding | 1 | In the case of VHT SU PPDU: In the case of BCC(binary convolutional code), set to '0', In the case of LDPC (low-density parity check), set to '1'. In the case of VHT MU PPDU: In the case that NSTS field of which user position is '0' is not '0', indicates coding to use. In the case of BCC, set to '0', In the case of LDPC, set to '1'. In the case that NSTS field of which user position is '0' is '0', set to '1' as a reserved field. |
| LDPC Extra OFDM Symbol | 1 | In the case that an additional extra OFDM symbol is required owing to LDPC PPDU encoding procedure (in the case of SU PPDU) or PPDU encoding procedure of at least one LDPC user (in the case of VHT MU PPDU), set to '1'. Otherwise, set to '0'. |
| SU VHT MCS/MU Coding | 4 | In the case of VHT SU PPDU: Represents VHT-MCS index. In the case of VHT MU PPDU: Indicates coding for user positions '1' to '3' in an order of ascending order from top bit. In the case that NSTS field of each user is not '1', indicates coding to use. In the case of BCC, set to '0', In the case of LDPC, set to '1'. In the case that NSTS field of each user is '0', set to '1' as a reserved field. |
| Beamformed | 1 | In the case of VHT SU PPDU: In the case that Beamforming steering matrix is applied to SU transmission, set to '1'. Otherwise, set to '0' In the case of VHT MU PPDU: Set to '1' as a reserved field. |
| Reserved | 1 | |
| CRC | 8 | Include CRC for detecting error of PPDU in receiver |
| Tail | 6 | Used for trellis end of convolutional decoder Set to '0'. |

The VHT-STF is used for improving the performance of AGC estimation in MIMO transmission.

The VHT-LTF is used for a VHT-STA to estimate a MIMO channel. Since a VHT WLAN system support the MU-MIMO, the VHT-LTF may be setup as much as the number of spatial streams through which a PPDU is transmitted. Additionally, in the case that full channel sounding is supported, the number of VHT-LTFs may increase.

The VHT-SIG-B field includes dedicated control information required to acquire data for a plurality of VHT-STAs paired in MU-MIMO scheme by receiving a PPDU. Accordingly, only in the case that the common control information included in the VHT-SIG-A field indicates a MU-MIMO transmission by a PPDU which is currently received, a VHT-STA may be designed to decode the VHT-SIG-B field. On the contrary, in the case that the common control information indicates that a PPDU currently received is for a single VHT-STA (including SU-MIMO), an STA may be designed not to decode the VHT-SIG-B field.

The VHT-SIG-B field includes a VHT-SIG-B Length field, a VHT-MCS field, a Reserved field, and a Tail field.

The VHT-SIG-B Length field indicates the length of the A-MPDU (before end-of-frame (EOF) padding). The VHT-MCS field includes information on modulation, encoding and rate-matching of each of the VHT-STAs.

A size of the VHT-SIG-B field may be different depending on types of MIMO transmission (MU-MIMO or SU-MIMO) and channel bandwidths which are used for PPDU transmissions.

FIG. 4(b) illustrates a VHT-SIG-B field in accordance with a PPDU transmission bandwidth.

Referring to FIG. 4(b), in 40 MHz transmission, the VHT-SIG-B bit is repeated twice. In 80 MHz transmission, the VHT-SIG-B bit is repeated four times and a pad bit set to 0 is added.

In 160 MHz transmission and 80+80 MHz transmission, first, the VHT-SIG-B bit is repeated four times and a pad bit set to 0 is added. Also, the entire 117 bits are repeated again.

In order to transmit PPDUs of the same size to STAs paired with an AP in a system that supports the MU-MIMO, information indicating a bit size of a data field that configures the PPDU and/or information indicating a bit stream size that configures a specific field may be included in the VHT-SIG-A field.

However, in order to efficiently use the PPDU format, the L-SIG field may be used. In order for the PPDUs of the same size to be transmitted to all STAs, a length field and a rate field transmitted with being included in the L-SIG field may be used for providing required information. In this case, since a MAC Protocol Data Unit (MPDU) and/or an Aggregate MAC Protocol Data Unit (A-MPDU) are configured based on bytes (or octet (oct)) of the MAC layer, an additional padding may be required in the physical layer.

The data field in FIG. 4 is a payload, and may include a SERVICE field, a scrambled PSDU, tail bits and padding bits.

As such, since several formats of PPDU are used in a mixed manner, an STA should be able to distinguish a format of received PPDU.

Herein, the meaning of distinguishing PPDU (or classifying the format of PPDU) may have various meanings. For example, the meaning of distinguishing PPDU may have a meaning of determining whether the received PPDU is a PPDU that is available to be decoded (or interpreted) by an STA. In addition, the meaning of distinguishing PPDU may have a meaning of determining whether the received PPDU is a PPDU that is available to be supported by an STA.

Further, the meaning of distinguishing PPDU may be interpreted as a meaning of classifying what the information is that is transmitted through the received PPDU.

This will be described in more detail by reference to the drawing below.

FIG. 5 is a diagram exemplifying a constellation for distinguishing a format of PPDU in a wireless communication system to which the present invention may be applied.

FIG. 5(a) exemplifies a constellation of an L-SIG field included in a non-HT format PPDU and FIG. 5(b) exemplifies a phase rotation for detecting an HT-mixed format PPDU. And FIG. 5(c) exemplifies a phase rotation for detecting a VHT format PPDU.

In order for an STA to distinguish the non-HT format PPDU, the HT-GF format PPDU, the HT-mixed format PPDU and the VHT format PPDU, a phase of constellation of the L-SIG field and the OFDM symbol transmitted after the L-SIG field are used. That is, the STA may classify a PPDU format based on the phase of constellation of the L-SIG field and the OFDM symbol transmitted after the L-SIG field.

Referring to FIG. 5(a), the OFDM symbol that configures the L-SIG field utilizes Binary Phase Shift Keying (BPSK).

First, in order to distinguish the HT-GF format PPDU, when an initial SIG field is detected in a received PPDU, an STA determines whether the SIG field is the L-SIG field. That is, the STA tries to decode based on the constellation example shown in FIG. 5(a). When the STA fail to decode, it may be determined that the corresponding PPDU is the HT-GF format PPDU.

Next, in order to classify the non-HT format PPDU, the HT-mixed format PPDU and the VHT format PPDU, the phase of constellation of the OFDM symbol transmitted after the L-SIG field may be used. That is, the modulation method of the OFDM symbol transmitted after the L-SIG field may be different, and the STA may classify the PPDU formats based on the modulation method for the field after the L-SIG field of the received PPDU.

Referring to FIG. 5(b), in order to distinguish the HT-mixed format PPDU, the phase of two OFDM symbols transmitted after the L-SIG field in the HT-mixed format PPDU may be used.

More particularly, the phases of both OFDM symbol #1 and OFDM symbol #2 that correspond to the HT-SIG field transmitted after the L-SIG field in the HT-mixed format PPDU rotate as much as 90 degrees in counter-clock wise direction. That is, the modulation method for OFDM symbol #1 and OFDM symbol #2 uses Quadrature Binary Phase Shift Keying (QBPSK). The QBPSK constellation may be a constellation of which phase rotates as much as 90 degrees in counter-clock wise direction with respect to the BPSK constellation.

An STA tries to decode OFDM symbol #1 and OFDM symbol #2 that correspond to the HT-SIG field transmitted after the L-SIG field of the received PPDU based on the constellation example shown in FIG. 5(b). When the STA is successful in decoding, the STA determines the corresponding PPDU to be the HT format PPDU.

Next, in order to distinguish the non-HT format PPDU and the VHT format PPDU, the phase of constellation of the OFDM symbol transmitted after the L-SIG field may be used.

Referring to FIG. 5(c), in order to distinguish the VHT format PPDU, the phases of two OFDM symbols transmitted after the L-SIG field in the VHT format PPDU may be used.

More particularly, the phase of OFDM symbol #1 that corresponds to the VHT-SIG-A field after the L-SIG field in the VHT format PPDU does not rotate, but the phase of OFDM symbol #2 rotates as much as 90 degrees in counter-clock wise direction. That is, the modulation method for OFDM symbol #1 uses the BPSK and the modulation method for OFDM symbol #2 uses the QBPSK.

An STA tries to decode OFDM symbol #1 and OFDM symbol #2 that correspond to the VHT-SIG field transmitted after the L-SIG field of the received PPDU based on the constellation example shown in FIG. 5(c). When the STA is successful in decoding, the STA may determine the corresponding PPDU to be the VHT format PPDU.

On the other hand, when the STA fails to decode, the STA may determine the corresponding PPDU to be the non-HT format PPDU.

MAC Frame Format

FIG. 6 exemplifies a MAC frame format in IEEE 802.11 system to which the present invention may be applied.

Referring to FIG. 6, a MAC frame (i.e., MPDU) includes a MAC Header, a Frame Body and a frame check sequence (FCS).

The MAC Header is defined by regions that include Frame Control field, Duration/ID field, Address 1 field, Address 2 field, Address 3 field, Sequence Control field, Address 4 field, QoS Control field and HT Control field.

The Frame Control field includes information on characteristics of the corresponding MAC frame. Detailed description for the Frame Control field will be described below.

The Duration/ID field may be implemented to have different values according to a type and a subtype of the corresponding MAC frame.

In the case that a type and a subtype of the corresponding MAC frame is a PS-Poll frame for the power save (PS) operation, the Duration/ID field may be configured to include an association identifier of the STA that transmits the frame. In other case, the Duration/ID field may be configured to have a specific duration value depending on the corresponding type and subtype of the MAC frame. In addition, in the case that the frame is an MPDU included in the aggregate-MPDU (A-MPDU) format, all of the Duration/ID fields included in the MAC header may be configured to have the same value.

Address 1 field to Address 4 field are used to indicate BSSID, source address (SA), destination address (DA), transmitting address (TA) representing an address of a transmission STA and a receiving address (RA) representing an address of a reception STA.

Meanwhile, the address field implemented as the TA field may be set to a bandwidth signaling TA value. In this case, the TA field may indicate that the corresponding MAC frame has additional information to the scrambling sequence. Although the bandwidth signaling TA may be represented as a MAC address of the STA that transmits the corresponding MAC frame, Individual/Group bit included in the MAC address may be set to a specific value (e.g., '1').

The Sequence Control field is configured to include a sequence number and a fragment number. The sequence number may indicate the number of sequence allocated to the corresponding MAC frame. The fragment number may indicate the number of each fragment of the corresponding MAC frame.

The QoS Control field includes information related to QoS. The QoS control field may be included in the case that a QoS data frame is indicated in a Subtype subfield.

The HT Control filed includes control information related to HT and/or VHT transmission and reception techniques.

The HT Control field is included in Control Wrapper frame. Further, the HT Control field is existed in the QoS data frame of which Order subfield value is 1, and existed in Management frame.

The Frame Body is defined as a MAC payload, and data to be transmitted in a higher layer is located therein. And the Frame body has a variable size. For example, a maximum size of MPDU may be 11454 octets, and a maximum size of PPDU may be 5.484 ms.

The FCS is defined as a MAC footer, and used for searching an error of the MAC frame.

First three fields (the Frame Control field, the Duration/ID field and the Address 1 field) and the last field (FCS field) configure a minimum frame format, and are existed in all frames. Other fields may be existed in a specific frame type.

FIG. 7 is a diagram illustrating a frame control field in an MAC frame in the wireless communication system to which the present invention may be applied.

Referring to FIG. 7, the frame control field is comprised of a Protocol Version subfield, a Type sub field, a Subtype subfield, a To Ds subfield, a From DS subfield, a More Fragments subfield, a Retry subfield, a Power Management subfield, a More Data subfield, a Protected Frame subfield, and an Order subfield.

The Protocol Version subfield may indicate a version of a WLAN protocol applied to the corresponding MAC frame.

The Type subfield and the Subtype subfield may be set to indicate information identify a function of the corresponding MAC frame.

A type of the MAC frame may include three frame types of a management frame, a control frame, and a data frame.

In addition, each of the frame types may be divided into subtypes again.

For example, the control frames may include a request to send (RTS) frame, a clear-to-send (CTS) frame, an acknowledgment (ACK) frame, a PS-Poll frame, a contention free (CF)–End frame, a CF-End+CF-ACK frame, a block ACK request (BAR) frame, a block acknowledgement (BA) frame, a control wrapper (Control+HTcontrol) frame, null data packet announcement (NDPA), and a beamforming report poll frame.

The management frames may include a beacon frame, an announcement traffic indication message (ATIM) frame, a dissociation frame, an association request/response frame, a reassociation request/response frame, a probe request/response frame, an authentication frame, a deauthentication frame, an action frame, an action No ACK frame, and a timing advertisement frame.

The To DS subfield and the From DS subfield may include information required for interpreting an Address 1 field to an Address 4 field included in the corresponding MAC frame header. In the case of the Control frame, both the To DS subfield and the From DS subfield are set to '0'. In the case of the Management frame, both the To DS subfield and the From DS subfield may be sequentially set to '1' and '0' when the corresponding frame is a QoS management frame (QMF) and both the To DS subfield and the From DS subfield may be sequentially set to '0' and '0' when the corresponding frame is not the QMF.

The More Fragments subfield may indicate whether a fragment to be transmitted subsequently to the corresponding MAC frame exists. When another fragment of the MSDU or MMPDU exists, the More Fragments subfield may be set to '1' and if not, the More Fragments subfield may be set to '0'.

The Retry subfield may indicate whether the corresponding MAC frame depends on retransmission of the previous MAC frame. In the case of retransmission of the previous MAC frame, the Retry subfield may be set to '1' and if not, the Retry subfield may be set to '0'.

The Power Management subfield may indicate a power management mode of the STA. When a Power Management subfield value is '1', the corresponding Power Management subfield value may indicate that the STA may be switched to a power save mode.

The More Data subfield may indicate whether the MAC frame to be additionally transmitted exists. When the MAC frame to be additionally transmitted exists, the More Data subfield may be set to '1' and if not, the More Data subfield may be set to '0'.

The Protected Frame subfield may indicate whether a frame body field is encrypted. When the frame body field includes information processed by a cryptographic encapsulation algorithm, the Protected Frame subfield may be set to '1' and if not, the Protected Frame subfield may be set to '0'.

The information included in the aforementioned respective fields may follow a definition of the IEEE 802.11 system. Further, the respective fields correspond to examples of the fields which may be included in the MAC frame and are not limited thereto. That is, each field may be substituted with another field or further include an additional field and all fields may not be requisitely included.

FIG. 8 is a view illustrating a VHT format of an HT control field in a wireless communication system to which the present invention is applicable.

Referring to FIG. 8, the HT control field may include a VHT subfield, an HT control middle subfield, an AC constraint subfield, and a reverse direction grant (RDG)/more PPDU subfields.

The VHT subfield indicates whether an HT control field has a format of the HT control field for VHT (VHT=1) or has a format of an HT control field for HT (VHT=0). In FIG. 8, descriptions will be made on the assumption of an HT control field (i.e., VHT=1). The HT control field for VHT may also be designated as a VHT control field.

The HT control middle subfield may be implemented to have a different format according to an indication of the VHT subfield. Details of the HT control middle subfield will be described hereinafter.

The AC constraint subfield indicates whether a mapped access category (AC) of a reversed direction (RD) data frame is constrained to a single AC.

The RDG/more PPDU subfield may be differently interpreted depending on whether the corresponding field is transmitted by an RD initiator or an RD responder.

In a case in which the field is transmitted by the RD initiator, if an RDG is present, the RDG/more PPDU field is set to 1, and if the RDG is not present, the RDG/more PPDU field is set to 0. In a case in which the corresponding field is transmitted by the RD responder, if a PPDU including the corresponding subfield is a final frame transmitted by the RD responder, the RDG/more PPDU is set to 1, and if another PPDU is transmitted, the RDG/more PPDU subfield is set to 0.

As described above, the HT control middle subfield may be implemented to have a different format according to an indication of the VHT subfield.

The HT control middle subfield of the HT control field for VHT may include a reserved bit, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant bit of group ID (GID-H) subfield, a coding type subfield, a feedback transmission type (FB Tx Type) subfield, and an unsolicited MFB subfield. Table 4 illustrates descriptions of the subfields included in the HT control middle subfield of the VHT format.

TABLE 4

| Subfield | Meaning | Definition |
| --- | --- | --- |
| MRQ | MCS request | It is set to 1 in the case of requesting MCS feedback (solicited MFB) and to 0 in otherwise case |
| MSI | MRQ sequence identifier | When unsolicited MFB subfield is set to 0 and MRQ subfield is set to 1, MSI subfield includes sequence number within range of 0 to 6 identifying specific request<br>When unsolicited MFB is set to 1, it includes compressed MSI subfield (2 bits) and STBC indication subfield (1 bit) |
| MFSI/GID-L | MFB sequence identifier/LSB of Group ID | When unsolicited MFB subfield is set to 0, MFSI/GID-L subfield includes a reception value of MSI included in frame related to MFB information<br>When unsolicited MFB subfield is set to 1 and MFB was estimated from MU PPDU, MFS/GID-L subfield includes three LSBs of group ID of PPDU from which MFB was estimated |
| MFB | VHT N_STS, MCS, BW, SNR feedback | MFB subfield includes recommended MFB.<br>VHT-MCS = 15 and NUM_STS = 7 indicate that feedback is not present |
| GID-H | MSB of Group ID | When unsolicited MFB subfield is set to 1 and MFB was estimated from VHT MU PPDU, GID-H subfield includes three MSBs of group ID of PPDU from which unsolicited MFB was estimated<br>When MFB was estimated from SU PPDU, GID-H subfields are all set to 1. |
| Coding Type | Coding type of MFB response | When unsolicited MFB subfield is set to 1, coding type subfield includes coding type (binary convolutional code (BCC)) is 0 and low-density parity check (LDPC) is 1) of frame from which unsolicited MFB was estimated |

TABLE 4-continued

| Subfield | Meaning | Definition |
|---|---|---|
| FB Tx Type | Transmission type of MFB response | When unsolicited MFB subfield is set to 1 and MFB was estimated from unbeamformed VHT PPDU, FB Tx Type subfield is set to 0. When unsolicited MFB subfield is set to 1 and MFB was estimated from beamformed VHT PPDU, FB Tx Type subfield is set to 1 |
| Unsolicited MFB | Unsolicited MCS feedback indicator | It is set to 1 when MFB is a response regarding MRQ, and set to 0 when MFB is not response regarding MRQ |

The MFB subfield may include a VHT space-time streams (NUM_STS) subfield, a VHT-MCS subfield, a bandwidth (BW) subfield, and a signal-to-noise ratio (SNR) subfield.

The NUM-STS subfield indicates the number of recommended space streams. The VHT-MCS subfield indicates a recommended MCS. The BW subfield indicates bandwidth information related to a recommended MCS. The SNR subfield indicates an average SNR value of a space stream and a data subcarrier.

Information included in each of the fields described above may follow definitions of the IEEE 802.11 system. Also, the fields described above correspond to the examples of the fields that may be included in a MAC frame and not limited thereto. That is, the fields described above may be replaced with other fields, an additional field may be further provided, and all the fields may not be essential.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 9 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . ).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 9, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 9 shows that the STA 2 has selected the smallest backoff count value and the STA 1 has selected the greatest backoff count value. That is, FIG. 10 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 9 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. The STA receiving the NAV value is prohibited from accessing the medium during the corresponding period. For example, the NAV may be set according to the value of the duration field of the MAC header of the frame.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame.

Interframe Space (IFS)

A time interval between frames is defined as an interframe space (IFS). An STA may determine whether a channel is used during an IFS time interval through carrier sensing. In an 802.11 WLAN system, a plurality of IFSs is defined in order to provide a priority level by which a wireless medium is occupied.

FIG. 10 is a diagram illustrating an IFS relation in a wireless communication system to which an embodiment of the present invention may be applied.

All of pieces of timing may be determined with reference to physical layer interface primitives, that is, a PHY-TX-END.confirm primitive, a PHYTXSTART.confirm primitive, a PHY-RXSTART.indication primitive, and a PHY-RXEND.indication primitive.

An interframe space (IFS) depending on an IFS type is as follows.

A reduced interframe space (IFS) (RIFS)
A short interframe space (IFS) (SIFS)
A PCF interframe space (IFS) (PIFS)
A DCF interframe space (IFS) (DIFS)
An arbitration interframe space (IFS) (AIFS)
An extended interframe space (IFS) (EIFS)

Different IFSs are determined based on attributes specified by a physical layer regardless of the bit rate of an STA. IFS timing is defined as a time gap on a medium. IFS timing other than an AIFS is fixed for each physical layer.

The SIFS is used to transmits a PPDU including an ACK frame, a CTS frame, a block ACK request (BlockAckReq) frame, or a block ACK (BlockAck) frame, that is, an instant response to an A-MPDU, the second or consecutive MPDU of a fragment burst, and a response from an STA with respect to polling according to a PCF. The SIFS has the highest priority. Furthermore, the SIFS may be used for the point coordinator of frames regardless of the type of frame during a non-contention period (CFP) time. The SIFS indicates the time prior to the start of the first symbol of the preamble of a next frame which is subsequent to the end of the last symbol of a previous frame or from signal extension (if present).

SIFS timing is achieved when the transmission of consecutive frames is started in a Tx SIFS slot boundary.

The SIFS is the shortest in IFS between transmissions from different STAs. The SIFS may be used if an STA occupying a medium needs to maintain the occupation of the medium during the period in which the frame exchange sequence is performed.

Other STAs required to wait so that a medium becomes an idle state for a longer gap can be prevented from attempting to use the medium because the smallest gap between transmissions within a frame exchange sequence is used. Accordingly, priority may be assigned in completing a frame exchange sequence that is in progress.

The PIFS is used to obtain priority in accessing a medium.
The PIFS may be used in the following cases.

An STA operating under a PCF

An STA sending a channel switch announcement frame

An STA sending a traffic indication map (TIM) frame

A hybrid coordinator (HC) starting a CFP or transmission opportunity (TXOP)

An HC or non-AP QoS STA, that is, a TXOP holder polled for recovering from the absence of expected reception within a controlled access phase (CAP)

An HT STA using dual CTS protection before sending CTS2

A TXOP holder for continuous transmission after a transmission failure

A reverse direction (RD) initiator for continuous transmission using error recovery An HT AP during a PSMP sequence in which a power save multi-poll (PSMP) recovery frame is transmitted An HT AT performing CCA within a secondary channel before sending a 40 MHz mask PPDU using EDCA channel access In the illustrated examples, an STA using the PIFS starts transmission after a carrier sense (CS) mechanism for determining that a medium is an idle state in a Tx PIFS slot boundary other than the case where CCA is performed in a secondary channel.

The DIFS may be used by an STA which operates to send a data frame (MPDU) and a MAC management protocol data unit management (MMPDU) frame under the DCF. An STA using the DCF may transmit data in a TxDIFS slot boundary if a medium is determined to be an idle state through a carrier sense (CS) mechanism after an accurately received frame and a backoff time expire. In this case, the accurately received frame means a frame indicating that the PHY-RXEND.indication primitive does not indicate an error and an FCS indicates that the frame is not an error (i.e., error free).

An SIFS time ("aSIFSTime") and a slot time ("aSlotTime") may be determined for each physical layer. The SIFS time has a fixed value, but the slot time may be dynamically changed depending on a change in the wireless delay time "aAirPropagationTime."

The "aSIFSTime" is defined as in Equations 1 and 2 below.

$$aSIFSTime(16\ \mu s)=aRxRFDelay(0.5)+aRxPLCPDelay(12.5)+aMACProcessingDelay(1\ or\ <2)+aRxTxTurnaroundTime(<2) \quad [\text{Equation 1}]$$

$$aRxTxTurnaroundTime=aTxPLCPDelay(1)+aRxTxSwitchTime(0.25)+aTxRampOnTime(0.25)+aTxRFDelay(0.5) \quad [\text{Equation 2}]$$

The "aSlotTime" is defined as in Equation 3 below.

$$aSlotTime=aCCATime(<4)+aRxTxTurnaroundTime(<2)+aAirPropagationTime(<1)+aMACProcessingDelay(<2) \quad [\text{Equation 3}]$$

In Equation 3, a default physical layer parameter is based on "aMACProcessingDelay" having a value which is equal to or smaller than 1 µs. A radio wave is spread 300 m/µs in the free space. For example, 3 µs may be the upper limit of a BSS maximum one-way distance ~450 m (a round trip is ~900 m).

The PIFS and the SIFS are defined as in Equations 4 and 5, respectively.

$$PIFS(16\ \mu s)=aSIFSTime+aSlotTime \quad [\text{Equation 4}]$$

$$DIFS(34\ \mu s)=aSIFSTime+2*aSlotTime \quad [\text{Equation 4}]$$

In Equations 1 to 5, the numerical value within the parenthesis illustrates a common value, but the value may be different for each STA or for the position of each STA.

The aforementioned SIFS, PIFS, and DIFS are measured based on an MAC slot boundary (e.g., a Tx SIFS, a Tx PIFS, and a TxDIFS) different from a medium.

The MAC slot boundaries of the SIFS, the PIFS, and the DIFS are defined as in Equations 6 to 8, respectively.

$$TxSIFS=SIFS-aRxTxTurnaroundTime \quad [\text{Equation 6}]$$

$$TxPIFS=TxSIFS+aSlotTime \quad [\text{Equation 7}]$$

$$TxDIFS=TxSIFS+2*aSlotTime \quad [\text{Equation 8}]$$

Channel State Information Feedback Method

An SU-MIMO technology in which a beamformer communicates by allocating all antennas to a beamformee increases a channel capacity through diversity gain and stream multiple transmission using a time and a space. The SU-MIMO technology may contribute to performance enhancement of a physical layer by extending a spatial degree of freedom by increases the number of antennas as compared with a case where an MIMO technology is not applied.

Further, an MU-MIMO technology in which the beamformer allocates the antennas to a plurality of beamformees may enhance the performance of an MIMO antenna by increasing transmission rate per beamformee or reliability of the channel through a link layer protocol for multiple access of the plurality of beamformees accessing the beamformer.

In an MIMO environment, since how accurately the beamformer knows the channel information may exert a large influence on the performance, a feedback procedure for acquiring the channel is required.

As the feedback procedure for acquiring the channel information, two modes may be largely supported. One is a mode using the control frame and the other one is mode using a channel sounding procedure not including the data field. Sounding means using a corresponding training field in order to measure the channel for a purpose other than data demodulation of the PPDU including the training field.

Hereinafter, a channel information feedback method using the control frame and a channel information feedback method using a null data packet (NDP) will be described in more detail.

1) Feedback Method Using Control Frame

In the MIMO environment, the beamformer may indicate feedback of the channel state information through the HT control field included in the MAC header or report the channel state information through the HT control field included in the MAC frame header (refer to FIG. 8). The HT control field may be included in a control wrapper frame, a QoS Data frame in which the Order subfield of the MAC header is set to 1, or a management frame.

2) Feedback Method Using Channel Sounding

FIG. 11 is a diagram for conceptually describing a channel sounding method in the wireless communication system to which the present invention can be applied.

In FIG. 11, a method that feeds back the channel state information between the beamformer (for example, AP) and the beamformee (for example, non-AP STA) based on a sounding protocol is illustrated. The sounding protocol may mean a procedure that feeds back information on the channel state information.

A channel state information sounding method between the beamformer and the beamformee based on the sounding protocol may be performed by steps given below.

The beamformer transmits a VHT Null Data Packet Announcement (VHT NDPA) frame announcing sounding transmission for feedback of the beamformee.

The VHT NDPA frame means the control frame used to announce that the channel sounding is initiated and the null data packet (NDP) is transmitted. In other words, the VHT NDPA frame is transmitted before transmitting the NDP, and as a result, the beamformee may prepare for feeding back the channel state information before receiving the NDP frame.

The VHT NDPA frame may include association identifier (AID) information, feedback type information, and the like of the beamformee that will transmit the NDP. More detailed description of the VHT NDPA frame will be made below.

In the case where data is transmitted by using the MU-MIMO and in the case where the data is transmitted by using the SU-MIMO, the VHT NDPA frame may be transmitted by different transmission methods. For example, when the channel sounding for the MU-MIMO is performed, the VHT NDPA frame is transmitted by a broadcast method, but when the channel sounding for the SU-MIMO is performed, the VHT NDPA frame may be transmitted to one target STA by a unicast method.

(2) The beamformer transmits the VHT NDPA frame and thereafter, transmits the NDP after an SIFS time. The NDP has a VHT PPDU structure except for the data field.

The beamformees that receive the VHT NDPA frame may verify an AID12 subfield value included in the STA information field and verify the beamformees as sounding target STAs.

Further, the beamformees may know a feedback order through the order of the STA Info field included in the NDPA. In FIG. 11, a case where the feedback order is the order of beamformee 1, beamformee 2, and beamformee 3 is illustrated.

(3) Beamformee 1 acquires the downlink channel state information based on the training field included in the NDP to generate feedback information to be transmitted to the beamformer.

Beamformee 1 receives the NDP frame and thereafter, transmits a VHT compressed beamforming frame including the feedback information to the beamformer after the SIFS.

The VHT compressed beamforming frame may include an SNR value for the space-time stream, information on a compressed beamforming feedback matrix for a subcarrier, and the like. More detailed description of the Compressed Beamforming frame will be made below.

(4) The beamformer receives the VHT Compressed Beamforming frame beamformee 1 and thereafter, transmits the beamforming report poll frame to beamformee 2 in order to the channel information from beamformee 2 after the SIFS.

The beamforming report poll frame is a frame that performs the same role as the NDP frame and beamformee 2 may measure the channel state based on the transmitted beamforming report poll frame.

More detailed description of the beamforming report poll frame will be made below.

(5) Beamformee 2 that receives the beamforming report poll frame transmits the VHT compressed beamforming frame including the feedback information to the beamformer after the SIFS.

(6) The beamformer receives the VHT Compressed Beamforming frame beamformee 2 and thereafter, transmits the beamforming report poll frame to beamformee 3 in order to the channel information from beamformee 3 after the SIFS.

(7) Beamformee 3 that receives the beamforming report poll frame transmits the VHT compressed beamforming frame including the feedback information to the beamformer after the SIFS.

Hereinafter, the frame used in the aforementioned channel sounding procedure will be described.

FIG. 12 is a diagram illustrating a VHT NDPA frame in the wireless communication system to which the present invention may be applied.

Referring to FIG. 12, the VHT NDPA frame may be comprised of a frame control field, a duration field, a receiving address (RA) field, a transmitting address (TA) field, a sounding dialog token field, an STA information 1 (STA Info 1) field to an STA information n (STA Info n) field, and an FCS.

The RA field value represents a receiver address or STA address that receives the VHT NDPA frame.

When the VHT NDPA frame includes one STA Info field, the RA field value has an address of the STA identified by the AID in the STA Info field. For example, when the VHT NDPA frame is transmitted to one target STA for SU-MIMO channel sounding, the AP transmits the VHT NDPA frame to the STA by unicast.

On the contrary, when the VHT NDPA frame includes one or more STA Info fields, the RA field value has a broadcast address. For example, when the VHT NDPA frame is transmitted to one or more target STAs for MU-MIMO channel sounding, the AP broadcasts the VHT NDPA frame.

The TA field value represents a bandwidth for signaling a transmitter address to transmit the NDPA frame or an address of the STA which transmits the VHT NDPA frame, or the TA.

The Sounding Dialog Token field may be referred to as a sounding sequence field. A Sounding Dialog Token Number subfield in the Sounding Dialog Token field includes a value selected by the beamformer in order to identify the VHT NDPA frame.

The VHT NDPA frame includes at least one STA Info field. That is, the VHT NDPA frame includes an STA Info field including information on a sounding target STA. One STA Info field may be included in each sounding target STA.

Each STA Info field may be constituted by an AID12 subfield, a Feedback Type subfield, and an Nc Index subfield.

Table 5 shows the subfield of the STA Info field included in the VHT NDPA frame.

TABLE 5

| Subfield | Description |
| --- | --- |
| AID12 | Includes the AID of the STA which becomes the sounding feedback target<br>When the target STA is the AP, a mesh STA, or the STA which is an IBSS member, the AID12 subfield value is set to '0' |
| Feedback Type | Indicates the feedback request type for the sounding target STA<br>In the case of the SU-MIMO, '0'<br>In the case of the MU-MIMO, '1' |
| Nc Index | When the Feedback Type subfield indicates the MU-MIMO, Nc Index indicates a value acquired by subtracting 1 from the number (Nc) of columns of the compressed beamforming feedback matrix<br>In the case of Nc = 1, '0',<br>In the case of Nc = 2, '1',<br>. . .<br>In the case of Nc = 8, '7'<br>In the case of the SU-MIMO, the Nc Index is set as a reserved subfield |

The information included in the aforementioned respective fields may follow the definition of the IEEE 802.11 system. Further, the respective fields correspond to examples of the fields which may be included in the MAC frame and substituted with another field or an additional field may be further included.

FIG. 13 is a diagram illustrating an NDP PPDU in the wireless communication system to which the present invention may be applied.

Referring to FIG. 13, the NDP may have a format in which the data field is omitted from the VHT PPDU format. The NDP is precoded based on a specific precoding matrix to be transmitted to the sounding target STA.

In the L-SIG field of the NDP, a length field indicating the length of the PSDU included in the data field is set to '0'.

A Group ID field indicating whether a transmission technique used for transmitting the NDP in the VHT-SIG-A field of the NDP is the MU-MIMO or the SU-MIMO is set to a value indicating the SU-MIMO transmission.

A data bit of the VHT-SIG-B field of the NDP is set to a bit pattern fixed for each bandwidth.

When the sounding target STA receives the NDP, the sounding target STA estimates the channel and acquires the channel state information based on the VHT-LTF field of the NDP.

FIG. 14 is a diagram illustrating a VHT compressed beamforming frame format in the wireless communication system to which the present invention may be applied.

Referring to FIG. 14, the VHT compressed beamforming frame as a VHT action frame for supporting the VHT function includes the Action field in the frame body. The Action field provides a mechanism for specifying management operations included in and extended to the frame body of the MAC frame.

The Action field is comprised of a Category field, a VHT Action field, a VHT MIMO Control field, a VHT Compressed Beamforming Report field, and an MU Exclusive Beamforming Report field.

The Category field is set to a value indicating a VHT category (that is, VHT Action frame) and the VHT Action field is set to a value indicating the VHT Compressed Beamforming frame.

The VHT MIMO Control field is used for feeding back control information associated with beamforming feedback. The VHT MIMO Control field may always exist in the VHT Compressed Beamforming frame.

The VHT Compressed Beamforming Report field is used for feeding back information on the beamforming matrix including the SNR information for the space-time stream used for transmitting the data.

The MU Exclusive Beamforming Report field is used for feeding back the SNR information for a spatial stream when the MU-MIMO transmission is performed.

Whether the VHT Compressed Beamforming Report field and the MU Exclusive Beamforming Report field exist and contents of the VHT Compressed Beamforming Report field and the MU Exclusive Beamforming Report field may be determined according to values of a Feedback Type subfield, a Remaining Feedback Segments subfield, and a First Feedback Segment subfield of the VHT MIMO Control field.

Hereinafter, the VHT MIMO Control field, the VHT Compressed Beamforming Report field, and the MU Exclusive Beamforming Report field will be described in more detail.

1) The VHT MIMO Control field is comprised of an Nc Index subfield, an Nr Index subfield, a Channel Width subfield, a Grouping subfield, a Codebook Information subfield, a Feedback Type subfield, a Remaining Feedback Segments subfield, a First Feedback Segment subfield, a reserved subfield, and a Sounding Dialog Token Number subfield.

Table 6 shows the subfield of the VHT MIMO Control field.

TABLE 6

| Subfield | The number of bits | Description |
|---|---|---|
| Nc Index | 3 | Nc Index indicates a value acquired by subtracting 1 from the number (Nc) of columns of the compressed beamforming feedback matrix<br>In the case of Nc = 1, '0',<br>In the case of Nc = 2, '1',<br>. . .<br>In the case of Nc = 8, '7' |
| Nr Index | 3 | Nr Index indicates a value acquired by subtracting 1 from the number (Nr) of rows of the compressed beamforming feedback matrix<br>In the case of Nr = 1, '0',<br>In the case of Nr = 2, '1',<br>. . .<br>In the case of Nr = 8, '7' |
| Channel Width | 2 | Indicates the bandwidth of the channel measured in order to generate the compressed beamforming feedback matrix<br>In the case of 20 MHz, '0',<br>In the case of 40 MHz, '1',<br>In the case of 80 MHz, '2',<br>In the case of 160 MHz or 80 + 80 MHz, '3' |
| Grouping | 2 | Indicates subcarrier grouping (Ng) used in the compressed beamforming feedback matrix<br>In the case of Ng = 1(no grouping), '0',<br>In the case of Ng = 2, '1',<br>In the case of Ng = 4, '2',<br>A value of '3' is set to a preliminary value |
| Codebook Information | 1 | Indicates the sizes of codebook entries<br>When the feedback type is the SU-MIMO,<br>In the case of b$\psi$ = 2 and b$\Phi$ = 4, '0',<br>In the case of b$\psi$ = 4 and b$\Phi$ = 6, '1' |

TABLE 6-continued

| Subfield | The number of bits | Description |
|---|---|---|
| | | When the feedback type is the MU-MIMO, <br> In the case of $b\psi$ = 5 and $b\Phi$ = 7, '0', <br> In the case of $b\psi$ = 7 and $b\Phi$ = 9, '1' <br> Herein, $b\psi$ and $b\Phi$ mean the number of quantized bits |
| Feedback Type | 1 | Indicates the feedback type <br> In the case of the SU-MIMO, '0', <br> In the case of the MU-MIMO, '1' |
| Remaining Feedback Segments | 3 | Indicates the number of remaining feedback segments for the associated VHT Compressed Beamforming frame <br> In the case of a last feedback segment of the segmented report or a segment of an unsegmented report, the Remaining Feedback Segments are set to '0' <br> When the Remaining Feedback Segments are not first and last feedback segments of the segmented report, the Remaining Feedback Segments are set to a value between '1' and '6' <br> When the Remaining Feedback Segments are feedback segments other than the last segment, the Remaining Feedback Segments are set to the value between '1' and '6' <br> In the case of a retransmitted feedback segment, the field is set to the same value as the segment associated with original transmission |
| First Feedback Segment | 1 | In the case of a first feedback segment of the segmented report or a segment of an unsegmented report, the First Feedback Segment is set to '1' <br> When the corresponding feedback segment is not the first feedback segment or the VHT Compressed Beamforming Report field or the MU Exclusive Beamforming Report field does not exist in the frame, the First Feedback Segment is set to '0' <br> In the case of a retransmitted feedback segment, the field is set to the same value as the segment associated with the original transmission |
| Sounding Dialog Token Number | 6 | The Sounding Dialog Token Number is set to a sounding dialog token value of the NDPA frame |

When the VHT Compressed Beamforming frame does not transfer the entirety or a part of the VHT Compressed Beamforming Report field, the Nc Index subfield, the Channel Width subfield, the Grouping subfield, the Codebook Information subfield, the Feedback Type subfield, and the Sounding Dialog Token Number subfield are set as a preliminary field, the First Feedback Segment subfield is set to '0', and the Remaining Feedback Segments subfield is set to '7'.

The Sounding Dialog Token field may be referred to as a Sounding Sequence Number subfield.

2) The VHT compressed beamforming report field is used for transferring explicit feedback information representing the compressed beamforming feedback matrix 'V' which a transmission beamformer uses a steering matrix 'Q' for determining in the form of an angle.

Table 7 shows the subfield of the VHT compressed beamforming report field.

TABLE 7

| Subfield | The number of bits | Description |
|---|---|---|
| Average SNR of Space-Time Stream 1 | 8 | Average SNR on all subcarriers for space-time stream 1 in beamformee |
| ... | ... | ... |
| Average SNR of Space-Time Stream Nc | 8 | Average SNR on all subcarriers for the space-time stream Nc in beamformee |
| Compressed Beamforming Feedback Matrix V for subcarrier k = scidx(0) | $Na*(b\psi + b\Phi)/2$ | Order of the angle of Compressed Beamforming Feedback Matrix for the corresponding subcarrier |
| Compressed Beamforming Feedback Matrix V for subcarrier k = scidx(1) | $Na*(b\psi + b\Phi)/2$ | The order of the angle of Compressed Beamforming Feedback Matrix for the corresponding subcarrier |
| ... | ... | ... |
| Compressed Beamforming Feedback Matrix V for subcarrier k = scidx(Ns − 1) | $Na*(b\psi + b\Phi)/2$ | The order of the angle of Compressed Beamforming Feedback Matrix for the corresponding subcarrier |

Referring to Table 7, the VHT compressed beamforming report field may include the average SNR for each time-space stream and the Compressed Beamforming Feedback Matrix 'V' for the respective subcarriers. The Compressed Beamforming Feedback Matrix as a matrix including information on a channel state is used to for calculating a channel matrix (that is, a steering matrix 'Q') in the transmission method using the MIMO.

scidx( ) means the subcarrier in which the Compressed Beamforming Feedback Matrix subfield is transmitted. Na is fixed by a value of Nr×Nc (for example, in the case of Nr×Nc=2×1, ϕ11, ψ21, . . . ).

Ns means the number of subcarriers in which the compressed beamforming feedback matrix is transmitted to the beamformer. The beamformee may reduce the Ns in which the compressed beamforming feedback matrix is transmitted by using the grouping method. For example, a plurality of subcarriers is bundled as one group and the compressed beamforming feedback matrix is transmitted for each corresponding group to reduce the number of compressed beamforming feedback matrices which are fed back. The Ns may be calculated from the Channel Width subfield and the Grouping subfield included in the VHT MIMO Control field.

Table 8 exemplifies an average SNR of space-time stream subfield.

TABLE 8

| Average SNR of Space-Time i subfield | AvgSNRi |
|---|---|
| −128 | ≤−10 dB |
| −127 | −9.75 dB |
| −126 | −9.5 dB |
| . . . | . . . |
| +126 | 53.5 dB |
| +127 | ≥53.75 dB |

Referring to Table 8, the average SNR for each time-space stream is calculated by calculating the average SNR value for all subcarriers included in the channel and mapping the calculated average SNR value to the range of −128 to +128.

3) The MU Exclusive Beamforming Report field is used to transfer the explicit feedback information shown in the form of delta (Δ) SNR. Information in the VHT Compressed Beamforming Report field and the MU Exclusive Beamforming Report field may be used for the MU beamformer to determine the steering matrix 'Q'.

Table 9 shows the subfield of the MU Exclusive Beamforming Report field included in the VHT compressed beamforming report frame.

TABLE 9

| Subfield | The number of bits | Description |
|---|---|---|
| Delta SNR for space-time stream 1 for subcarrier k = sscidx(0) | 4 | Difference between the SNR for the corresponding subcarrier and the average SNR for all subcarriers of the corresponding time-space stream |
| . . . | . . . | . . . |
| Delta SNR for space-time stream Nc for subcarrier k = sscidx(0) | 4 | Difference between the SNR for the corresponding subcarrier and the average SNR for all subcarriers of the corresponding time-space stream |
| . . . | . . . | . . . |
| Delta SNR for space-time stream 1 for subcarrier k = sscidx(1) | 4 | Difference between the SNR for the corresponding subcarrier and the average SNR for all subcarriers of the corresponding time-space stream |
| . . . | . . . | . . . |
| Delta SNR for space-time stream Nc for subcarrier k = sscidx(1) | 4 | Difference between the SNR for the corresponding subcarrier and the average SNR for all subcarriers of the corresponding time-space stream |
| . . . | . . . | . . . |
| Delta SNR for space-time stream 1 for subcarrier k = sscidx(Ns' − 1) | 4 | Difference between the SNR for the corresponding subcarrier and the average SNR for all subcarriers of the corresponding time-space stream |
| . . . | . . . | . . . |
| Delta SNR for space-time stream Nc for subcarrier k = sscidx(Ns' − 1) | 4 | Difference between the SNR for the corresponding subcarrier and the average SNR for all subcarriers of the corresponding time-space stream |

Referring to Table 9, the SNR per time-space stream may be included for each subcarrier in the MU Exclusive Beamforming Report field.

Each Delta SNR subfield has a value which increases by 1 dB between −8 dB and 7 dB.

scidx( ) represents the subcarrier(s) in which the Delta SNR subfield is transmitted and Ns means the number of subcarriers in which the Delta SNR subfield is transmitted.

FIG. 15 is a diagram illustrating a beamforming report poll frame format in the wireless communication system to which the present invention may be applied.

Referring to FIG. 15, the Beamforming Report Poll frame is configured to include the Frame Control field, the Duration field, the Receiving Address (RA) field, the Transmitting Address (TA) field, the Feedback Segment Retransmission Bitmap field, and the FCS.

The RA field value represents the address of an intended recipient.

The TA field value represents a bandwidth for signaling the address of the STA which transmits the Beamforming Report Poll or the TA.

The Feedback Segment Retransmission Bitmap field indicates the feedback segment requested by the VHT Compressed Beamforming report.

In the Feedback Segment Retransmission Bitmap field value, when the bit of position n is '1' (in the case of the LSB, n=0 and in the case of the MSB, n=7), the feedback segment corresponding to n in the Remaining Feedback Segments subfield in the VHT MIMO Control field of the VHT compressed beamforming frame is requested. On the contrary, when the bit of position n is '0', the feedback segment corresponding to n in the Remaining Feedback Segments subfield in the VHT MIMO Control field is not requested.

Group ID

Since the VHT WLAN system supports the MU-MIMO transmission method for higher throughput, the AP may simultaneously transmit the data frame to one or more STAs which are MIMO-paired. The AP may simultaneously transmit data to the STA group including one or more STAs among the plurality of STAs which are associated therewith. For example, the maximum number of paired STA may be 4 and when the maximum of time-space streams is 8, a maximum of 4 time-space streams may be allocated to each STA.

Further, in the WLAN system that supports Tunneled Direct Link Setup (TDLS), Direct Link Setup (DLS), or a mesh network, the STA that intends to transmit data may transmit the PPDU to the plurality of STAs by using the MU-MIMO transmission technique.

Hereinafter, the case in which the AP transmits the PPDU to the plurality of STAs according to the MU-MIMO transmission technique will be described as an example.

The AP simultaneously transmits the PPDU to the STAs which belongs to the transmission target STA group, which are paired through different spatial streams. As described above, the VHT-SIG A field of the VHT PPDU format includes the group ID information and the time-space stream information, and as a result, each STA may verify whether the corresponding PPDU is a PPDU transmitted thereto. In this case, since the spatial stream is not allocated to a specific STA of the transmission target STA group, data may not be transmitted.

A Group ID Management frame is used in order to assign or change user positions corresponding to one or more Group IDs. That is, the AP may announce STAs connected with a specific group ID through the Group ID Management frame before performing MU-MIMO transmission.

FIG. 16 is a diagram illustrating a Group ID management frame in the wireless communication system to which the present invention may be applied.

Referring to FIG. 16, the Group ID Management as the VHT action frame for supporting the VHT function includes the Action field in the frame body. The Action field provides a mechanism for specifying management operations included in and extended to the frame body of the MAC frame.

The Action field is constituted by the Category field, the VHT Action field, a Membership Status Array field, and a User Position Array field.

The Category field is set to the value indicating a VHT category (that is, VHT Action frame) and the VHT Action field is set to a value indicating the Group ID Management frame.

The Membership Status Array field is comprised of a Membership Status subfield of 1 bit for each group. When the Membership Status subfield is set to '0', the Membership Status subfield indicates that the STA is not a member of the corresponding group and when the Membership Status subfield is set to '1', the Membership Status subfield indicates that the STA is the member of the corresponding group. One or more Membership Status subfields in the Membership Status Array field are set to '1' to allocate one or more groups to the STA.

The STA may have one user position in each group which belongs thereto.

The User Position Array field is comprised of a User Position subfield of 2 bit for each group. The user position of the STA in the group which belongs to the STA is indicated by the User Position subfield in the User Position Array field. The AP may allocate the same user position to different STAs in each group.

The AP may transmit the Group ID Management frame only when a dot11VHTOptionImplemented parameter is 'true'. The Group ID Management frame is transmitted only to a VHT STA in which an MU Beamformee Capable field in a VHT Capabilities element field is set to '1'. The Group ID Management frame is transmitted to a frame addressed to each STA.

The STA receives the Group ID Management frame having the RA field which matches the MAC address thereof. The STA updates GROUP_ID_MANAGEMENT which is a PHYCONFIG_VECTOR parameter based on contents of the Group ID Management frame which are received.

Transmission of the Group ID Management to the STA and transmission of the ACK from the STA therefor are completed before transmitting the MU PPDU to the STA.

The MU PPDU is transmitted to the STA based on the contents of the Group ID Management frame most recently transmitted to the STA and the ACK is received.

DL MU-MIMO Frame

FIG. 17 is a view illustrating a downlink (DL) multi-user PPDU format in a wireless communication system to which the present invention is applicable.

Referring to FIG. 17, the PPDU includes a preamble and a data field. The data field may include a service field, a scrambled PSDU field, tail bits, and padding bits.

An AP may aggregate MPDUs to transmit a data frame in an aggregated MPDU (A-MPDU). Here, the scrambled PSDU field may include the A-MPDU.

The A-MPDU may include a sequence of one or more A-MPDU subframes.

In the case of VHT PPDU, a length of each of the A-MPDU subframes is the multiple of 4 octets, and thus, in order to adjust the A-MPDU to a final octet of the PSDU, the A-MPDU may include a 0-3 end-of-frame (EOF) pad following a final A-MPDU subframe.

The A-MPDU subframe includes an MPDU delimiter, and an MPDU may be selectively included after the MPDU delimiter. Also, in order to make the length of each of the A-MPDU subframes excluding the final A-MPDU subframe the multiple of 4 octets, a pad octet is added to after the MPDU.

The MPDU delimiter includes a reserved field, an MPDU length field, a cyclic redundancy check (CRC) field, and a delimiter signature field.

In the case of the VHT PPDU, the MPDU delimiter may further include an EOF field. In a case in which the MPDU length field is 0 and an A-MPDU subframe used to pad or an A-MPDU includes only one MPDU, an EOF field of an A-MPDU subframe in which the corresponding MPDU is included is set to 1. In otherwise case, the EOF field is set to 0.

The MPDU length field includes information regarding a length of the MPDU.

In a case in which the MPDU is not present in a corresponding A-MPDU subframe, it is set to 0. An A-MPDU subframe in which a PDU length field has a value of 0 is used when a corresponding A-MPDU is padded to adjust the A-MPDU to an available octet of VHT PPDU.

The CRC field includes CRC information for checking an error, and the delimiter signature field includes pattern information used for searching for an MPDU delimiter.

The MPDU includes a MAC header, a frame body, and a frame check sequence (FCS).

FIG. 18 is a view illustrating a DL multi-user PPDU format in a wireless communication system to which the present invention is applicable.

In FIG. 18, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 18, the MU PPDU is configured to include L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is '0' is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All MPDUs transmitted in the VHT MU PPDU based on 802.11ac are included in the A-MPDU. In the data field of FIG. 18, each VHT A-MPDU may be transmitted in different streams.

In FIG. 18, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 can be referred to as a null subframe.

As described above, in the null subframe, the EOF field of the MPDU Delimiter is set to '1'. Thus, when the EOF field set to '1' is detected in the MAC layer of an STA on the receiving side, the reception of the physical layer is stopped, thereby being capable of reducing power consumption.

Block Ack Procedure

FIG. 19 is a diagram illustrating a downlink MU-MIMO transmission process in the wireless communication system to which the present invention may be applied.

In 802.11ac, the MU-MIMO is defined in downlink toward the client (that is, non-AP STA) from the AP. In this case, a multi-user frame is simultaneously transmitted to multiple recipients, but reception acknowledgement needs to be individually transmitted in uplink.

Since all MPDUs transmitted in the VHT MU PPDU based on 802.11ac are included in the A-MPDU, not an immediate response to the VHT MU PPDU but a response to the A-MPDU in the VHT MU PPDU is transmitted in response to a block Ack request (BAR) frame by the AP.

First, the AP transmits the VHT MU PPDU (that is, a preamble and data) to all recipients (that is, STA 1, STA 2, and STA 3). The VHT MU PPDU includes the VHT A-MPDU transmitted to each STA.

STA 1 that receives the VHT MU PPDU from the AP transmits a block acknowledgement (ACK) frame to the AP after the SIFS. More detailed description of the BA frame will be made below.

The AP that receives the BA from STA 1 transmits block acknowledgement request (BAR) to next STA 2 after the SIFS and STA 2 transmits the BA frame to the AP after the SIFS. The AP that receives the BA frame from STA 2 transmits the BAR frame to STA 3 after the SIFS and STA 3 transmits the BA frame to the AP after the SIFS.

When such a process is performed with respect to all STAs, the AP transmits the next MU PPDU to all STAs.

ACK(Acknowledgement)/Block ACK(Block ACK) Frame

In general, an ACK frame is used as a response to an MPDU, and a block ACK frame is used as a response of an A-MPDU.

FIG. 20 is a view illustrating an ACK frame in a wireless communication system to which the present invention is applicable.

Referring to FIG. 20, the ACK frame includes a frame control field, a duration field, an RA field, and an FCS.

The RA field is set to a value of a second address (Address 2) of an immediately previously received data frame, a management frame, a block ACK request frame, a block ACK frame, or a PS-Poll frame.

In a case in which the ACK frame is transmitted by a non-QoS station (STA), when a more fragment subfield of a frame control field of the immediately previously received data frame or the management frame is 0, the duration value is set to 0.

In the ACK frame not transmitted by the non-QoS STA, the duration value is set to a value (ms) obtained by subtracting a time required for transmission of the ACK frame and an SIFS section from a duration/ID field of the immediately previously received data frame, the management frame, the block ACK request frame, the block ACK frame, or the PS-Poll frame. When the calculated duration value is not an integer value, the duration value is rounded off.

Hereinafter, the block ACK (request) frame will be described.

FIG. 21 is a view illustrating an ACK block request frame in a wireless communication system to which the present invention is applicable.

Referring to FIG. 21, the block ACK request (BAR) includes a frame control field, a duration/ID field, a reception address (RA) field, a transmission address (TA) field, a BAR control field, a BAR information field, and a frame check sequence (FCS).

The RA field may be set to an address of an STA which receives a BAR frame.

The TA field may be set to an address of an STA which transmits a BAR frame.

The BAR control field includes a BAR Ack policy subfield, a multi-TID subfield, a compressed bitmap subfield, a reserved subfield, and a TID information (TID_Info) subfield.

Table 10 illustrates the BAR control field.

Also, the Block Ack Starting Sequence Control subfield includes a fragment number subfield and a starting sequence number subfield.

The fragment number subfield is set to 0.

In the case of the basic BAR frame, the starting sequence number subfield includes a sequence number of a first MSDU in which a corresponding BAR frame is transmitted. In the case of the compressed BAR frame, the starting sequence control subfield includes a sequence number of a first MSDU or an A-MSDU in which a corresponding BAR frame is to be transmitted or.

Referring to FIG. 22(b), in the case of the multi-TID BAR frame, the BAR information field is configured such that a Per TID Info subfield and a block ACK starting sequence control subfield are repeated in one or more TIDs.

The Per TID Info subfield includes a reserved subfield and a TID value subfield. The TID value subfield includes a TID value.

The Block Ack Starting Sequence Control subfield includes the Fragment Number subfield and Starting Sequence Number subfield as described above. The Fragment Number subfield is set to 0. The Starting Sequence Control subfield includes a sequence number of a first MSDU or the A-MSDU in which a corresponding BAR frame is to be transmitted.

FIG. 23 is a view illustrating a block ACK frame in a wireless communication system to which the present invention is applicable.

TABLE 10

| Subfield | Bit | Description |
| --- | --- | --- |
| BAR Ack Policy | 1 | It is set to 0 when transmitter requests immediate ACK. It is set to 1 when transmitter does not request immediate ACK. |
| Multi-TID | 1 | It indicates type of BAR frame according to multi-TID subfield and compressed bitmap subfield value |
| Compressed Bitmap | 1 | 00: Basic BAR 01: Compressed BAR 10: Reserved value 11: Multi-TID BAR |
| Reserved | 9 | |
| TID_Info | 4 | Meaning of TID_Info field is determined according to type of BAR frame. In the case of basic BAR frame or compressed BAR frame, it includes TID in which BA frame is requested. In the case of multi-TID BAR frame, it includes number of TIDs. |

The BAR information field includes different information according to a type of the BAR frame. This will be described with reference to FIG. 22.

FIG. 22 is a view illustrating a BAR information field of a block ACK request frame in a wireless communication system to which the present invention is applicable.

FIG. 22(a) illustrates a BAR information field of the basic BAR frame and the compressed BAR frame, and FIG. 22(b) illustrates a BAR information field of the multi-TID BAR frame.

Referring to FIG. 22(a), in the case of the basic BAR frame and the compressed BAR frame, the BAR information field includes a block ACK starting sequence control subfield.

Referring to FIG. 23, the block ACK (BA) frame includes a frame control field, a duration/ID field, a reception address (RA) field, a transmission address (TA) field, a BA control field, a BA information field, and a frame check sequence (FCS).

The RA field may be set to an address of an STA which has requested a block ACK.

The TA field may be set to an address of an STA which transmits a BA frame.

The BA control field includes a BA Ack policy subfield, a multi-TID subfield, a compressed bitmap subfield, a reserved subfield, and TID information (TID_Info) subfield.

Table 11 illustrates a BA control field.

TABLE 11

| Subfield | Bit | Description |
| --- | --- | --- |
| BA Ack Policy | 1 | It is set to 0 when transmitter requests immediate ACK. It is set to 1 when transmitter does not request immediate ACK. |
| Multi-TID | 1 | It indicates type of BA frame according to multi-TID subfield and compressed bitmap subfield value |
| Compressed Bitmap | 1 | 00: Basic BA<br>01: Compressed BA<br>10: Reserved value<br>11: Multi-TID BA |
| Reserved | 9 | |
| TID_Info | 4 | Meaning of TID_Info field is determined according to type of BA frame.<br>In the case of basic BA frame or compressed BA frame, it includes TID requesting BA frame.<br>In the case of multi-TID BA frame, it includes number of TIDs. |

The BA information field includes different information according to a type of the BA frame. This will be described with reference to FIG. 24.

FIG. 24 is a view illustrating a BA information field of the block ACK frame in a wireless communication system to which the present invention is applicable.

FIG. 24(a) illustrates a BA information field of a basic BA frame, FIG. 24(b) illustrates a BA information field of a compressed BA frame, and FIG. 24(c) illustrates a BA information field of a multi-TID BA frame.

Referring to FIG. 24(a), in the case of the basic BA frame, the BA information field includes a Block ACK Starting Sequence Control subfield and a Block ACK Bitmap subfield.

The Block Ack Starting Sequence Control subfield includes a Fragment Number subfield and a Starting Sequence Number subfield as described above.

The Fragment Number subfield is set to 0.

The Starting Sequence Number subfield includes a sequence number of a first MSDU for transmitting a corresponding BA frame and is set to the same value as that of an immediately previously received Basic BAR frame.

The Block Ack Bitmap subfield has a length of 128 octets, and is used to indicate a reception state of up to 64 MSDUs. In the Block Ack Bitmap subfield, value 1 indicates that an MPDU corresponding to a corresponding bit position has been successfully received, and a value 0 indicates that an MPDU corresponding to a corresponding bit position has not been successfully received.

Referring to FIG. 24(b), in the case of the Compressed BA frame, the BA Information field includes a Block Ack Starting Sequence Control subfield and a Block Ack Bitmap subfield.

The Block Ack Starting Sequence Control subfield includes a Fragment Number subfield and a Starting Sequence Number subfield.

The Fragment Number subfield is set to 0.

The Starting Sequence Number subfield includes a sequence number of a first MSDU or A-MSDU for transmitting a corresponding BA frame, and is set to the same value as that of the immediately previously received Basic BAR frame.

The Block Ack Bitmap subfield has a length of 8 octets, and is used to indicate a reception state of up to 64 MSDUs and A-MSDUs. Value 1 of the Block Ack Bitmap subfield indicates that a single MSDU or A-MSDU corresponding to a corresponding bit position has been successfully received, and value 0 indicates that a single MSDU or A-MSDU corresponding to a corresponding bit position has not been successfully received.

Referring to FIG. 24(c), in the case of the multi-TID BA frame, a BA Information field includes a per TID Info subfield, a Block Ack Starting Sequence Control subfield, and a Block Ack Bitmap subfield repeated by one or more TIDs and is configured in order that TIDs are increased.

The Per TID Info subfield includes a reserved subfield and a TID Value subfield. The TID Value subfield includes a TID value.

The Block Ack Starting Sequence Control subfield includes the Fragment Number and Starting Sequence Number subfields as described above. The Fragment Number subfield is set to 0. The Starting Sequence Control subfield includes a sequence number of a first MSDU or A-MSDU in which a corresponding BA frame is to be transmitted.

The Block Ack Bitmap subfield has a length of 8 octets. In the Block Ack Bitmap subfield, value 1 indicates that a single MSDU or A-MSDU corresponding to a corresponding bit position has been successfully received, and value 0 indicates that a single MSDU or A-MSDU corresponding to a corresponding bit position has not been successfully received.

Uplink SU/MU Transmission Method

With a lot of attention of vendors of various fields paid regarding next-generation Wi-Fi and demand for high throughput and enhancement of quality of experience (QoE) performance increased following 802.11ac, a new frame format and numerology for a 802.11ax system as a next-generation WLAN system have been actively discussed.

IEEE 802.11ax as a next-generation WLAN system for supporting higher data rate and processing a higher user load is one of WLAN systems that have been newly proposed in recent years is called high efficiency WLAN (HEW).

The IEEE 802.11ax WLAN system may operate in a 2.4 GHz frequency band and a 5 GHz frequency band similarly to the existing WLA system. Further, the IEEE 802.11ax WLAN system may operate even in a 60 GHz frequency band higher therethan.

In the IEEE 802.11ax system, in order to ensure an average throughput enhancement and outdoor robust transmission over inter-symbol interference, an FFT size four times greater in each bandwidth than that of the existing IEEE 802.11 OFDM system (IEEE 802.11a, 802.11n, 802.11ac, etc.) may be used. This will be described with reference to FIG. 25

Hereinafter, in describing an HE format PPDU of the present invention, above descriptions of a non-HT format PPDU, an HT-mixed format PPDU, an HT-green field format PPDU and/or a VHT format PPDU may be incorporated in the descriptions of an HE format PPDU, unless otherwise mentioned.

FIG. 25 is diagrams illustrating a high efficiency (HE) format PPDU according to an embodiment of the present invention.

FIG. 25(*a*) illustrates a schematic structure of the HE format PPDU and FIGS. 25(*b*) to 25(*d*) illustrates a more detailed structure of the HE format PPDU.

Referring to FIG. 25(*a*), the HE format PPDU for the HEW may be generally comprised of a legacy part (L-part), an HE part (HE-part), and a data field (HE-data).

The L-part includes an L-STF field, an L-LTF field, and an L-SIG field which are the same as a form maintained in an existing WLAN system. The L-STF field, the L-LTF field, and the L-SIG field may also be termed a legacy preamble.

The HE-part is a part newly defined for 802.11ax standard and may include an HE-STF field, an HE-SIG field, and an HE-LTF field. In FIG. 25(*a*), the HE-STF field, the HE-SIG field, and the HE-LTF field are sequentially illustrated, but these fields may also be configured in different order. Also, the HE-LTF may be omitted. The HE-SIG field, as well as the HE-SFT field and the HE-LTF field, may be generally called an HE-preamble.

Also, the L-part, HE-SIG field, and the HE-preamble may be generally called a physical (PHY) preamble.

The HE-SIG may include information (e.g., OFDMA, UL MU MIMO, enhanced MCS, etc.) for decoding an HE-data field.

The L-part and the HE-part may have different Fast Fourier Transform (FFT_size (i.e., subcarrier spacing), and may use different cyclic prefix (CP).

The 802.11ax system may use (4×) FFT four times greater than that of a legacy WLAN system. That is, the L-part has a 1× symbol structure and the HE-part (in particular, HE-preamble and HE-data) may be configured to have a 4× symbol structure. Here, the 1×, 2×, and 4×-sized FFT refers to a relative size with respect to a legacy WLAN system (e.g., IEEE 802.11a, 802.11n, 802.11ac, etc.)

For example, when the FFT sizes used in the L-part are 64, 128, 256, and 512 respectively in 20 MHz, 40 MHz, 80 MHz, and 160 MHz, FFT sizes used in the HE-part may be 256, 512, 1024, and 2048, respectively, in 20 MHz, 40 MHz, 80 MHz, and 160 MHz.

In this manner, when the FFT size is increased to be greater than that of the legacy WLAN system, subcarrier frequency spacing is reduced, increasing the number of subcarriers per unit frequency but increasing a length of an OFDM symbol.

That is, the use of greater FFT size refers to narrowed subcarrier spacing and also increased IDFT (Inverse Discrete Fourier Transform)/DFT (Discrete Fourier Transform) period. Here, the IDTF/DTF period may refer to a symbol length excluding a guard interval (GI) in an OFDM symbol.

Thus, when an FFT size four times greater than that of the L-part is used in the HE-part (in particular, HE-preamble and HE-data), subcarrier spacing of the HE-part is ¼ times subcarrier spacing of the L-part and an IDFT/DFT period of the HE-part is four times an IDFT/DFT period of L-part. For example, when subcarrier spacing of the L-part is 312.5 kHz (=20 MHz/64, 40 MHZ/128, 80 MHz/256 and/or 160 MHz/512), subcarrier spacing of the HE-part may be 78.125 kHz (=20 MHz/256, 40 MHZ/512, 80 MHz/1024 and/or 160 MHz/2048). Also, when an IDFT/DFT of the L-part is 3.2 μs (=1/312.5 kHz), an IDFT/DFT period of the HE-part may be 12.8 μs (=1/78.125 kHz).

Here, for the GI, one of 0.8 μs, 1.6 μs, 3.2 μs may be used, and thus, an OFDM symbol length (or symbol interval) of the HE-part including GI may be 13.6 μs, 14.4 μs, 16 μs according to the GI.

Referring to FIG. 25(*b*), the HE-SIG field may be divided into an HE-SIG A field and an HE-SIG B field.

For example, the HE-part of the HE format PPDU may include an HE-SIG A field having a length of 12.8 μs, an HE-STF field of 1 OFDM symbol, one or more HE-LTF fields, and an HE-SIG B field of 1 OFDM symbol.

Further, in the HE-part, FFT having a size which is four times larger than the existing PPDU may be applied from the HE-STF field except for the HE-SIG A field. That is, FFT having sizes of 256, 512, 1024, and 2048 may be applied from the HE-STF fields of the HE format PPDUs of 20 MHz, 40 MHz, 80 MHz, and 160 MH, respectively.

However, as illustrated in FIG. 25(*b*), when the HE-SIG is transmitted while being divided into the HE-SIG A field and the HE-SIG B field, the positions of the HE-SIG A field and the HE-SIG B field may be different from those of FIG. 25(*b*). For example, the HE-SIG B field may be transmitted after the HE-SIG A field, and the HE-STF field and the HE-LTF field may be transmitted after the HE-SIG B field. Similarly even in this case, FFT having a size which is four times larger than the existing PPDU may be applied from the HE-STF field.

Referring to FIG. 25(*c*), the HE-SIG field may not be divided into the HE-SIG A field and the HE-SIG B field.

For example, the HE-part of the HE format PPDU may include the HE-STF field of 1 OFDM symbol, the HE-SIG field of 1 OFDM symbol and one or more HE-LTF fields.

Similarly thereto, the FFT having a size which is four times larger than the existing PPDU may be applied from the HE-part. That is, the FFT having sizes of 256, 512, 1024, and 2048 may be applied from the HE-STF fields of the HE format PPDUs of 20 MHz, 40 MHz, 80 MHz, and 160 MH, respectively.

Referring to FIG. 25(*d*), the HE-SIG field may not be divided into the HE-SIG A field and the HE-SIG B field and the HE-LTF field may be omitted.

For example, the HE-part of the HE format PPDU may include the HE-STF field of 1 OFDM symbol and the HE-SIG field of 1 OFDM symbol.

Similarly thereto, the FFT having a size which is four times larger than the existing PPDU may be applied to the HE-part. That is, the FFT having sizes of 256, 512, 1024, and 2048 may be applied from the HE-STF fields of the HE format PPDUs of 20 MHz, 40 MHz, 80 MHz, and 160 MH, respectively.

The HE format PPDU for the WLAN system according to the present invention may be transmitted through at least one 20-MHz channel. For example, the HE format PPDU may be transmitted in the 40 MHz, 80 MHz, or 160 MHz frequency band through a total of four 20-MHz channel. This will be described in more detail with reference to a drawing given below.

Figure 26:
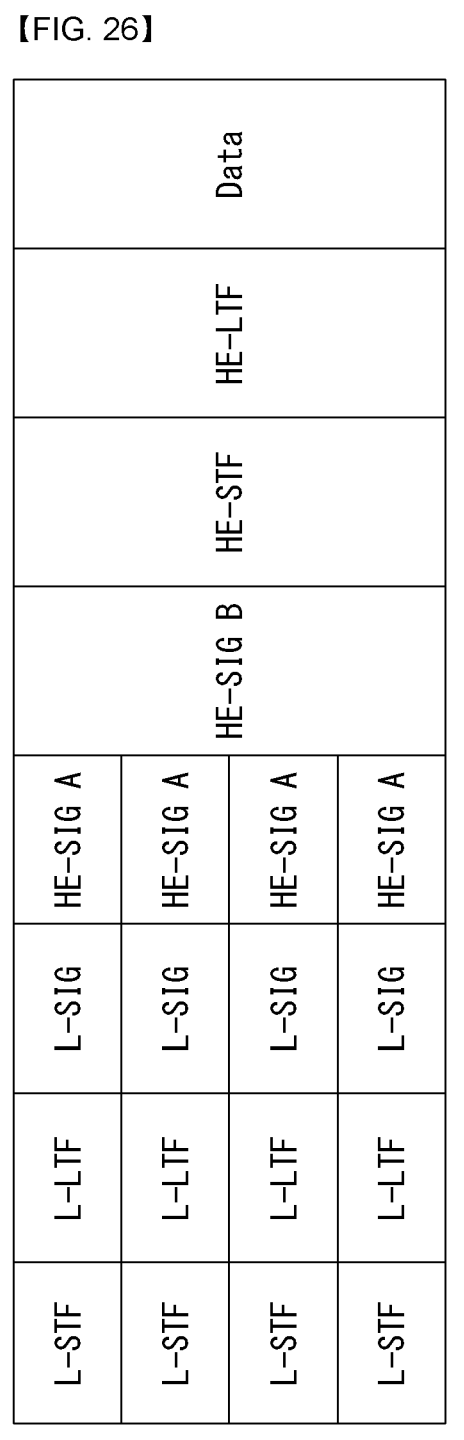

FIG. 26 is a diagram illustrating an HE format PPDU according to an embodiment of the present invention.

In FIG. 26, the PPDU format when 80 MHz is allocated to one STA (or when an OFDMA resource unit is allocated to a plurality of STAs within 80 MHz) or when different streams of 80 MHz are allocated to the plurality of STAs, respectively is illustrated.

Referring to FIG. 26, the L-STF, the L-LTF, and the L-SIG may be transmitted to the OFDM symbol generated based on 64 FFT points (alternatively, 64 subcarriers) in each 20-MHz channel.

The HE-SIG A field may include common control information commonly transmitted to the STAs receiving the PPDU. The HE-SIG A field may be transmitted in one to three OFDM symbols. The HE-SIG A field is duplicated by the unit of 20 MHz and includes the same information. Further, the HE-SIG-A field announces total bandwidth information of the system.

Table 12 is a diagram illustrating information included in the HE-SIG A field.

TABLE 12

| Field | The number of bits | Description |
| --- | --- | --- |
| Bandwidth | 2 | Indicates the bandwidth in which the PDDU is transmitted For example, 20 MHz, 40 MHz, 80 MHz, or 160 MHz |
| Group ID | 6 | Indicates the STA or the group of the STAs which will receive the PPDU |
| Stream information | 12 | Indicates the position or the number of the spatial stream for each STA, or indicates the position or the number of the spatial stream for the group of the STAs |
| UL indication | 1 | Indicates whether the PPDU is transmitted toward the AP (uplink) or the STA (downlink) |
| MU indication | 1 | Indicates whether the PPDU is the SU-MIMO PPDU or the MU-MIMO PPDU |
| GI indication | 1 | Indicates whether a short GI or a long GI is used |
| Allocation information | 12 | Indicates a band or channel (subchannel index or subband index) allocated to each STA in a band in which the PPDU is transmitted |
| Transmission power | 12 | Indicates transmission power for each channel or each STA |

The information included in the respective fields may follow the definition of the IEEE 802.11 system. Further, the respective fields correspond to examples of the fields which may be included in the PPDU and are not limited thereto. That is, each field may be substituted with another field or further include an additional field and all fields may not be requisitely included.

The HE-STF is used to enhance performance of AGC estimation in MIMO transmission.

The HE-SIG B field may include user-specific information required for each STA to receive data (for example, PSDU) thereof. The HE-SIG B field may be transmitted in one or two OFDM symbols. For example, the HE-SIG B field may include a modulation and coding scheme (MCS) of the corresponding PSDU and information on the length of the PSDU.

The L-STF, L-LTF, L-SIG, and HE-SIG A fields may be repeatedly transmitted by the unit of the 20-MHz channel. For example, when the PPDU is transmitted through four 20-MHz channels (that is, 80-MHz band), the L-STF, L-LTF, L-SIG, and HE-SIG A fields may be repeatedly transmitted by the unit of the 20-MHz channel.

When the size of the FFT increases, the legacy STA supporting the existing IEEE 802.11a/g/n/ac may not decode the corresponding HE PPDU. The L-STF, L-LTF and L-SIG fields are transmitted through 64 FFT in the 20-MHz channel so as to be received by the legacy STA so that the legacy STA and the HE STA coexist. For example, the L-SIG field may occupy one OFDM symbol, one OFDM symbol time may be 4 μs, and the GI may be 0.8 μs.

The FFT size for each frequency unit may further increase from the HE-STF (alternatively, HE-SIG A). For example, 256 FFT may be used in the 20-MHz channel, 512 FFT may be used in the 40-MHz channel, and 1024 FFT may be used in the 80-MHz channel. When the FFT size increases, an interval between OFDM subcarriers decreases, and as a result, the number of OFDM subcarriers per frequency increases, but the OFDM symbol time is lengthened. For improvement the efficiency of the system, the length of the GI after the HE-STF may be set to be the same as the length of the GI of the HE-SIG A.

The HE-SIG A field may include information required for the HE STA to decode the HE PPDU. However, the HE-SIG A field may be transmitted in the 20-MHz channel through 64 FFT so as to be received by both the legacy STA and the HE STA. The reason is that the HE STA may receive the existing HT/VHT format PPDU as well as the HE format PPDU, and the legacy STA and the HE STA need to distinguish the HT/VHT format PPDU and the HE format PPDU.

FIG. 27 is a diagram illustrating an HE format PPDU according to an embodiment of the present invention.

In FIG. 27, a case in which 20-MHz channels are allocated to different STAs (for example, STA 1, STA 2, STA 3, and STA 4), respectively is assumed.

Referring to FIG. 27, the FFT size per frequency may further increase from the HE-STF (alternatively, HE-SIG B). For example, 256 FFT may be used in the 20-MHz channel from the HE-STF (alternatively, HE-SIG B), 512 FFT may be used in the 40-MHz channel, and 1024 FFT may be used in the 80-MHz channel.

Since the information transmitted in each field included in the PPDU is the same as the example of FIG. 26, description of the information will be hereinafter omitted.

The HE-SIG B field may include information specific to each STA, but be encoded throughout all bands (that is, indicated in the HE-SIG A field). That is, the HE-SIG B field includes information on all STAs and all STAs receive the HE-SIG B field.

The HE-SIG B field may announce frequency bandwidth information allocated for each STA and/or stream information in the corresponding frequency band. For example, in FIG. 27, in the HE-SIG B, 20 MHz may be allocated to STA 1, the next 20 MHz may be allocated to STA 2, the next 20 MHz may be allocated to STA 3, and the next 20 MHz may be allocated to STA 4. Further, 40 MHz may be allocated to STA 1 and STA 2 and the next 40 MHz may be allocated to STA 3 and STA 4. In this case, different streams may be allocated to STA 1 and STA 2 and different streams may be allocated to STA 3 and STA 4.

Further, the HE-SIG C field is defined to add the HE-SIG C field to the example of FIG. 27. In this case, in the HE-SIG B field, information on all STAs may be transmitted throughout all bands and control information specific to each STA may be transmitted by the unit of 20 MHz through the HE-SIG C field.

Further, unlike the examples of FIGS. 26 and 27, the HE-SIG B field may not be transmitted through all bands but transmitted by the unit of 20 MHz similarly to the HE-SIG A field. This will be described in detail with reference to the following drawings.

FIG. 28 is a diagram illustrating an HE format PPDU according to an embodiment of the present invention.

In FIG. 28, the case in which 20-MHz channels are allocated to different STAs (for example, STA 1, STA 2, STA 3, and STA 4), respectively is assumed.

Referring to FIG. 28, the HE-SIG-B field is transmitted in units of 20 MHz, the same as that of the HE-SIG-A field, rather than being transmitted in the entire band. Here, however, the HE-SIG-B is encoded and transmitted in units of 20 MHz different from that of the HE-SIG-A field, but may not be duplicated and transmitted in units of 20 MHz.

In this case, the FFT size per frequency may further increase from the HE-STF (alternatively, HE-SIG B). For example, 256 FFT may be used in the 20-MHz channel from the HE-STF (alternatively, HE-SIG B), 512 FFT may be used in the 40-MHz channel, and 1024 FFT may be used in the 80-MHz channel.

Since the information transmitted in each field included in the PPDU is the same as the example of FIG. 26, description of the information will be hereinafter omitted.

The HE-SIG A field is transmitted while being duplicated by the unit of 20 MHz.

The HE-SIG B field may announce the frequency bandwidth information allocated for each STA and/or the stream information in the corresponding frequency band. Since the HE-SIG B field includes the information on each STA, the information on each STA may be included for each HE-SIG B field of the unit of 20 MHz. In this case, in the example of FIG. 28, the case in which 20 MHz is allocated for each STA is exemplified, but for example, when 40 MHz is allocated to the STA, the HE-SIG B field may be duplicated and transmitted by the unit of 20 MHz.

When a partial bandwidth having a low interference level from an neighboring BSS is allocated to the STA in an environment in which different bandwidths are supported for each BSS, it may be more preferable not to transmit the HE-SIG B field throughout all bands as described above.

In FIGS. 26 to 28, the data field as a payload may include a Service field, a scrambled PSDU, tail bits, and padding bits.

Meanwhile, the HE format PPDU as illustrated in FIGS. 26 to 28 may be distinguished through an RL-SIG (Repeated L-SIG) field as a repetitive symbol of the L-SIG field. The RL-SIG field may be inserted before the HE-SIG-A field, and each STA may identify a format of a received PPDU as an HE format by using the RL-SIG field.

FIG. 29 is a view illustrating an HE format PPDU of an 20 MHz band according to an embodiment of the present invention.

Referring to FIG. 29, in the 20 MHz HE format PPDU structure, the L-part (L-STF, L-LTF, and L-SIG fields), and the HE-SIG1 (e.g., the HE-SIG-A) are transmitted in the same manner as those of the legacy structure.

As illustrated in FIG. 29(a), FFT (e.g., 256 FFT) may be used, starting from HE-STF.

The HE-LTF may be transmitted before the HE-SIG2 (for example, HE-SIG-B), but only the HE-LTF for the first stream may be transmitted before the HE-SIG2 and the remaining HE-LTF may be transmitted after the HE-.

Also, as illustrated in FIG. 29(b), when the HE-SIG2 (e.g., HE-SIG-B) comes before the HE-STF and the HE-LTF, the HE-SIG2 may use 64 FFT and different FFT (e.g., 256 FFT) may be used, starting from the HE-STF. Here, the HE-SIG2 may be transmitted in the same manner (64 FFT) as that of the legacy structure, and the FFT size may be the same as that of the legacy structure and the number of used tones may be different from each other. Also, as illustrated in FIG. 29(a), different FFT (e.g., 256 FFT) may be used, starting from HE-SIG2.

FIG. 30 is a view illustrating an HE format PPDU of 40 MHz band according to an embodiment of the present invention.

Referring to FIG. 30, the HE format PPDU structure higher than 20 MHz (e.g., 40, 80, 160 MHz, etc.) is based on the structure of 20 MHz described above and the L-part (-STF, L-LTF, and L-SIG fields) and the HE-SIG1 field (e.g., HE-SIG-A field) are duplicated in units of 20 MHz.

As illustrated in FIG. 30(a), starting from HE-STF, information is included across the entire band. Also, starting from the HE-STF, different FFT (e.g., 512 FFT) may be used.

As illustrated in FIG. 30(b), starting from the HE-SIG2 (e.g., the HE-SIG-B field), information is included across the entire band. However, the HE-SIG2 may be transmitted by the number of bands (in case of FIG. 30, 128 FFT) of 64 FFT×20 MHz unit like the existing structure and a different FFT (e.g., 512 FFT) may be used, starting from HE-STF. Also, the HE-SIG2 may also be duplicated and transmitted in units of 20 MHz using the existing FFT or using an extended FFT (e.g., 512 FFT), starting from the HE-STF.

A scheme in which an AP operated in a WLAN system transmits data to a plurality of STAs in the same time resource may be referred to as a downlink multi-user (DL MU) transmission. Conversely, a scheme in which a plurality of STAs operated in the WLAN system transmit data to an AP in the same time resource may be referred to as UL MU transmission.

Such DL MU transmission or UL MU transmission may be multiplexed in a frequency domain or a spatial domain.

When the DL MU transmission or UL MU transmission is multiplexed in the frequency domain, different frequency resources (e.g., subcarrier or tone) may be allocated as DL or UL resource to each of the plurality of STAs based on orthogonal frequency division multiplexing (OFDMA). Such a transmission scheme through different frequency resources in the same time resource may be termed a "DL/UL OFDMA transmission".

When the DL MU transmission or UL MU transmission is multiplexed in the spatial domain, different spatial streams may be allocated as DL or UL resource to each of the plurality of STAs. Such a transmission scheme through the different spatial streams in the same time resource may be termed a "DL/UL MU MIMO".

Hereinafter, a MU UL transmission method in a WLAN system will be described.

At present, UL MU transmission may not be supported due to the following constraints in the WLAN system.

At present, in the WLAN system, synchronization with a transmission timing of the uplink data transmitted from the plurality of STAs is not supported. For example, when the case where the plurality of STAs transmits the uplink data through the same time resource in the existing WLAN system is assumed, the plurality of respective STAs may not know the transmission timing of the uplink data of another STA in the WLAN system at present. Accordingly, it is difficult for the AP to receive the uplink data on the same time resource from the plurality of respective STAs.

Further, frequency resources used for transmitting the uplink data may overlap with each other by the plurality of STAs in the WLAN system at present. For example, when oscillators of the plurality of respective STAs are different from each other, frequency offsets may be expressed to be different from each other. When the plurality of respective STAs in which the frequency offsets are different simultaneously performs the uplink transmission through different frequency resources, some of frequency areas used by the plurality of respective STAs may overlap with each other.

Further, in the existing WLAN system, power control for the plurality of respective STAs is not performed in the existing WLAN system. The AP may receive signals having different powers from the plurality of respective STAs dependently to distance and channel environments between each of the plurality of STAs and the AP. In this case, it may relatively more difficult for the AP to detect a signal which reaches with weak power than a signal which reaches with strong power.

Accordingly, the present invention proposes a UL MU transmission method in a WLAN system.

FIG. 31 is a diagram illustrating an uplink multi-user transmission procedure according to an embodiment of the present invention.

Referring to FIG. 31, the AP indicates preparing for the UL MU transmission to the STAs which participate in the UL MU transmission, receives a UL MU data frame from the corresponding STAs, and transmits the ACK frame (Block-Ack (BA) frame) in response to the UL MU data frame.

First, the AP transmits a UL MU trigger frame 3110 to indicate preparing for the UL MU transmission to the STAs that will transmit the UL MU data. Herein, the UL MU scheduling frame may also be called a term such as 'UL MU scheduling frame'.

Herein, the UL MU trigger frame 3110 may include control information including STA identifier (ID)/address information, resource allocation information to be used by each STA, duration information, and the like.

The STA ID/address information means information on an identifier or address for specifying each STA that transmits the uplink data.

The resource allocation information means information on an uplink transmission resource (for example, frequency/subcarrier information allocated to each STA in the case of the UL OFDMA transmission and a stream index allocated to each STA in the case of the UL MU MIMO transmission) allocated for each STA.

The duration information means information for determining a time resource for transmitting the uplink data frame transmitted by the plurality of respective STAs.

For example, the duration information may include interval information of a transmit opportunity (TXOP) allocated for uplink transmission of each STA, or information (for example, a bit or symbol) on the length of the uplink frame.

Further, the UL MU trigger frame 3110 may further include control information, including MCS information, coding information, and the like to be used at the time of transmitting the UL MU data frame for each STA.

The control information may be transmitted in the HE-part (for example, the HE-SIG A field or HE-SIG B field) of the PPDU transferring the trigger frame 3110 or a control field (for example, the frame control field of the MAC frame, and the like) of the UL MU scheduling frame 2510.

The PPDU transferring the UL MU trigger frame 3110 has a structure which starts with the L-part (for example, the L-STF field, the L-LTF field, the L-SIG field, and the like). As a result, the legacy STAs may perform network allocation vector (NAV) setting through L-SIG protection from the L-SIG field. For example, the legacy STAs may calculate a duration (hereinafter, 'L-SIG protection duration') for the NAV setting based on data length and data rate information in the L-SIG. In addition, the legacy STAs may determine that there is no data transmitted thereto during the calculated L-SIG protection duration.

For example, the L-SIG protection duration may be determined as the sum of an MAC duration field value of the UL MU trigger frame 3110 and a residual duration after the L-SIG field in the PPDU transferring the UL MU trigger frame 3110. As a result, the L-SIG protection duration may be set to a value up to a duration in which an ACK frame 3130 (or BA frame) transmitted to each STA is transmitted according to the MAC duration value of the UL MU trigger frame 3110.

Hereinafter, the resource allocation method for UL MU transmission to each STA will be described in more detail. For easy description, the field including the control information is distinguished and described, but the present invention is not limited thereto.

A first field may distinguish and indicate the UL OFDMA transmission and the UL MU MIMO transmission. For example, in the case of '0', the first field may indicate the UL MU OFDMA transmission and in the case of '1', the first field may indicate the UL MU MIMO transmission. The size of the first field may be configured by 1 bit.

A second field (for example, STA ID/address field) announces STA IDs or STA addresses that will participate in the UL MU transmission. The size of the second field may be configured by the number of bits for announcing the STA ID×the number of STAs which will participate in UL MU. For example, when the second field is configured by 12 bits, the second field may indicate the ID/address of each STA for each 4 bit.

A third field (for example, resource allocation field) indicates a resource area allocated to each STA for the UL MU transmission. In this case, the resource area allocated to each STA may be sequentially indicated to each STA according to the order of the second field.

When the first field value is '0', the third field value represents frequency information (for example, a frequency index, a subcarrier index, and the like) for the UL MU transmission in the order of the STA ID/address included in the second field and when the first field value is '1', the third field value represents MIMO information (for example, a stream index, and the like) for the UL MU transmission in the order of the STA ID/address included in the second field.

In this case, since multiple indexes (that is, the frequency/subcarrier index or stream index) may be known to one STA, the size of the third field may be configured by a plurality of bits (alternatively, may be configured in a bitmap format)× the number of STAs which will participate in the UL MU transmission.

For example, it is assumed that the second field is set in the order of 'STA 1' and 'STA 2' and the third field is set in the order of '2' and '2'.

In this case, when the first field is '1', the frequency resource may be allocated to STA 1 from a higher (alternatively, lower) frequency domain the next frequency resource may be sequentially allocated to STA 2. As one example, when 20 MHz-unit OFDMA is supported in the 80 MHz band, STA may use a higher (alternatively, lower) 40 MHz band and STA 2 may use the next 40 MHz band.

On the contrary, when the first field is '1', a higher (alternatively, lower) may be allocated to STA 1 and the next stream may be sequentially allocated to STA 2. In this case, a beamforming scheme depending on each stream may be predesignated or more detailed information on the beamforming scheme depending on the stream may be included in the third field or a fourth field.

Each STA transmits UL MU data frames 3121, 3122, and 3123 to the AP based on the UL MU trigger frame 3110 transmitted by the AP. Herein, each STA may receive the UL MU trigger frame 3110 and thereafter, transmit the UL MU data frames 3121, 3122, and 3123 to the AP after the SIFS.

Each STA may determine a specific frequency resource for the UL OFDMA transmission and the spatial stream for the UL MU MIMO transmission based on the resource allocation information of the UL MU trigger frame 3110.

In detail, in the case of the UL OFDMA transmission, the respective STAs may transmit the uplink data frame on the same time resource through different frequency resources.

Herein, respective STA 1 to STA3 may be allocated with different frequency resources for transmitting the uplink data frame based on the STA ID/address information and the resource allocation information included in the UL MU trigger frame 3110. For example, the STA ID/address information may sequentially indicate STA 1 to STA 3 and the resource allocation information may sequentially indicate frequency resource 1, frequency resource 2, and frequency resource 3. In this case, STA 1 to STA 3 sequentially indicated based on the STA ID/address information may be allocated with frequency resource 1, frequency resource 2, and frequency resource 3 sequentially indicated based on the resource allocation information, respectively. That is, STA 1, STA 2, and STA 3 may transmit the uplink data frames 3121, 3122, and 3123 to the AP through frequency 1, frequency 2, and frequency 3, respectively.

Further, in the case of the UL MU MIMO transmission, the respective STAs may transmit the uplink data frame on the same time resource through one or more different streams among the plurality of spatial streams.

Herein, respective STA 1 to STA3 may be allocated with the spatial streams for transmitting the uplink data frame based on the STA ID/address information and the resource allocation information included in the UL MU trigger frame 3110. For example, the STA ID/address information may sequentially indicate STA 1 to STA 3 and the resource allocation information may sequentially indicate spatial stream 1, spatial stream 2, and spatial stream 3. In this case, STA 1 to STA 3 sequentially indicated based on the STA ID/address information may be allocated with spatial stream 1, spatial stream 2, and spatial stream 3 sequentially indicated based on the resource allocation information, respectively. That is, STA 1, STA 2, and STA 3 may transmit the uplink data frames 3121, 3122, and 3123 to the AP through spatial stream 1, spatial stream 2, and spatial stream 3, respectively.

As described above, a transmission duration (alternatively, a transmission end time) of the uplink data frames 3121, 3122, and 3123 transmitted by each STA may be determined by the MAC duration information included in the UL MU trigger frame 3110. Accordingly, each STA may synchronize the transmission end time of the uplink data frames 3121, 3122, and 3123 (alternatively, the uplink PPDU transferring the uplink data frames) through bit padding or fragmentation based on the MAC duration value included in the UL MU trigger frame 3110.

The PPDU transferring the uplink data frames 3121, 3122, and 3123 may be configured even in a new structure without the L-part.

Further, in the case of the UL MU MIMO transmission or UL OFDMA transmission of a subband type less than 20 MHz, the L-part of the PPDU transferring the uplink data frames 3121, 3122, and 3123 may be transmitted in an single frequency network (SFN) scheme (that is, all STAs simultaneously transmit the same L-part configuration and content). On the contrary, in the case of the UL MU OFDMA transmission of a subband type equal to or more than 20 MHz, the L-part of the PPDU transferring the uplink data frames 3121, 3122, and 3123 may be transmitted by the unit of 20 MHz in the band to which each STA is allocated.

As described above, the MAC duration value in the UL MU trigger frame 3110 may be set to a value up to a duration in which the ACK frame 3130 is transmitted and the L-SIG protection section may be determined based on the MAC duration value. Accordingly, the legacy STA may perform the NAV setting up to the ACK frame 3130 through the L-SIG field of the UL MU trigger frame 3110.

When the uplink data frame may be sufficiently configured with the information of the UL MU trigger frame 3110, the HE-SIG field (that is, an area in which control information for a configuration scheme of the data frame) in the PPDU transferring the UL MU trigger frame 3110 may not also be required. For example, the HE-SIG A field and/or the HE-SIG B field may not be transmitted. Further, the HE-SIG A field and the HE-SIG C field may be transmitted and the HE-SIG B field may not be transmitted.

The AP may transmit the ACK frame 3130 (or BA frame) in response to the uplink data frames 3121, 3122, and 3123 received from each STA. Herein, the AP may receive the uplink data frames 3121, 3122, and 3123 from each STA and transmit the ACK frame 3130 to each STA after the SIFS.

When the existing structure of the ACK frame is similarly used, AIDs (alternatively, partial AID) of the STAs which participate in the UL MU transmission may be configured to be included in the RA field having a size of 6 octets.

Alternatively, when the ACK frame having a new structure is configured, the ACK frame may be configured in a form for the DL SU transmission or DL MU transmission. That is, in the case of the DL SU transmission, the ACK frame 3130 may be sequentially transmitted to the respective STAs which participate in the UL MU transmission, and in the case of the DL MU transmission, the ACK frame 3130 may be simultaneously transmitted to the respective STAs which participate in the UL MU transmission through the resources (that is, the frequencies or streams) allocated to the respective STAs.

The AP may transmit only the ACK frame 3130 for the UL MU data frame which is successfully received to the corresponding STA. Further, the AP may announce whether the UL MU data frame is successfully received as ACK or NACK through the ACK frame 3130. When the ACK frame 3130 includes NACK information, the ACK frame 3130 may include even a reason for the NACK or information (for example, the UL MU scheduling information, and the like) for a subsequent procedure.

Alternatively, the PPDU transferring the ACK frame 3130 may be configured in a new structure without the L-part.

The ACK frame 3130 may include the STA ID or address information, but when the order of the STAs indicated by the UL MU trigger frame 3110 is similarly applied, the STA ID or address information may be omitted.

Further, a frame for next UL MU scheduling or a control frame including correction information for the next UL MU transmission, and the like may be included in the TXOP by extending the TXOP (that is, the L-SIG protection duration) of the ACK frame 3130.

Meanwhile, an adjustment process such as synchronizing the STAs, or the like may be added for the UL MU transmission in the procedure according to FIG. 31 or earlier.

FIG. 32 is a view illustrating a resource allocation unit in an OFDMA MU transmission scheme according to an embodiment of the present invention.

When the DL/UL OFDMA transmission scheme is used, a plurality of resource units (or subbands) may be defined in units of n number of tones (or subcarriers) in a PPDU bandwidth.

A resource unit (or subband) refers to an allocation unit of frequency resource for DL/UL OFDMA transmission.

Different resource units may be allocated to a plurality of STAs by allocating one or more resource units as DL/UL frequency resources to one STA.

FIG. 32 illustrates a case in which a PPDU bandwidth is 20 MHz.

As illustrated in FIG. 32, various numbers of tones may form resource units.

For example, according to the resource unit configuration scheme as illustrated in FIG. 32(a), a single resource unit may include 26 tones. Also, according to a resource unit configuration scheme as illustrated in FIG. 32(b), one resource unit may include 52 tones or 26 tones. Also, according to a resource unit configuration scheme as illustrated in FIG. 32(c), one resource unit may include 106 tones or 26 tones. Also, according to a resource unit configuration scheme as illustrated in FIG. 32(d), one resource unit may include 242 tones.

When the resource unit is configured as illustrated in FIG. 32(a), up to 9 STAs may be supported for DL/UL OFDMA transmission in a 20 MHz band. Also, when the resource unit is configured as illustrated in FIG. 32(b), up to 5 STAs may be supported for DL/UL OFDMA transmission in the 20 MHz band. Also, when the resource unit is configured as illustrated in FIG. 32(c), up to 3 STAs may be supported for DL/UL OFDMA transmission in the 20 MHz band. Also, when the resource unit is configured as illustrated in FIG. 32(d), the 20 MHz band may be allocated to a single STA.

Any one of the resource unit configuration schemes illustrated in FIGS. 32(a) to 32(d) may be determined based on the number of STAs participating in the DL/UL OFDMA transmission and/or an amount of data transmitted or received by a corresponding STA.

Among the entire resource units determined according to the resource unit configuration schemes as illustrated in FIGS. 32(a) to 32(c), only partial resource units may be used for DL/UL OFDMA transmission. For example, when resource units are configured as illustrated in FIG. 32(a) within 20 MHz, one resource unit is allocated to each STA less than nine STAs, and the other resource units may not be allocated to any STA.

In the case of the DL OFDMA transmission, a data field of the PPDU may be multiplexed and transmitted in a frequency domain in units of resource units allocated to each STA.

Meanwhile, in the case of the UL OFDMA transmission, each STA may construct a data field of a PPDU in units of resource units allocated thereto and simultaneously transmit the PPDU to an AP. Since each STA simultaneously transmit eh PPDU, the AP, a receiver, may recognize that a data field of the PPDU transmitted from each STA is multiplexed and transmitted in the frequency domain.

Also, in a case in which both DL/UL OFDMA and DL/UL MU-MIMO are supported, one resource unit may include a plurality of streams in a spatial domain. Also, one or more streams may be allocated as a DL/UL spatial resource to one STA, so that different streams may be allocated to a plurality of STAs. For example, a resource unit including 106 tones as illustrated in FIG. 32(c) or a resource unit including 242 tones as illustrated in FIG. 32(d) may be configured as a plurality of streams in the spatial domain to support both DL/UL OFDMA and DL/UL MU-MIMO.

In a bandwidth of 40 MHz or higher, a resource unit configuration scheme of the aforementioned 20 MHz band may be applied in the same manner as a 20 MHz band unit. Also, additionally, a smallest resource unit (i.e., a resource unit including 26 tones) may be further set at the center of the bandwidth.

The present invention proposes a method for configuring/constructing a frame structure including both single user (SU) transmission and multi-user (MU) transmission.

In the present invention, MU transmission refers to a case in which multiple users perform transmission in the same time domain, such as OFDMA or MU MIMO.

Hereinafter, in the descriptions of the present invention, "frame" may refer to a DL/UL MAC frame (or a MAC control frame, a MAC management frame, or a data frame) itself, or may refer to a DL/UL (SU/MU) PPDU carrying a DL/UL MAC frame.

Definition of Each Mode

1) DL SU and DL MU: The SU and the MU are different in that whether an AP allocates the entire band (e.g., a bandwidth of a PPDU) to one STA or several STAs in downlink, that is, in transmitting signals to the STAs.

However, in DL, the AP performs transmission by contending channels regardless of SU or MU and a limitation problem of power is smaller than that of STAs, and thus, separate differentiation is not required. Also, in the OFDMA structure, even through SU is used, the entire band is generally allocated to one STA.

2) UL SU: It is a method in which, in uplink, that is, when an STA transmits a signal to an AP, the STA directly occupies a medium through channel contending and transmits a signal to the AP, without a trigger frame from the AP. Hereinafter, in the descriptions of the present invention, when a trigger frame is present, it will be designated as UL MU even in a case in which only one STA transmits a UL data frame.

3) UL MU: It is a method in which, when an STA transmits a signal to an AP, the AP transmits a DL (e.g., a trigger frame) in advance to occupy a channel for an STA to transmit a UL data frame, and thereafter, the STA transmits a UL signal. That is, uplink resource is not allocated in a channel not occupied by a DL frame (e.g., a trigger frame).

For example, the AP may transmit a trigger frame and the STA may transmit a UL frame according to an instruction thereof. Here, as mentioned above, even though one STA transmits a UL frame, a case in which the STA transmits the UL frame in a channel secured by the DL frame will be designated as a UL MU. That is, when a trigger frame is transmitted, even when only one STA transmits a UL data frame, it is a UL MU.

Hereinafter, in describing the present invention, an HE-SIG1 field may be referred to as an HE-SIG-A field, and also, an HE-SIG2 field may be designated as an HE-SIG-B field.

DL Frame (PPDU) Structure

When information of each STA is included in the HE-SIG2 (or HE-SIG-B), a DL frame may be applied to a single frame structure without discrimination between SU and MU transmission. This will be described with reference to FIG. 33.

FIG. 33 is a view illustrating a DL MU frame according to an embodiment of the present invention.

In FIG. 33, a DL MU PPDU of 20 MHz is illustrated.

In FIG. 33, a case in which DL data regarding STA 1, DL data regarding STA 2, and DL data regarding STA 3/4 are frequency-multiplexed and transmitted in an OFDMA scheme, and DL data regarding STA 3 and STA 4 is spatially multiplexed and transmitted in an MU MIMO scheme in the same frequency domain is illustrated.

Referring to FIG. 33, L-STF, L-LTF, and L-SIG fields and HE-SIG1 fields 3311a, 3311b, 3311c, and 3311d may be duplicated in units of 20 MHz and transmitted.

When the same FFT size as that of a legacy part L-part is used in the HE-SIG2, the HE-SIG2 may be transmitted before HE-STF and HE-LTF as illustrated in FIG. 33(a). Meanwhile, when the same FFT size as those of the HE-STF/LTF and Data fields is used (that is, the same number of subcarriers as those of the HE-STF/LTF and Data fields is used), the HE-SIG2 should be transmitted at least after the HE-STF or after the HE-STF/LTF as illustrated in FIG. 33(b) or 33(d).

Referring to FIG. 33(a), an HE-SIG2 field 3321a may follow an L-part and HE-SIG1 field 3311a, an HE-STF 3331a may follow the HE-SIG2 field 3321a, and HE-LTFs 3341a, 3342a, and 3343a may follow the HE-STF 3331a.

The L-part and HE-SIG1 field 3311a may be duplicated in units of 20 MHz channels and transmitted.

The HE-SIG2 field 3321a may include user-specific information (e.g., frequency/space resource information of each STA, MCS level information, etc.) regarding every STA (i.e., STA1 to STA4) receiving a corresponding PPDU, and may be encoded in units of 20 MHz and transmitted.

As described above, since the HE-SIG2 field 3321a is transmitted before the HE-LTFs 3341a, 3342a and 3343a, the same FFT size as those of the legacy part L-part and the HE-SIG1 field 3311a is used the HE-SIG2 field 3321a.

Configuration information of the HE-SIG2 field 3321a may be known in the HE-SIG1 field 3311a or may be fixed to be used. For example, when a length (e.g., a byte or symbol unit) of the HE-SIG2 field 3321a is fixed, the AP is not required to inform each STA about a length of the HE-SIG2 field 3321a and each STA participating in the DL MU transmission needs only decode the HE-SIG2 field 3321a having a fixed length. However, when the length of the HE-SIG2 field 3321a is varied, the HE-SIG1 field 3311a may provide information about the length of the HE-SIG2 field 3321a.

The HE-STF 3331a may be mapped across the entire PPDU bandwidth (20 MHz in the case of FIG. 33).

The HE-LTF 3341a may be individually mapped to a bandwidth corresponding to a resource unit allocated to each STA. That is, an AP may generate an HE-LTF sequence according to the number of subcarriers forming a resource unit allocated to each STA. In the case of FIG. 33, the HE-LTF 3341a may be individually mapped to subcarriers forming a resource unit allocated to each of the STA1, STA2, and STA 3/4 and transmitted.

The number of HE-LTF 3341a symbols regarding each STA may be adjusted to a maximum number of HE-LTF 3341a symbols. The number of HE-LTF 3341a symbols may be determined according to the number of streams allocated in a spatial domain of a band to which a corresponding HE-LTF 3341a is mapped. That is, since the number of streams allocated to each resource unit may be different, all the number of the HE-LTF 3341a symbols may be adjusted to the number of HE-LTF 3341a symbols determined according to the maximum number of streams.

In the example of FIG. 33(a), when it is assumed that one stream is allocated to each STA, since the STA 3 and STA4 share the same frequency band by MU-MIMO, two HE-LTF 3341a symbols may be required in a band allocated to the STA 3 and STA4. In this case, the HE-LTF 3341a mapped to a band allocated to the STA 1 and STA 2 may also be transmitted in two symbols.

Referring to FIG. 33(b), an HE-STF 3321b follows an L-part and HE-SIG1 field 3311b, an HE-SIG2 field 3331b follows the HE-STF 3321b, and HE-LTFs 3341b, 3342b, and 3343b follow the HE-SIG2 field 3331b. Hereinafter, the same descriptions as those of the example of FIG. 33(a) will be omitted.

In this case, since the HE-SIG2 field 3331b is transmitted after the HE-STF 3321b, the HE-SIG2 field 3331b uses the same FFT size as those of the HE-STF 3321b, the HE-LTFs 3341b, 3342b, and 3343b, and the data fields 3351b, 3352b, and 3353b.

Referring to FIG. 33(c), an HE-STF 3321c follows an L-part and HE-SIG1 field 3311c, HE-LTFs 3331c, 3332c, and 3333c follow the HE-STF 3321c, and an HE-SIG2 field 3341c follows the HT-LTFs 3331c, 3332c, and 3333c. Hereinafter, the same descriptions as those of the example of FIG. 33(a) will be omitted.

In this case, since the HE-SIG2 field 3341c is transmitted after the HE-STF 3321c and the HE-LTFs 3331c, 3332c, and 3333c, the HE-SIG2 field 3341c uses the same FFT size as those of the HE-STF 3321c, the HE-LTFs 3331c, 3332c, and 3333c, and the data fields 3351c, 3352c, and 3353c.

Referring to FIG. 33(d), the case is the same as that of FIG. 33(c) described above, except that the HE-SIG2 field 3341d, 3342d, and 3343d are individually transmitted in a band corresponding to a resource unit allocated to each STA, and thus, the same descriptions will be omitted.

Here, since the HE-SIG2 fields 3341d, 3342d, and 3343d are individually transmitted to each STA, the HE-SIG2 fields 3341d, 3342d, and 3343d may include only information regarding a corresponding STA. In the case of FIG. 33(d), the HE-SIG2 field 3341d transmitted in a band corresponding to a resource unit allocated to the STA 1 may include only user-specific information (e.g., frequency/spatial resource information of each STA, MCS level information, and the like) regarding the STA 1. This is the same in the case of the STA 2 and STA 3/4.

As illustrated in FIG. 33(d), when the HE-SIG2 fields 3341d, 3342d, and 3343d are individually transmitted to each STA, the HE-SIG1 3311d should provide configuration information of each of the HE-SIG2 fields 3341d, 3342d, and 3343d. For example, in the case of FIG. 33(d), the HE-SIG1 field 3311d should provided information regarding a band (or resource unit) in which the HE-SIG2 field 3341d regarding is transmitted, a band (or resource unit) in which the HE-SIG2 field 3342d regarding STA 2, and a band (or resource unit) in which the HE-SIG2 field 3343d regarding STA 3/4 is transmitted.

Meanwhile, in FIGS. 33(a) to 33(d), a case in which HE-LTF is individually mapped to each frequency band allocated to each STA is illustrated, but alternatively, the HE-LTF may also be mapped to the entire PPDU bandwidth like the HE-STF. That is, the AP maps both the HE-STF and the HE-LTF across the PPDU bandwidth and transmits the same, and each STA reads the HE-STF and the HE-LTF mapped to a band (i.e., subband) allocated thereto.

UL Frame (PPDU) Structure

1. UL Frame Structure 1

In the case of UL MU, a trigger frame is always previously transmitted from an AP before UL MU frame, and configuration information of the UL MU frame is provided (refer to FIG. 31). Thus, configuration of the SIG field in the UL MU frame itself has a meaning that contents thereof is repeated.

The configuration of the L-part or the HE-SIG1 field may help an AP, a legacy STA, or HE STAs not participating in the UL MU transmission to perform NAV setting. However, in particular, the configuration of the HE-SIG2 is not required to be known to an AP unless the AP is to receive a corresponding UL MU frame, and an AP which is to receive the corresponding UL MU frame already knows the configuration information of the HE-SIG2, and thus, the configuration of the HE-SIG2 is not required even much less.

Thus, in the case of the UL MU frame, the HE-SIG2 field may be omitted in the UL MU frame.

Also, when the HE-SIG2 field should be present in the UL MU frame to configure a DL/UL common frame structure, a method in which the HE-SIG2 field of a DL frame is transmitted may be used as is. In this case, the HE-SIG2 field may be transmitted in a single frequency network (SFN) method in which all the STAs transmit the same signal.

Hereinafter, a structure of a trigger frame transmitted from an AP before UL MU frame transmission will be described with reference to FIG. 34.

FIG. 34 is a view illustrating a structure of a trigger frame according to an embodiment of the present invention.

In FIG. 34, a 20 MHz trigger frame structure is illustrated.

Configuration information for UL MU frames may be included in an SIG field or in a MAC frame included in a data field and transmitted. In FIG. 34, for the purposes of description, an SIG field including configuration information for UL MU frames will be referred to as an HE-SIG3 field. Also, the MAC field represents a data field including a MAC frame including configuration information for UL MU frames.

In FIG. 34(a), a structure of a trigger frame when configuration for UL MU frames is included in a MAC frame is illustrated.

Referring to FIG. 34(a), an HE-STF 3421a may follow an L-part and HE-SIG1 3411a, an HE-LTF 3431a may follow the HE-STF 3421a, an HE-SIG2 field 3441a may follow the HE-LTF 3431a, and a MAC field (i.e., a data field including a MAC frame including configuration information for UL MU frames) 3451a may follow the HE-SIG2 field 3441a.

The L-STF, the L-LTF, and the L-SIG fields and the HE-SIG1 field 3411a may be duplicated in units of 20 MHz channel and transmitted.

The HE-STF 3421a and the HE-LTF 3431a may be mapped across the entire PPDU bandwidth (20 MHz in the case of FIG. 34).

In a case in which configuration information for UL MU frames is transmitted in a MAC frame as illustrated in FIG. 34(a), an HE-SIG2 field 3441a for providing configuration information of a data field (i.e., including a MAC frame) is required. Here, since the HE-SIG2 field 3441a is transmitted after the HE-STF 3421a and the HE-LTF 3431a, the same FFT size as those of the HE-STF 3421a, the HE-LTF 3431a and the MAC field (i.e., the data field) 3451a is used in the HE-SIG2 field 3441a.

Regarding every STA (STA 1 to STA 4 in the case of FIG. 34) participating in UL MU transmission, the MAC field 3451a includes configuration information for UL MU frames for each STA. The configuration information for UL MU frames may include, for example, resource unit information allocated for UL MU transmission for each STA, MCS level information, and the like.

In FIG. 34(b), a structure of a trigger frame when configuration information for UL MU frames is included in the HE-SIG3 field is illustrated.

Referring to FIG. 34(b), an HE-STF 3421b may follows an L-part and HE-SIG1 3411a, an HE-LTF 3431b may follow the HE-STF 3421b, and an HE-SIG3 3441b may follow the HE-LTF 3431b.

The L-STF, the L-LTF, and the L-SIG fields and the HE-SIG1 field 3441b may be duplicated in units of 20 MHz so as to be transmitted.

The HE-STF 3421b and the HE-LTF 3431b may be mapped across the entire PPDU bandwidth (20 MHz in the case of FIG. 34).

Regarding every STA (STA 1 to STA 4 in the case of FIG. 34) participating in the UL MU transmission, the HE-SIG3 field 3441b includes configuration information for UL MU frames of each STA. Here, since the HE-SIG3 field 3441b is transmitted after the HE-STF 3421b and the HE-LTF 3431b, the same FFT size as those of the HE-STF 34212b and the HE-LTF 3431b is used in the HE-SIG3 field 3441b.

Or, according to situations, the example of FIG. 34(a) and the example of 34(b) may be combined. That is, the HE-SIG2 field and the HE-SIG3 field may be transmitted together. For example, in a case in which the DL frame transmits a MAC frame (e.g., a control frame, a management frame, and a data frame) and the DL frame transmits configuration information regarding a UL MU frame (that is, in a case in which the UL MU frame also transmits a MAC frame), the HE-SIG2 and the HE-SIG3 field may be transmitted together.

In this case, an indication (e.g., an SIG type indication) indicating whether an SIG field transmitted afterwards is the HE-SIG2 field, the HE-SIG3 field, or both may be included in the HE-SIG1 field. For example, an SIG type indication "00" may indicate the HE-SIG2 field, 01 indicates the HE-SIG2 field, "10" indicates the HE-SIG2 field and the HE-SIG3 field, and "11" may remain as a reserved bit.

Or, as illustrated in FIGS. 34(c) and 34(d), without the HE-STF and the HE-LTF, the trigger frame may include only L-part and HE-SIG1 fields 3411c and 3411d and HE-SIG3 fields 3421c and 3421d.

Here, an FFT size of the HE-SIG3 fields 3421c and 3421d should be the same as those of the L-part and HE-SIG1 fields 3411c and 3411d so that a receiver may decode the same.

As illustrated in FIG. 34(c), the HE-SIG3 field 3421c may use the same number of tones (or subcarriers) as that of the L-part and HE-SIG1 field 3411c.

Meanwhile, as illustrated in FIG. 34(d), in a case in which the HE-SIG3 field 3421d uses the same 20 MHz bandwidth as that of the L-part and HE-SIG1 field 3411d or uses a higher bandwidth, the HE-SIG3 field 3421d may use a greater number of tones (or subcarriers) than that of the L-part and HE-SIG1 field 3411d.

In this case, the increased tones may also be used for transmitting configuration information regarding a UL MU frame, but may be emptied by transmitting null. When the increased tones are used for transmitting configuration information regarding the UL MU frames, a receiver may estimate (for example, extrapolation, etc.) a channel regarding the increased tones by using an adjacent L-LTF.

In the example of FIG. 34, the 20 MHz trigger frame structure has been described, but a trigger frame may also be configured with a higher bandwidth.

In this case, in the HE-SIG2 field and/or the HE-SIG3 field, configuration information regarding the entire UL MU frames may be encoded across the entire PPDU bandwidth as a time.

Or, in the HE-SIG2 field and/or the HE-SIG3 field, the configuration information regarding the entire UL MU frames is encoded within the 20 MHz bandwidth and subsequently duplicated in a different band.

Also, the trigger frame may have a DL SU frame structure. That is, the trigger frame may be configured according to a legacy PPDU structure or may be configured according to a DL SU PPDU structure described above in the example of FIG. 34.

Or, in the HE-SIG2 field and/or the HE-SIG3 field, each configuration information on a UL MU frame regarding an STA to which resource unit is allocated within the corresponding 20 MHz unit may be encoded based on the 20 MHz unit. Here, when the resource unit allocated to each STA is present within the 20 MHz unit, there is no problem. However, when a resource unit allocated to a certain STA exceeds the 20 MHz unit (that is, when the entire PPDU bandwidth is distinguished by 20 MHz unit, a resource unit is allocated to a specific STA by different 20 MHz units), a method for transmitting frequency resource allocation information (i.e., resource unit allocation information) to the corresponding STA is required. This will be described with reference to FIG. 35.

FIG. 35 is a view illustrating a resource allocation method in a trigger frame according to an embodiment of the present invention.

In FIG. 35, a 40 MHz trigger frame structure and a corresponding 40 MHz UL MU frame structure are illustrated.

Also, in FIG. 35, in the trigger frame, for the purposes of description, only an HE-SIG3 field is illustrated and only a data field is illustrated in the UL MU frame, but L-part, HE-SIG1 field, and HE-SIG2 field (if necessary) may be further included.

In FIG. 35, it is assumed that bands 10 MHz, 20 MHz, and 10 MHz are sequentially allocated to STAs 1, 2, and 3 in 40 MHz band, respectively.

That is, it is assumed that STA 2 is allocated frequency resource (i.e., resource unit) across 20 MHz channel 1 and 20 MHz channel 2.

As illustrated in FIG. 35(a), frequency resource allocation information regarding the STA2 may be transmitted in an HE-SIG3 field 3511a of a trigger frame transmitted in a low frequency band (i.e., 20 MHz channel 1), and a starting point of a frequency allocation resource may be known in an HE-SIG3 field 3511b of a trigger frame transmitted in a high frequency band (i.e., 20 MHz channel 2).

In this case, a frequency resource indicated in the HE-SIG3 field 3511b of the trigger frame transmitted in the high frequency band (i.e., 20 MHz channel 2) may be started from the starting point.

Referring to FIG. 35(a), the HE-SIG3 field 3511a of the trigger frame transmitted in the 20 MHz channel 1 provides frequency resource allocation information (i.e., 10 MHz) regarding the STA 1 and frequency resource allocation information (i.e., 20 MHz) regarding the STA 2. Also, the HE-SIG3 field 3511b of the trigger frame transmitted in the 20 MHz channel 2 provides a starting point (i.e., 10 MHz) and frequency resource allocation information (i.e., 10 MHz).

Thus, the STA 1 is allocated 0-10 MHz bandwidth in 20 MHz channel 1, the STA 2 is allocated a bandwidth from 10 MHz of 20 MHz channel 1 to 10 MHz of the 20 MHz channel 2, and the STA 3 is allocated a bandwidth of 10 MHz to 20 MHz in 20 MHz channel 2.

Or, as illustrated in FIG. 35(b), the HE-SIG3 fields 3511b and 3512b of the trigger frame transmitted in each frequency band (i.e., 20 MHz channels 1 and 2) may provide frequency resource allocation information in the corresponding 20 MHz band.

Referring to FIG. 35(b), the HE-SIG3 field 3511b of the trigger frame transmitted in the 20 MHz channel 1 provides frequency resource allocation information (i.e., 10 MHz) regarding the STA 1 and frequency resource allocation information (i.e., 10 MHz) regarding the STA 2 in the corresponding 20 MHz band. Also, the HE-SIG3 field 3512b of the trigger frame transmitted in the 20 MHz channel 2 provides frequency resource allocation information (i.e., 10 MHz) regarding the STA 2 and frequency resource allocation information (i.e., 10 MHz) regarding the STA 3 in the corresponding 20 MHz band.

Thus, the STA 1 is allocated a 0-10 MHz bandwidth in the 20 MHz channel 1, the STA 2 is allocated a bandwidth from 10 MHz of 20 MHz channel 1 to 10 MHz of the 20 MHz channel 2, and the STA 3 is allocated a bandwidth of 10 MHz to 20 MHz in 20 MHz channel 2.

Or, as illustrated in FIG. 35(c), the HE-SIG3 fields 3511c and 3512c of the trigger frame transmitted in each frequency band (i.e., 20 MHz channels 1 and 2) may provide the same frequency resource allocation information.

Referring to FIG. 35(c), the HE-SIG3 field 3511c of the trigger frame transmitted in the 20 MHz channel 1 provides frequency resource allocation information (i.e., 10 MHz) regarding the STA 1 and frequency resource allocation information (i.e., 20 MHz including 10 MHz of 20 MHz channel 2) regarding STA 2. Also, the HE-SIG3 field 3512c of the trigger frame transmitted in the 20 MHz channel 2 provides frequency resource allocation information (i.e., 20 MHz including 10 MHz of 20 MHz channel 1) and frequency resource allocation information (i.e., 10 MHz) regarding the STA 3.

Thus, the STA 1 is allocated a 0-10 MHz bandwidth in the 20 MHz channel 1, the STA 2 is allocated a bandwidth from 10 MHz of 20 MHz channel 1 to 10 MHz of the 20 MHz channel 2, and the STA 3 is allocated a bandwidth of 10 MHz to 20 MHz in 20 MHz channel 2.

Hereinafter, a UL MU frame structure configured based on frequency resource allocation information received by a trigger frame will be described.

FIG. 36 is a view illustrating a structure of a UL MU frame according to an embodiment of the present invention.

In FIG. 36, a 20 MHz UL MU frame structure is illustrated.

Also, in FIG. 36, it is assumed that a data field of the STA 1 is indicated to use a lowest partial band (e.g., a first 5 MHz band, etc.) in UL MU frame configuration information of the STA 1 included in a trigger frame.

In FIG. 36, the plain regions are regions in which all the STAs allocated UL MU resource by a trigger frame transmit the same signal, and the shaded regions are regions where each of the STAs transmits a different transmission value.

Referring to FIG. 36(a), an HE-STF 3621a may follow an L-part and HE-SIG1 3611a, an HE-LTF 3631a may follow the HE-STF 3621a, an HE-SIG2 field 3641a may follow the HE-LTF 3631A, and a data field 3651a may follow the HE-SIG2 field 3641a.

The L-STF, the L-LTF, and the L-SIG fields and the HE-SIG1 field 3611a may be duplicated in units of 20 MHz channel and transmitted.

Here, since the HE-SIG2 field 3641a is transmitted after the HE-STF 3621a and the HE-LTF 3631a, the HE-SIG2 field 3641a uses the same FFT size as those of the HE-STF 3621a, the HE-LTF 3631a, and the data field 3651a.

The HE-SIG2 field 3641a may include the same contents as that of the HE-SIG2 field of the trigger frame. In other words, regarding every STA (STA 1 to STA 4 in the case of FIG. 36) participating in UL MU transmission, the HE-SIG2 field 3641a includes configuration information for UL MU frames for each STA. Thus, every STA participating in the UL MU the same information in the HE-SIG2 field 3641a region. The configuration information for the UL MU frames may include, for example, resource allocation information allocated for UL MU transmission of each STA, MCS level information, and the like.

Or, in the HE-SIG2 field 3641a, information of the HE-SIG2 field of the trigger frame may not be repeated and the HE-SIG2 field 3641a may be omitted in the UL MU frame as illustrated in FIG. 36(b).

Referring to FIG. 36(b), an HE-STF 3621b may follow an L-part and HE-SIG1 field 3611b, an HE-LTF 3631b may follow the HE-STF 3621b, and a data field 3641b may follow the HE-LTF 3631a.

Also, since every STA participating in UL MU transmission transmits the same information in the L-part and HE-SIG1 field 3611b and STAs not participating in the UL MU transmission are available for NAV setting by a trigger frame, or the like, the L-part and HE-SIG1 field 3611b in the UL MU frame may be meaningless. Thus, as illustrated in FIG. 36(c), the L-part and HE-SIG1 field 3611b may be omitted in the UL MU frame.

Referring to FIG. 36(c), an HE-LTF 3621c may follow the HE-STF 3611c, and a data field 3631c may follow the HE-LTF 3621c.

In the example of FIGS. 36(a) to 36(c) described above, when only OFDMA is applied to the data field regions 3651a, 3641b, and 3531c in the shaded regions, only UL data of STAs to which a corresponding frequency domain was allocated is transmitted in the corresponding frequency domain. Also, when even MU MIMO, as well as OFDMA, is applied, UL data of the STAs allocated the same frequency domain may be spatial division multiplexed (SDM) in the corresponding frequency domain so as to be transmitted.

In the example of FIGS. 36(a) to 36(c) described above, a configuration of the HE-STF and the HE-LTF may be as follows.

1) HE-STF: A UL MU STA may transmit it in an SFN form. That is, every STA participating in UL MU may map the same HE-STF sequence to the entire PPDU bandwidth and transmit the same.

Or, the UL MU STA may transmit it in a code division multiplexing (CDM)/frequency division multiplexing (FDM) form.

In the case of transmission in the CDM form, each STA participating in the UL MU transmission may generate an HE-STF sequence unique thereto, and map it to the entire PPDU bandwidth and transmit the same.

Also, in the case of transmission in the FDM form, each STA participating in the UL MU transmission may map an HE-STF sequence to different tones (or subcarriers) of the entire PPDU bandwidth by each STA participating in the UL MU transmission. For example, the STA 1 may map the HE-STF sequence to a tone of 4k, the STA 2 may map the HE-STF sequence to a tone of 4k+1, the STA 3 may map the HE-STF sequence to a tone of 4k+2, and the STA 4 may map the HE-STF sequence to a tone of 4k+3 (k=0, 1, . . . ), and transmit a unique HE-STF of their own.

Or, in the case of transmission in the form of FDM, each STA may transmit the HE-STF only in the frequency domain allocated for UL MU transmission. For example, when the STA 1 is allocated 106 tones of resource unit, the STA 1 may map the HE-STF sequence within a resource unit region of the 106 tones allocated thereto, and transmit the same.

Here, the STAs transmitting in the MU MIMO scheme may transmit the HE-STF in an SFN form in the frequency domain to which the STAs were allocated. For example, in a case in which the STA 1 and the STA 2 are allocated different streams regarding 106 tones of resource unit, both the STA 1 and the STA 2 may map the same HE-STF sequence within the 106 tones of allocated resource unit region and transmit the same.

Or, the STAs transmitting according to the MU MIMO scheme may transmit the HE-STF in a CDM form in the frequency domain allocated thereto. For example, in a case in which the STA 1 and the STA 2 are allocated different streams regarding the 106 tones of resource unit, both the STA 1 and the STA 2 may map a unique HE-STF sequence within the 106 tones of allocated resource unit region and transmit the same.

2) HE-LTF: HE-LTF is basically CDM/FDM/TDMed per stream and transmitted, and a receiver performs channel estimation per stream using an HE-LTF. Regardless of DL transmission or UL transmission, tone mapping may be performed across the entire PPDU bandwidth to transmit HE-LTF, like in the example of the HE-STF In the case of transmission in the CDM form, each STA participating in the UL MU transmission may generate an HE-LTF sequence unique of their own, map it to the entire PPDU bandwidth, and transmit the same.

In the case of transmission in the FDM form, each STA may map the HE-LTF sequence to different tones (or subcarriers) in the entire PPDU bandwidth and transmit the same. For example, the STA 1 may map the HE-LTF sequence to a tone of 4k, the STA 2 may map the HE-LTF sequence to a tone of 4k+1, the STA 3 may map the HE-LTF sequence to a tone of 4k+2, and the STA 4 may map the HE-LTF sequence to a tone of 4k+3 (k=0, 1, . . . ), and transmit a unique HE-LTF of their own.

In the case of transmission in the TDM form, each STA may map an HE-LTF sequence to different HE-LTF symbols of the entire PPDU bandwidth and transmit the same.

Also, each STA may transmit the HE-LTF according to an allocated data region.

For example, when the STA 1 is allocated 106 tones of resource unit, the STA 1 may map the HE-LTF sequence within a resource unit region of the 106 tones allocated thereto, and transmit the same.

In this case, MU MIMO STAs allocated the same data region may transmit the HE-LTF in the CDM/TDM form, or the like.

Here, the STAs transmitting in the MU MIMO scheme may transmit the HE-LTF in an SFN form in the frequency domain to which the STAs were allocated. For example, in a case in which the STA 1 and the STA 2 are allocated different streams regarding 106 tones of resource unit, both the STA 1 and the STA 2 may map the same HE-LTF sequence within the 106 tones of allocated resource unit region and transmit the same. In this case, the number of HE-LTF symbols may be determined according to the number of streams regarding the corresponding 106 tones of resource unit, and a sequence (e.g., one row of a P matrix) orthogonal to a time axis may be multiplied to the HE-LTF symbols.

Or, the STAs transmitting in the MU MIMO scheme may transmit the HE-LTF in the CDM form in the frequency domain to which the STAs were allocated. For example, in a case in which the STA 1 and the STA 2 are allocated different streams regarding 106 tones of resource unit, both the STA 1 and the STA 2 may map a unique HE-LTF sequence within the 106 tones of allocated resource unit region and transmit the same.

Or, the STAs transmitting in the MU MIMO scheme may transmit the HE-STF in the TDM form in the frequency domain to which the STAs were allocated. For example, in a case in which the STA 1 and the STA 2 are allocated different streams regarding 106 tones of resource unit, both the STA 1 and the STA 2 may map the HE-LTF sequence to different HE-LTF symbols within the 106 tones of allocated resource unit region and transmit the same.

The UL MU frame structure described above may also be applied to a case in which a configuration of a UL MU ACK regarding the DL MU transmission is previously determined.

For example, the UL MU ACK frame may be configured unconditionally in units of a specific frequency (e.g., 5 MHz), and frequency resource of an ACK frame may be allocated in order of STAs included in the HE-SIG field (e.g., HE-SIG1 and/or HE-SIG2 fields) of DL MU transmission. Also, the UL MU ACK frame may always be applied STBC and transmitted or use a fixed MCS level (for example, MCS 0 (BPSK (Binary Phase Shift Keying) and ½ coding rate is used), MCS levels of DL data transmitted each STA are the same, or a lowest coding rate is used, while using the same modulation as that of DL data transmitted to each STA), and the like. That is, a method for configuring a UL MU ACK frame may be determined previously or according to a DL MU frame.

In a case in which the frequency resource and configuration information of the ACK frame are fixed to be determined, since the AP already knows a method transmitted by each STA, there is no need to separately read information of the HE-SIG field (e.g., the HE-SIG1 and/or HE-SIG2 fields).

Thus, here, like the configuration of the UL MU frame of STA 1 of FIGS. 36(a) to 36(c), the HE-SIG1 field and the HE-SIG2 field of the DL MU transmission are duplicated as is so as to be used or omitted.

2. UL Frame Structure 2

This embodiment proposes a configuration method in a case in which information of the HE-SIG1 field and the HE-SIG2 field of the UL frame is required.

In this embodiment, for the purposes of description, the HE-SIG field included in a UL frame will be referred to the same as the HE-SIG field of the DL frame, but it may include information different from that of the HE-SIG in the DL frame. Thus, the HE-SIG field may also be named to be different from that the HE-SIG of the DL frame.

For example, in a case in which UL SU transmission of transmitting data in subband (or resource unit) granularity of OFDMA unit is permitted, in a case in which a trigger frame provides configuration information of a UL MU but only provides resource information (i.e., frequency and/or spatial resource information) and an MCS level is not determined, or in a case in which a configuration of a UL MU ACK frame regarding DL MU transmission is not determined, and the like, each STA should be able to include information of their own in the HE-SIG field (e.g., the HE-SIG1 and/or HE-SIG2 fields) and transmit the same, and the AP should be able to read the HE-SIG fields of the UL frame in order to decode the UL frame.

In the UL frame structure illustrated in the UL frame structure 1 described above, since the HE-SIG field (i.e., the HE-SIG1 and/or HE-SIG2 fields) are transmitted in the SFN form, each STA cannot carry information of their own differently.

In general, when UL SU transmission is performed in subband (or resource unit) granularity, it means that a channel state of an STA is poor (e.g., the STA is in an edge of a cell (or BSS) or positioned in a shadow area) and thus transmission will be made by concentrating maximum power of the STA on a specific subband (or resource unit) (e.g., 5 MHz, etc.).

However, when a method of transmitting the HE-SIG1 field in the 20 MHz unit and the HE-SIG2 field in the entire band (or encoded in a 20 MHz unit) also in the UL frame like in the DL frame is considered, a problem that the HE-SIG fields have coverage smaller than that of data in the UL frame so the AP may not be able to smoothly receive the HE-SIG field of the UL frame may arise.

Also, in a case in which each STA participating in the UL MU transmission transmits UL frame configuration information of their own (i.e., configuration of a data field, for example, an MCS level, etc.) in the HE-SIG field, when the method of transmitting the HE-SIG field in the entire band (or encoded in the 20 MHz unit) is considered, a problem that the HE-SIG fields transmitted from each STA collide with each other so the AP is not able to smoothly receive the HE-SIG field of the UL frame may arise.

Thus, an HE-SIG field of a UL frame is required to be separately designed in consideration of the problem.

FIG. 37 is a view illustrating a structure of a UL frame according to an embodiment of the present invention.

In FIG. 37, a 20 MHz UL SU/MU frame structure is illustrated.

In FIG. 37, it is assumed that UL MU frame configuration information of the STA 1 included in a trigger frame indicates that a data field of STA 1 should use a lowest partial band (e.g., first 5 MHz band, etc.) or that a UL SU frame is transmitted in a specific subband (or resource unit) (e.g., a first 5 MHz band, etc.) which is designated by a trigger frame, which is predetermined, or which is arbitrarily selected.

In FIG. 37, in the case of UL MU transmission, the plain regions are regions in which all the STAs allocated UL MU resource by a trigger frame transmit the same signal, and the shaded regions are regions where each of the STAs transmits a different transmission value.

Referring to FIG. 37, HE-STFs 3721*a* and 3721*b* may follow an L-part and HE-SIG1 fields 3711*a* and 3711*b*, HE-LTFs 3731*a* and 3731*b* may follow the HE-STFs 3721*a* and 3721*b*, HE-SIG2 fields 3741*a* and 3741*b* may follow the HE-LTFs 3731*a* and 3731*b*, and data fields 3751*a* and 3751*b* may follow the HE-SIG2 fields 3741*a* and 3741*b*.

The L-STF, the L-LTF, and the L-SIG fields and the HE-SIG1 field 3711*a* may be duplicated in units of 20 MHz channel and transmitted.

A structure and contents of the HE-SIG1 fields 3711*a* and 3711*b* may not be deformed by each STA, and thus, the HE-SIG1 fields 3711*a* and 3711*b* may be configured with the same information as that of the HE-SIG1 field of the trigger frame.

The HE-SIG2 fields 3741*a* and 3741*b* may be transmitted in the same frequency domain as a frequency domain (i.e., subband or resource unit) in which a corresponding STA transmits the data fields 3751*a* and 3751*b*.

In this manner, in order for each STA to transmit the HE-SIG2 fields 3741*a* and 3741*b* in the same frequency domain as that of the data fields 3751*a* and 3751*b* in the subband (or resource unit) unit which is allocated by each STA or which is previously designated, each station should carrier frequency offset measurement and channel estimation using the HE-STFs 3721*a* and 3721*b* and the HE-LTFs 3731*a* and 3731*b*, and thus, the HE-SIG2 fields 3741*a* and 3741*b* should be transmitted after the HE-STFs 3721*a* and 3721*b* and the HE-LTFs 3731*a* and 3731*b*.

The STA may determine information such as subband (or resource unit) information in which the data fields 3751*a* and 3751*b* of a corresponding UL frame are transmitted, MCS level information, indication information regarding whether an STBC is applied, indication information regarding whether beamforming is applied, and/or FEC coding scheme information (LDPC or BCC indication), and the like, include the information in the HE-SIG2 fields 3741*a* and 3741*b* and transmit the same.

In a case in which a subband (or resource unit) permitted for UL SU transmission is fixed, in a case in which the trigger frame provides resource information (i.e., frequency and/or spatial resource information) of the UL MU frame, or in a case in which subband (or resource unit) of the UL MU ACK frame is fixed, subband (or resource unit) information in which a data field of the UL frame is transmitted may not be included in the HE-SIG2 fields 3741*a* and 3741*b*.

In the case of the MCS level, for example, when a PHY length (i.e., a PPDU length) regarding a UL frame is determined by a trigger frame or determined in advance, each STA may determine an MCS level in consideration of the PHY length and/or to which degree of UL data each STA is to transmit. Here, since amounts of data to be transmitted by each STA may be different, a maximum PHY length of a UL frame is determined with respect to every STA participating in the UL MU transmission, and a maximum PHY length may be set to be the same for every STA participating in the UL MU transmission through a trigger frame.

Also, each STA may determine whether to apply beamforming and/or an FEC coding scheme in consideration of a channel state with an AP.

In a time domain, a length of the HE-SIG2 fields 3741*a* and 3741*b* may be fixed. In this case, length information of an HE-SIG2 field indicated by the HE-SIG1 field included in a UL frame may be disregarded (or omitted).

Or, a length of the HE-SIG2 fields 3741*a* and 3741*b* (e.g., the number of bytes or the number of symbols) may be indicated in the HE-SIG1 fields 3711*a* and 3711*b*. However, since each STA transmits different information in the HE-SIG2 fields 3741*a* and 3741*b*, bits forming the HE-SIG2 fields 3741*a* and 3741*b* may be different in each STA. Thus, each STA may pad bits remaining after configuring the HE-SIG2 fields, according to length information indicated in the HE-SIG1 fields 3711*a* and 3711*b* and pad a remaining bit. Also, in this case, the AP may set a maximum length of the HE-SIG2 fields 3741*a* and 3741*b* to be the same in every STA participating in the UL MU transmission.

In the case of FIG. 37(*a*), the HE-STF 3721*a* and the HE-LTF 3731*a* may be mapped and transmitted only in the same frequency domain (i.e., subband or resource unit) as that of the data field 3751*a* transmitted by a corresponding STA.

In the case of the UL MU transmission, since each STA transmits the HE-STF (and HE-LTF) only in the frequency domain allocated for UL MU transmission, the HE-STF (and HE-LTF) may be multiplexed and transmitted in the frequency domain by each STA.

Here, the STAs transmitting in the MU MIMO scheme may transmit the HE-STF (and HE-LTF) in the SFN form in the frequency domain allocated thereto. For example, in a case in which the STA 1 and STA 2 are allocated different streams regarding 106 tones of resource unit, both the STA 1 and STA 2 may map and transmit the same HE-STF (and HE-LTF) sequence in the 106 tones of allocated resource unit regions.

In this case, the number of he-LTF symbols may be determined according to the number of streams regarding the corresponding 106 tones of resource unit. Also, a sequence (e.g., one row of P matrix) orthogonal to a time axis may be multiplied to the entire HE-LTF symbols.

Also, the number of HE-LTF symbols transmitted by every STA participating in the UL MU transmission may be adjusted to be the same as a maximum number of HE-LTF symbols. For example, in a case in which the STA 1 and STA 2 are allocated one stream in the 106 tones of resource unit and the STA 3 is allocated 26 tones of resource unit, since the STA 1 and the STA 2 are allocated a total of two streams from the 106 tones of resource unit, the number of HE-LTF symbols may be determined to 2. In this case, although not a MU-MIMO STA, the STA 3 may transmit two HE-LTF symbols in order to adjust the number of the HE-LTF symbols to be the same.

Or, the STAs transmitting in the MU MIMO scheme may transmit the HE-STF (and HE-LTF) in the CDM form in the frequency domain allocated thereto. For example, in a case in which the STA 1 and the STA 2 are allocated different streams regarding 106 tones of resource unit, the STA 1 and the STA 2 may map a unique HE-STF (and HE-LTF) sequence within the 106 tones of allocated resource unit region and transmit the same.

In the case of FIG. 37(*b*), HE-STF(3721*b*) and HE-LTF (3731*b*) may be mapped to the entire bandwidth of the corresponding PPDU and transmitted.

Here, in the case of transmission in the FDM form, each STA participating in the UL MU transmission may map an HE-STF (and HE-LTF) sequence to different tones (or subcarriers) of the entire PPDU bandwidth by each STA participating in the UL MU transmission. For example, the STA 1 may map the HE-STF sequence to a tone of 4k, the STA 2 may map the HE-STF sequence to a tone of 4k+1, the STA 3 may map the HE-STF sequence to a tone of 4k+2, and the STA4 may map the HE-STF sequence to a tone of 4k+3 (k=0, 1, . . . ), and transmit a unique HE-STF (and HE-LTF) of their own.

In the case of transmission in the TDM form, each STA may map an HE-STF (and HE-LTF) sequence to different HE-STF symbols (and HE-LTF symbols) of the entire PPDU bandwidth and transmit the same.

Also, in the case of transmission in the CDM form, each STA participating in the UL MU transmission may generate an HE-STF sequence (and HE-LTF sequence) unique thereto, and map it to the entire PPDU bandwidth and transmit the same.

The configuration of the HE-STF and/or the HE-LTF according to the example of FIG. 37 is merely illustrative and may be configured to be different. For example, as illustrated in FIG. 37(*b*), the HE-STF may be transmitted according to an FDM scheme of a tone unit across the entire PPDU bandwidth, and as illustrated in FIG. 37(*a*), the HE-LTF may be transmitted according to the FDM scheme in a data field unit (i.e., subband or resource unit) transmitted by each STA.

FIGS. 38 to 43 are views illustrating structures of a UL MU frame according to an embodiment of the present disclosure.

In FIGS. 38 to 43, a 40 MHz UL MU frame structure is illustrated and a UL MU frame structure in which a receiver (i.e., AP) receives from UL MU STAs, different from the example of FIG. 37.

In FIGS. 38 to 43, a case in which UL data regarding the STA 1, UL data regarding the STA 2, and UL data regarding the STA 3 are frequency-multiplexed in an OFDMA manner and transmitted in a first channel 20 MHz band, and UL data regarding STA 4 and STA 5 is spatially multiplexed in an MU MIMO manner and transmitted in a second channel 20 MHz band is illustrated.

In FIGS. 38 to 43, the plain regions are regions in which all the STAs allocated UL MU resource by a trigger frame transmit the same signal, and the shaded regions are regions where each of the STAs transmits a different transmission value.

Referring to FIG. 38, in the first channel 20 MHz band, an HE-SIG1 field 3821a follows an L-part 3811a, HE-STFs 3831a, 3832a, and 3833a follow the HE-SIG1 field 3821a, HE-LTFs 3841a, 3842a, and 3843a follow the HE-STFs 3831a, 3832a, and 3833a, HE-SIG2 fields 3851a, 3852a, and 3853a follow the HE-LTF 3841a, 3842a, and 3843a, and a data field 3861a, 3862a, and 3863a follow the HE-SIG2 fields 3851a, 3852a, and 3853a.

Similarly, in the second channel 20 MHz band, an HE-SIG1 field 3821b follows an L-part 3811b, an HE-STF 3831b may follow the HE-SIG1 3821b, an HE-LTF 3841b follows the HE-STF 3831b, an HE-SIG2 field 3851b follows the HE-LTF 3841b, and a data field 3861b follows the HE-SIG2 field 3851b.

The L-STF, the L-LTF, and the L-SIG fields (L-part) 3811a and 3811b may be duplicated in units of 20 MHz channel and transmitted. Also, the HE-SIG1 fields 3821a and 3821b may be duplicated in units of 20 MHz and transmitted.

Here, in a case in which a frequency resource of an entre 40 MHz band is allocated by a trigger frame, each STA may duplicate the L-part 3811a and 3811b and the HE-SIG1 fields 3821a and 3821b in units of 20 MHz in the entire bandwidth allocated by the trigger frame, and transmit the same.

For example, in the case of FIG. 38, all the STA 1 to STA 5 may transmit an L-part 3811a and an HE-SIG field 3821a in the first channel 20 MHz band and the second 20 MHz band.

However, since the STA 1 to STA 5 transmit the L-part 3811a and 3811b and the HE-SIG fields 3821a and 3821b even up to the frequency band to which they are not allocated, power of the STAs may be unnecessarily consumed.

Thus, in the case of an STA whose frequency resource is allocated only in the first channel 20 MHz band or only in the second channel 20 MHz band, the STA may transmit the L-part 3811a and 3811b and the HE-SIG1 fields 3821a and 3821b only in the 20 MHz channel to which the a frequency resource allocated thereto belongs.

For example, in the case of FIG. 38, the STA 1, the STA 2, and the STA 3 may transmit the L-part 3811a and the HE-SIG1 field 3821a only in the first channel 20 MHz band and the STA 4 and STA 5 may transmit the L-part 3811b and HE-SIG1 field 3821b only in the second channel 20 MHz band.

The HE-STFs 3831a, 3832a, 3833a, and 3831b, the HE-LTFs 3841a, 3842a, 3843a, 3841b, and the HE-SIG2 fields 3851a, 3852a, 3853a, and 3851b may be transmitted in the same frequency domain (i.e., subband or resource unit) as that of data fields 3861a, 3862a, 3863a, and 3861b transmitted by a corresponding STA.

In the case of the UL MU transmission, since each STA transmits the HE-STF and the HE-LTF only in the frequency domain allocated for UL MU transmission, the HE-STF and the HE-LTF may be multiplexed in the frequency domain and transmitted in each STA.

Here, the STAs transmitting in the MU MIMO manner may transmit the HE-STF (and HE-LTF) in the SFN form in the frequency domain allocated thereto. For example, in the case of FIG. 38, the STA 4 and the STA 5 may map the same HE-STF (and HE-LTF) sequence in the second channel 20 MHz and transmit the same.

In this case, the number of HE-LTF symbols may be determined according to the number of streams regarding the corresponding frequency resource (i.e., the second channel 20 MHz). Also, a sequence (e.g., one row of a P matrix) orthogonal to a time axis may be multiplied to the entire HE-LTF symbols.

Also, the number of HE-LTF symbols transmitted by every STA participating in the UL MU transmission may be adjusted to be the same as a maximum number of HE-LTF symbols. For example, in the case of FIG. 38, when the STA 4 and the STA 5 are allocated one stream in the second channel 20 MHz band, the number of HE-LTF symbols may be determined to 2. In this case, although not MU-MIMO STAs, the STA 1 to STA 3 may transmit two HE-LTF symbols in order to adjust the number of the HE-LTF symbols to be the same.

Or, the STAs transmitting in the MU MIMO scheme may transmit the HE-STF (and HE-LTF) in the CDM form in the frequency domain allocated thereto. For example, in the case of FIG. 38, the STA4 and the STA 5 may map a unique HE-STF (and HE-LTF) sequence in the second channel 20 MHz band and transmit the same.

The HE-SIG2 fields 3851a, 3852a, 3853a, and 3851b may include information such as MCS level information regarding data fields 3861a, 3862a, 3863a, and 3861b of a corresponding UL frame, indication information regarding whether to apply an STBC, indication information regarding whether to apply beamforming, and/or FEC coding scheme information (LDPC or BCC indication).

In the case of the MCS level, for example, when a PHY length (i.e., a PPDU length) regarding a UL frame is determined by a trigger frame or determined in advance, each STA may determine an MCS level in consideration of the PHY length and/or to which degree of UL data each STA is to transmit. Here, since amounts of data to be transmitted by each STA may be different, a maximum PHY length of a UL frame is determined with respect to every STA participating in the UL MU transmission, and a maximum PHY length may be set to be the same for every STA participating in the UL MU transmission through a trigger frame.

Also, each STA may determine whether to apply beamforming and/or an FEC coding scheme in consideration of a channel state with an AP.

In a time domain, a length of the HE-SIG2 fields 3851a, 3852a, 3853a, and 3851b may be fixed. In this case, length information of HE-SIG2 fields 3851a, 3852a, 3853a, and 3851b indicated by the HE-SIG1 fields 3821a and 3821b included in a UL frame may be disregarded (or omitted).

Or, a length of the HE-SIG2 fields 3851a, 3852a, 3853a, and 3851b (e.g., the number of bytes or the number of symbols) may be indicated in the HE-SIG1 fields 3821a and 3821b. However, since each STA transmits different information in the HE-SIG2 fields 3851a, 3852a, 3853a, and 3851b, bits forming the HE-SIG2 fields 3851a, 3852a, 3853a, and 3851b may be different in each STA. Thus, each STA may pad bits remaining after configuring the HE-SIG2 fields according to length information indicated in the HE-SIG1 fields 3821a and 3821b. Also, in this case, the AP may set a maximum length of the HE-SIG2 fields 3851a, 3852a, 3853a, and 3851b to be the same in every STA participating in the UL MU transmission.

Hereinafter, in describing a UL MU frame structure according to FIGS. 39 to 43, the same descriptions as those of FIG. 38 will be omitted for the purposes of description.

Referring to FIG. 39, every STA participating in the UL MU transmission may transmit the HE-STF 3931, the HE-LTF 3941 and the HE-SIG2 field 3951 across the entire UL MU transmission bandwidth.

Here, every STA participating in the UL MU transmission may transmit the same signal in the HE-STF 3931 and HE-SIG2 fields 3951.

Here, information transmitted in the HE-SIG2 field 3951 may be the same as information of the HE-SIG2 field transmitted in the trigger frame.

The HE-LTF 3941 may be transmitted across the entire UL MU transmission bandwidth, but may be multiplexed according to FDM/CDM/TDM method in each STA so as to be transmitted.

In the case of transmission in the FDM form, each STA participating in the UL MU transmission may map an HE-LTF sequence to different tones (or subcarriers) of the entire PPDU bandwidth by each STA participating in the UL MU transmission. For example, the STA 1 may map the HE-LTF sequence to a tone of 5k, the STA2 may map the HE-LTF sequence to a tone of 5k+1, the STA 3 may map the HE-LTF sequence to a tone of 5k+2, the STA 4 may map the HE-LTF sequence to a tone of 5k+3, and the STA 5 may map the HE-LTF sequence to a tone of 5k+4 (k=0, 1, . . . ), and transmit a unique HE-LTF of their own.

Also, in the case of transmission in the TDM form, each STA may map an HE-LTF sequence in different HE-LTF symbols of the entire UL MU transmission bandwidth and transmit the same.

Also, in the case of transmission in the CDM form, each STA participating in the UL MU transmission may generate an HE-STF sequence unique thereto, and map it to the entire UL MU transmission bandwidth and transmit the same.

Referring to FIG. 40, each STA participating in the UL MU transmission may transmit HE-STF 4031a and 4031b, HE-LTF 4041a and 4041b, and HE-SIG2 fields 4051a and 4051b only in a 20 MHz channel to which a frequency domain allocated thereto belongs.

Here, the STA allocated the frequency resource in each 20 MHz channel may transmit the same signal in the HE-STFs 4031a and 4031b and the HE-SIG2 fields 4051a and 4051b.

Here, information transmitted in the HE-SIG2 fields 4051a and 4051b may be a portion of information of the HE-SIG2 field transmitted in a trigger frame. That is, the information may be information regarding an STA allocated a resource in the 20 MHz channel to which a frequency resource allocated thereto belongs, in information of the HE-SIG2 field transmitted from the trigger frame.

For example, in the case of FIG. 40, the STA 1 to STA 3 transmit the same HE-STF 4031a and HE-SIG2 field 4051a in the first 20 MHz channel and the STA 4 and the STA 5 transmit the same HE-STF 4031b and the HE-SIG2 field 4051b in the second 20 MHz channel.

The HE-LTFs 4041a and 4041b are also transmitted in the 20 MHz channel unit, but may be multiplexed according to FDM/CDM/TDM method described above in the example of FIG. 39 in each STA so as to be transmitted.

Referring to FIG. 41, each STA participating in the UL MU transmission may transmit HE-STF 4131a and 4131b and HE-LTF 4141a and 4141b only in the 20 MHz channel to which a frequency domain allocated thereto belongs, and the HE-SIG2 fields 4151a, 4152a, 4153a, and 4151b may be transmitted in the same frequency domain (i.e., subband or resource unit) as that of data fields 4161a, 4162a, 4163a, and 4161b transmitted by a corresponding STA.

Here, the STAs allocated a frequency resource in each 20 MHz channel may transmit the same signal in the HE-STFs 4131a and 4131b.

The HE-LTFs 4141a and 4141b may be transmitted in a 20 MHz channel unit, but may be multiplexed in the FDM/CDM/TDM manner described above in the example of FIG. 39 and transmitted in each STA within each 20 MHz channel.

However, in the time domain, a length (i.e., the number of symbols) of the HE-LTFs 4141a and 4141b may not be fixed. That is, the number of HE-LTFs 4141a and 4141b symbols may be determined according to the number of streams allocated by each 20 MHz channel. For example, in the case of FIG. 41, since the STA 1 and STA2 do not perform MU MIMO transmission, the HE-LTF 4141a may be transmitted in one symbol. However, since the STA 4 and the STA 5 perform MU MIMO transmission, when one stream is allocated respectively, the HE-LTF 4141a may be transmitted in two symbols.

As illustrated in the example of FIG. 38, the HE-SIG2 fields 4151a, 4152a, 4153a, and 4151b may include information such as MCS level information regarding data fields 4161a, 4162a, 4163a, and 4161b of a corresponding UL frame, indication information regarding whether to apply an STBC, indication information regarding whether to apply beamforming, and/or FEC coding scheme information (LDPC or BCC indication).

However, in the time domain, a length (number of symbols) of the HE-SIG2 fields 4151a, 4152a, 4153a, and 4151b may not be fixed. Thus, a length may be determined according to an amount of information transmitted from the HE-SIG2 fields 4151a, 4152a, 4153a, and 4151b in each STA. In this case, a length of the HE-SIG2 fields 4151a, 4152a, 4153a, and 4151b may be indicated by the HE-SIG1 fields 4121a and 41212b.

Referring to FIG. 42, the HE-STF 4231a, 4232a, 4233a, and 4231b, the HE-LTF 4241a, 4242a, 4243a, and 4241b, and the HE-SIG2 fields 4251a, 4252a, 4253a, and 4251b may be transmitted in the same frequency domain (i.e., subband or resource unit) as that of data fields 4261a, 4262a, 4263a, and 4261b transmitted by a corresponding STA.

However, different from the example of FIG. 38, a length (i.e., the number of symbols) of the HE-LTFs 4241a, 4242a, 4243a, and 4241b and the HE-SIG2 fields 4251a, 4252a, 4253a, and 4251b may not be fixed.

That is, the length (the number of symbols) of the HE-LTFs 4241a, 4242a, 4243a, and 4241b may be determined according to the number of streams allocated in the corresponding frequency domain (i.e., subland or resource unit). Also, a length (i.e., the number of symbols) of the HE-SIG2 fields 4251a, 4252a, 4253a, and 4251b may be determined according to an amount of information transmitted in the HE-SIG2 fields 4251a, 4252a, 4253a, and 4251b in each STA.

Referring to FIG. 43, the HE-STFs 4331a, 4332a, 4333a, and 4331b and the HE-LTFs 4341a, 4342a, 4343a, and 4341b may be transmitted in the same frequency domain (i.e., subband or resource unit) as those of data fields 4361a, 4362a, 4363a, and 4361b transmitted by a corresponding STA.

However, the HE-SIG2 field may not be included in the UL MU frame. In this case, a trigger frame provides configuration information of the UL MU frame to each STA participating in the UL MU transmission, and each STA transmits the UL MU frame based on information indicated in the trigger frame.

Also, unlike the example of FIG. 38, a length (the number of symbols) of the HE-LTFs 4341a, 4342a, 4343a, and 4341b may not be fixed.

That is, the length (the number of symbols) of HE-LTFs 4341a, 4342a, 4343a, and 4341b may be determined according to the number of streams allocated in the corresponding frequency domain (i.e., subband or resource unit).

As described above, in the UL SU transmission, when the same frame structure as that of the UL MU transmission is used, the UL SU frame structure according to the example of FIG. 37 may be used in the same manner.

However, in the UL SU transmission and UL MU transmission, frame structures may be defined to be different. This will be described with reference to FIG. 44.

FIG. 44 is a view illustrating a configuration of a UL SU frame according to an embodiment of the present invention.

In FIG. 44, a 20 MHz UL SU/MU frame structure is illustrated.

In FIG. 44, it is assumed that a UL SU frame is transmitted in a specific subband (or resource unit) (e.g., in a first 5 MHz band, etc.) which is designated by a trigger frame, which is previously determined, or which is arbitrarily selected.

Referring to FIG. 44, an HE-STF 4421 may follow an L-part and HE-SIG1 field 4411, an HE-LTF 4431 may follow the HE-STF 4421, an HE-SIG2 field 4441 may follow the HE-LTF 4431, and a data field 4451 may follow the HE-SIG2 field 4441.

When the UL SU frame structure is defied irrespective of a UL MU frame structure, the HE-STF 4421, the HE-LTF 4431, and the HE-SIG2 field 4441 may be transmitted in the entire band of a corresponding PPDU.

In the case of FIG. 44, the HE-SIG2 field 4441 may use the same FFT size as those of the HE-STF 4421, the HE-LTF 4431, and the data field 4451. Also, unlike the case of FIG. 44, as the HE-SIG2 field 4441 is transmitted before the HE-STF 4421 and the HE-LTF 4431, the same FFT size as that of the L-part and HE-SIG1 field 4411 may be used.

As described above, when the STA performs UL SU transmission in subband (or resource unit) granularity in performing UL SU transmission, it means that a channel state of a corresponding STA is poor and thus transmission will be made by concentrating maximum power of the STA on a specific subband (or resource unit). However, since the HE-SIG2 field 4441 is transmitted in 20 MHz unit, power is distributed, compared with the data field 4451, and thus, coverage may be lowered.

Thus, In order to solve the coverage problem, while transmitting the HE-SIG2 field 4441 in the entire band, the HE-SIG2 field 4441 may be repeatedly transmitted. That is, when a length of the HE-SIG2 field 4441 is indicated as 2 symbols in the HE-SIG1 field 4441 but actual information of an STA included in the HE-SIG2 field 4441 is about 0.5 symbol, the remaining 1.5 symbol may not be padded and actual information may be repeatedly transmitted.

FIGS. 45 and 46 are views illustrating a UL MU transmission method and a frame structure supporting the same according to an embodiment of the present invention.

In FIGS. 45 and 46, a UL MU transmission method based on a trigger frame and a frame structure supporting the same are illustrated.

In FIG. 45, a UL MU transmission method using a trigger frame according to the example of FIG. 34(c) and a UL MU frame structure according to the example of FIG. 36(b) are illustrated, and thus, a detailed description regarding each frame will be omitted.

Referring to FIG. 45, an AP transmits a trigger frame 4511 to each STA participating in UL MU transmission.

Upon receiving the trigger frame 4511, each STA simultaneously transmits UL MU frames 4521, 4522, 4523, and 4524 to the AP based on UL MU frame configuration information included in an HE-SIG3 field of the trigger frame 4511.

Each STA transmits UL data thereof in a frequency resource allocated by the trigger frame 4511. In FIG. 45, UL data of the STA 1, the STA 2, and the STA 3/4 is transmitted to the AP in an OFDMA manner, and UL data of the STA 3 and the STA 4 is transmitted to the AP in an MU-MIMO manner.

UL data frames 4521, 4522, 4523, and 4524 of the STA 1 to STA 4 may all be transmitted in a 20 MHz channel in which the trigger frame 4511 has been transmitted.

In the UL MU frames 4521, 4522, 4523, and 4524 of each STA, an HE-STF and an HE-LTF may be transmitted in the entire PPDU band. Here, the HE-STF and the HE-LTF in each UL MU frame carry different signals by STAs, and may be multiplexed in an FDM/CDM/TDM manner so as to be transmitted.

The AP transmits a block ACK (BA) frame 4531 to each STA in response to the UL MU frames 4521, 4522, 4523, and 4524.

Referring to the BA frame, an HE-SIG1 field may follow L-STF, L-LTF, and L-SIG field (i.e., L-part), an HE-STF may follow the HE-SIG1 field, an HE-LTF may follow the HE-STF, an HE-SIG2 field may follow the HE-LTF, and an ACK field (i.e., a data field including an ACK frame) may follow the HE-SIG2 field.

The BA frame 4531 may be transmitted in the 20 MHz channel in which the trigger frame 4511 has been transmitted.

ACK information regarding the UL MU transmission may be transmitted in a MAC frame (i.e., ACK frame) included in a data field of the BA frame 4531. Here, the ACK information may include ACK information of each STA participating in the UL MU transmission.

As illustrated in FIG. 45, the BA frame 4531 may have a 802.11 ax frame structure. That is, an FFT size as large as four times the L-part may be used in the HE-STF, the HE-LTF, and the HE-SIG1.

In FIG. 46, a UL MU transmission procedure of the STA 1 to STA 4 in a 40 MHz channel is illustrated.

In FIG. 46, a UL MU transmission method using the trigger frame according to the example of FIG. 34(d) and the UL MU frame structure (however, not including HE-SIG2) according to the example of FIG. 36(a) is illustrated, and thus, a detailed description of each frame will be omitted.

Referring to FIG. 46, an AP transmits a trigger frame 4611 to each STA participating in UL MU transmission.

An L-part and HE-SIG1 of the trigger frame 4611 may be duplicated in 20 MHz unit and transmitted. An HE-SIG3 field may use a larger number of tones (or subcarriers) than that of the L-part and the HE-SIG1 field.

Upon receiving the trigger frame 4611, each STA simultaneously transmits UL MU frames 4621, 4622, 4623, and 4624 to an AP based on UL MU frame configuration information included in the HE-SIG3 field of the trigger frame 4611.

Each STA transmits UL data thereof in a frequency resource allocated by the trigger frame 4611. In FIG. 46, UL data of the STA 1, the STA 2, and the STA 3/4 is transmitted to the AP in an OFDMA manner, and UL data of the STA 3 and STA 4 is transmitted to the AP in a MU-MIMO manner.

In FIG. 46, the trigger frame 4611 is transmitted in a 40 MHz band, and the UL data frames 4621, 4622, 4623, and 4624 may be transmitted in the 40 MHz band occupied by the trigger frame 4611 or transmitted in a partial band thereof (e.g., 20 MHz).

In the UL MU frames 4621, 4622, 4623, and 4624 of each STA, an HE-STF and an HE-LTF may be transmitted only in a frequency domain (i.e., subband or resource unit) allocated to each STA. Here, in each UL MU frame, the HE-STF and HE-LTF carry different signals for each STA, and multiplexed and transmitted in an FDM manner between OFDMA STAs (STA 1, STA 2, STA 3/4) and multiplexed and transmitted in an FDM/CDM/TDM manner between MU-MIMO STAs (STAs 3 and 4).

The AP transmits a block ACK (BA) frame 4631 to each STA in response to the UL MU frames 4621, 4622, 4623, and 4624.

Referring to the BA frame 4631, an ACK field (i.e., a data field including an ACK frame) may follow an L-STF, L-LTF, and L-SIG field (i.e., L-part).

The BA frame 4631 may also be transmitted in a 802.11a structure. That is, the BA frame 4631 may include only a MAC field including L-STF/LTF/SIG and ACK information.

Meanwhile, in the example of FIG. 45, the BA frame 4531 may be configured to have the same 802.11a structure as that of the example of FIG. 46.

The BA frame 4631 may be transmitted in a partial 20 MHz (e.g., primary 20 MHz channel) in a 40 MHz channel in which the trigger frame 4611 has been transmitted.

FIG. 47 is a view illustrating a UL MU transmission method and a frame structure supporting the same according to an embodiment of the present invention.

In FIG. 47, a method for transmitting a UL using channel contending by each STA and a frame structure supporting the same are illustrated.

In FIG. 47, a 20 MHz UL frame and BA frame structure is illustrated.

Through channel contending, a STA occupies a channel and transmits a UL frame 4711 to an AP. Here, the STA may transmit a UL frame through the secured entire 20 MHz band or may transmit UL data only in a partial band as illustrated in FIG. 37.

The AP transmits a BA frame 4721 to the corresponding STA in response to the UL frame 4711.

In FIG. 47, as the BA frame 4721 structure, the same 802.11a structure as that of FIG. 46 is illustrated, but the 802.11 ax structure illustrated in FIG. 45 may also be used.

In FIG. 47, when UL transmission is extended to 20 MHz or higher, an L-part and an HE-SIG1 of the UL frame 4711 and the BA frame 4721 may be duplicated in a 20 MHz unit and transmitted, but a following field may be transmitted in the entire band.

Meanwhile, the present invention is not limited to the examples of FIGS. 45 and 47 and the trigger frame structure and the UL SU/MU frame structure described above may be variously combined to be used in a UL MU transmission procedure.

General Apparatus to which the Present Invention May be Applied

FIG. 48 is a block diagram exemplifying a wireless apparatus according to an embodiment of the present invention.

Referring to FIG. 48, an apparatus 4810 according to the present invention may include a processor 4811, a memory 4812, and a radio frequency (RF) unit 4813. The apparatus 4810 may be an AP or a non-AP STA for implementing the embodiments of the present invention.

The RF unit 4813 is connected to the processor 4811 to transmit and/or receive a wireless signal. For example, the RF unit 4813 may implement the physical layer according to the IEEE 802.11 system.

The processor 4811 is connected to the RF unit 4813 to implement the physical layer and/or MAC layer according to the IEEE 802.11 system. The processor 4811 may be configured to perform the operations according to the various embodiments of the present invention according to FIGS. 1 to 47 above. In addition, a module that implements the operations of the AP and/or the STA according to the various embodiments of the present invention according to FIGS. 1 to 47 above may be stored in the memory 4812 and executed by the processor 4811.

The memory 4812 is connected to the processor 4811 and stores various pieces of information for driving the processor 4811. The memory 4812 may be included in the processor 4811, or installed exterior to the processor 4811 and connected to the processor 4811 with a known means.

Further, the apparatus 4810 may have a single antenna or multiple antennas.

Such a detailed configuration of the apparatus 4810 may be implemented such that the features described in various embodiments of the present invention described above are independently applied or two or more embodiments are simultaneously applied.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

In the wireless communication system, the example in which the uplink single-user or multi-user transmission method is applied to the IEEE 802.11 system is primarily described, but the uplink multi-user transmission method can be applied to various wireless communication systems in addition to the IEEE 802.11 system.

The invention claimed is:

1. A method of performing uplink (UL) multi-user (MU) transmission by a station (STA) in a wireless communication system, the method comprising:
receiving, from an access point (AP), a trigger frame including (i) resource allocation information related to at least one frequency resource, among a plurality of frequency resources, for the UL MU transmission, and (ii) modulation and coding scheme (MCS) information for the UL MU transmission; and
transmitting, to the AP, a UL frame in response to the trigger frame,
wherein the UL frame includes a plurality of legacy bit fields and a plurality of high efficiency (HE) bit fields,
wherein the plurality of legacy bit fields includes (i) legacy-short training field (L-STF), (ii) a legacy-long training field (L-LTF), and (iii) a legacy-SIGNAL (L-SIG) field,
wherein the plurality of HE bit fields includes (i) high efficiency-SIGNAL-A (HE-SIG-A) field, (ii) a high efficiency-short training field (HE-STF), (iii) a high efficiency-long training field (HE-LTF), and (iv) a data field,
wherein the MSC information that was received in the trigger frame relates to modulation and coding for the data field of the plurality of HE bit fields,
wherein the plurality of HE bit fields does not include a high efficiency-SIGNAL-B (HE-SIG-B) field which is configured to include the MCS information that was received in the trigger frame,
wherein the UL frame does not include the MCS information that was received in the trigger frame, and
wherein the HE-STF, the HE-LTF, and the data field are transmitted in the at least one frequency resource based on the resource allocation information that was received in the trigger frame.

2. The method of claim 1, wherein, in the plurality of HE bit fields, the HE-STF follows the HE-SIG-A field, the HE-LTF follows the HE-STF, and the data field follows the HE-LTF, according to an order of transmission.

3. The method of claim 1, wherein based on the at least one frequency resource being allocated in a 20 MHz channel based on the resource allocation information, the plurality of legacy bit fields and the HE-SIG-A field are transmitted in the 20 MHz channel.

4. The method of claim 1, wherein based on the at least one frequency resource being allocated in a plurality of 20 MHz channels based on the resource allocation information, the plurality of legacy bit fields and the HE-SIG-A field are duplicated and transmitted in each of the plurality of 20 MHz channels.

5. The method of claim 1, wherein the trigger frame further includes (i) STA identifier (ID) information for identifying the STA, (ii) duration information for the UL frame, and (iii) coding information for the UL frame.

6. The method of claim 1, wherein the UL MU transmission is a UL orthogonal frequency division multiple access (OFDMA) transmission.

7. A station (STA) device configured to perform uplink (UL) multi-user (MU) transmission in a wireless communication system, the STA device comprising:
a transceiver;
at least one processor; and
at least one computer memory operably connectable to the at least one processor and storing instructions that, when executed by the at least one processor, perform operations comprising:
receiving, from an access point (AP) through the transceiver, a trigger frame including (i) resource allocation information related to at least one frequency resource, among a plurality of frequency resources, for the UL MU transmission, and (ii) modulation and coding scheme (MCS) information for the UL MU transmission, and
transmitting, to the AP control through the transceiver, to transmit a UL frame in response to the trigger frame,
wherein the UL frame includes a plurality of legacy bit fields and a plurality of high efficiency (HE) bit fields,
wherein the plurality of legacy bit fields L part includes (i) legacy-short training field (L-STF), (ii) a legacy-long training field (L-LTF), and (iii) a legacy-SIGNAL (L-SIG) field,
wherein the plurality of HE bit fields includes (i) high efficiency-SIGNAL-A (HE-SIG-A) field, (ii) a high efficiency-short training field (HE-STF), (iii) a high efficiency-long training field (HE-LTF), and (iv) a data field,
wherein the MSC information that was received in the trigger frame relates to modulation and coding for the data field of the plurality of HE bit fields,
wherein the plurality of HE bit fields does not include a high efficiency-SIGNAL-B (HE-SIG-B) field which is configured to include the MCS information that was received in the trigger frame,
wherein the UL frame does not include the MCS information that was received in the trigger frame, and
wherein the HE-STF, the HE-LTF, and the data field are transmitted in the at least one frequency resource based on the resource allocation information that was received in the trigger frame.

8. The STA device of claim 7, wherein, in the plurality of HE bit fields, the HE-STF follows the HE-SIG-A field, the HE-LTF follows the HE-STF, and the data field follows the HE-LTF, according to an order of transmission.

9. The STA device of claim 7, wherein based on the at least one frequency resource being allocated in a 20 MHz channel based on the resource allocation information, the plurality of legacy bit fields and the HE-SIG-A field are transmitted in the 20 MHz channel.

10. The STA device of claim 7, wherein based on the at least one frequency resource being allocated in a plurality of 20 MHz channels based on the resource allocation information, the plurality of legacy bit fields and the HE-SIG-A field are duplicated and transmitted in each of the plurality of 20 MHz channels.

11. The method of claim 1, wherein the MCS information is part of STA-specific control information for the STA which is included in the trigger frame, and
   wherein the HE-SIG-B field, which is not included in the UL frame, is configured to include the STA-specific control information.

12. The method of claim 11, wherein the STA-specific control information relates to a transmission configuration of the UL frame for the STA.

13. The method of claim 11, wherein the HE-SIG-A field includes common control information for a plurality of STAs.

14. The method of claim 6, wherein the plurality of frequency resources are arranged as a plurality of OFDMA frequency resource units, and
   wherein the at least one frequency resource related to the resource allocation information is among the plurality of OFDMA frequency resource units.

15. The STA device of claim 7, wherein the MCS information is part of STA-specific control information for the STA which is included in the trigger frame, and
   wherein the HE-SIG-B field, which is not included in the UL frame, is configured to include the STA-specific control information.

16. The STA device of claim 15, wherein the STA-specific control information relates to a transmission configuration of the UL frame for the STA.

17. The STA device of claim 15, wherein the HE-SIG-A field includes common control information for a plurality of STAs.

* * * * *

UNITED STATES PATENT AND TRADEMARK OFFICE
CERTIFICATE OF CORRECTION

PATENT NO. : 10,785,772 B2  
APPLICATION NO. : 15/505521  
DATED : September 22, 2020  
INVENTOR(S) : Jinyoung Chun et al.

Page 1 of 2

It is certified that error appears in the above-identified patent and that said Letters Patent is hereby corrected as shown below:

In the Claims

Column 77, Line 38, in Claim 1, after "plurality of legacy" delete "bit"

Column 77, Line 39, in Claim 1, after "(HE)" delete "bit"

Column 77, Line 40, in Claim 1, after "plurality of legacy" delete "bit"

Column 77, Line 44, in Claim 1, after "HE" delete "bit"

Column 77, Line 49, in Claim 1, delete "MSC" and insert --MCS--

Column 77, Line 51, in Claim 1, after "HE" delete "bit"

Column 77, Line 52, in Claim 1, after "HE" delete "bit"

Column 77, Line 63, in Claim 2, before "fields" delete "bit"

Column 78, Line 2, in Claim 3, after "legacy" delete "bit"

Column 78, Line 7, in Claim 4, after "legacy" delete "bit"

Column 78, Line 37, in Claim 7, after "legacy" delete "bit"

Column 78, Line 38, in Claim 7, after "(HE)" delete "bit"

Column 78, Line 39, in Claim 7, after "legacy" delete "bit"

Column 78, Line 43, in Claim 7, after "HE" delete "bit"

Signed and Sealed this  
Twenty-fourth Day of May, 2022

Katherine Kelly Vidal  
*Director of the United States Patent and Trademark Office*

CERTIFICATE OF CORRECTION (continued)
U.S. Pat. No. 10,785,772 B2

Column 78, Line 48, in Claim 7, delete "MSC" and insert --MCS--

Column 78, Line 50, in Claim 7, after "HE" delete "bit"

Column 78, Line 51, in Claim 7, after "HE" delete "bit"

Column 78, Line 62, in Claim 8, after "HE" delete "bit"

Column 79, Line 1, in Claim 9, after "legacy" delete "bit"

Column 79, Line 6, in Claim 10, after "legacy" delete "bit"